US00RE43727E

(19) United States
(12) Reissued Patent
Acres et al.

(10) Patent Number: US RE43,727 E
(45) Date of Reissued Patent: Oct. 9, 2012

(54) METHOD FOR OPERATING NETWORKED GAMING DEVICES

(75) Inventors: John F. Acres, Corvallis, OR (US); Alec Ginsburg, Las Vegas, NV (US); David Wiebenson, Corvallis, OR (US)

(73) Assignee: IGT, Reno, NV (US)

(21) Appl. No.: 09/373,034

(22) Filed: Aug. 11, 1999

Related U.S. Patent Documents

Reissue of:
(64) Patent No.: 5,655,961
Issued: Aug. 12, 1997
Appl. No.: 08/322,172
Filed: Oct. 12, 1994

(51) Int. Cl.
*A63F 13/00* (2006.01)
*G07F 17/32* (2006.01)

(52) U.S. Cl. ..... 463/27; 463/28; 463/20; 463/42; 463/25

(58) Field of Classification Search ..... 463/16, 463/25, 27, 42; 273/138.1, 148 B, 149 R, 273/460
See application file for complete search history.

(56) References Cited

U.S. PATENT DOCUMENTS

| | | | | |
|---|---|---|---|---|
| 3,269,503 | A | 8/1966 | Foster | |
| 3,598,964 | A | 8/1971 | Dell | 235/61.6 R |
| 3,659,284 | A | 4/1972 | Rusch | |
| 3,796,433 | A | 3/1974 | Fraley et al. | |
| 3,819,186 | A | 6/1974 | Hinterstocker | |
| 3,906,447 | A | 9/1975 | Crafton et al. | |
| 3,998,309 | A | 12/1976 | Mandas et al. | 194/97 R |
| 4,072,930 | A | 2/1978 | Lucero et al. | |
| 4,230,265 | A | 10/1980 | Casaly | 235/455 |
| 4,238,127 | A | 12/1980 | Lucero et al. | 273/143 R |
| 4,258,838 | A | 3/1981 | Rockola et al. | 194/1 R |
| 4,283,709 | A | 8/1981 | Lucero et al. | 340/147 R |

(Continued)

FOREIGN PATENT DOCUMENTS

| | | |
|---|---|---|
| AU | 524709 | 8/1979 |

(Continued)

OTHER PUBLICATIONS

Report & Recommendation (Findings of Fact & Conclusions of-Law Re: Claim Construction), May 2000.

(Continued)

*Primary Examiner* — David L Lewis
*Assistant Examiner* — William H McCulloch
(74) *Attorney, Agent, or Firm* — Weaver Austin Villeneuve & Sampson LLP

(57) ABSTRACT

A system for monitoring and configuring gaming devices interconnected over a high-speed network is disclosed. The system can support a file server, one or more floor controllers, one or more pit terminals, and other terminals all interconnected over the network. Each gaming device includes an electronic module which allows the gaming device to communicate with a floor controller over a current loop network. The electronic module includes a player tracking module and a data communication node. The player tracking module includes a card reader for detecting a player tracking card inserted therein which identifies the player. The data communication node communicates with both the floor controller and the gaming device. The data communication node communicates with the gaming device over a serial interface through which the data communication node transmits reconfiguration commands. The gaming device reconfigures its payout schedule responsive to the reconfiguration commands to provide a variety of promotional bonuses such as multiple jackpot bonuses, mystery jackpot bonuses, progressive jackpot bonuses, or player specific bonuses.

23 Claims, 34 Drawing Sheets

U.S. PATENT DOCUMENTS

| | | | | |
|---|---|---|---|---|
| 4,332,780 | A | 6/1982 | Rhoda et al. | |
| 4,335,809 | A | 6/1982 | Wain | 194/1 R |
| 4,409,656 | A | 10/1983 | Anderson | |
| 4,467,424 | A | 8/1984 | Hedges et al. | 364/412 |
| 4,494,197 | A | 1/1985 | Troy et al. | |
| 4,572,622 | A | 2/1986 | Sterner | |
| 4,573,681 | A | 3/1986 | Okada | 273/143 R |
| 4,575,622 | A | 3/1986 | Pellegrini | 235/382 |
| 4,582,324 | A | 4/1986 | Koza et al. | |
| 4,621,188 | A | 11/1986 | Stockburger et al. | |
| 4,624,459 | A | 11/1986 | Kaufman | |
| 4,636,951 | A | 1/1987 | Harlick | 364/412 |
| 4,652,998 | A | 3/1987 | Koza et al. | 364/412 |
| 4,669,596 | A | 6/1987 | Capers et al. | 194/210 |
| 4,669,730 | A | 6/1987 | Small | 273/138 |
| 4,669,731 | A | 6/1987 | Clarke | |
| 4,679,143 | A | 7/1987 | Hagiwara | 364/412 |
| 4,700,296 | A | 10/1987 | Palmer, Jr. et al. | |
| 4,760,247 | A | 7/1988 | Keane et al. | |
| 4,760,527 | A | 7/1988 | Sidley | |
| 4,764,666 | A | 8/1988 | Bergeron | 235/380 |
| 4,775,937 | A | 10/1988 | Bell | 364/412 |
| 4,805,907 | A | 2/1989 | Hagiwara | 273/138 |
| 4,815,741 | A | 3/1989 | Small | 273/138 A |
| 4,837,728 | A | 6/1989 | Barrie et al. | |
| 4,839,640 | A | 6/1989 | Ozer et al. | 340/825.31 |
| 4,842,278 | A | 6/1989 | Markowicz | |
| 4,844,464 | A | 7/1989 | Berge | |
| 4,856,787 | A | 8/1989 | Itkis | |
| 4,861,041 | A | 8/1989 | Jones et al. | |
| 4,871,171 | A | 10/1989 | Rivero | |
| 4,880,237 | A | 11/1989 | Kishishita | |
| 4,882,473 | A | 11/1989 | Bergeron et al. | 235/380 |
| 4,922,420 | A | 5/1990 | Nakagawa et al. | |
| 4,926,327 | A | 5/1990 | Sidley | |
| 4,926,996 | A | 5/1990 | Eglise et al. | |
| 4,948,134 | A | 8/1990 | Suttle et al. | |
| 4,948,138 | A | 8/1990 | Pease et al. | |
| 4,964,638 | A | 10/1990 | Ishida | |
| 4,991,848 | A | 2/1991 | Greenwood et al. | |
| 5,007,649 | A | 4/1991 | Richardson | |
| 5,016,880 | A | 5/1991 | Berge | |
| 5,038,022 | A | 8/1991 | Lucero | |
| 5,042,810 | A | 8/1991 | Williams | |
| 5,043,887 | A | 8/1991 | Richardson | |
| 5,046,736 | A | 9/1991 | Bridgeman et al. | |
| 5,048,833 | A | 9/1991 | Lamle | 273/138 A |
| 5,072,381 | A | 12/1991 | Richardson et al. | |
| 5,074,559 | A | 12/1991 | Okada | 273/143 R |
| 5,078,405 | A | 1/1992 | Jones | |
| 5,083,271 | A | 1/1992 | Thacher et al. | |
| 5,089,694 | A | 2/1992 | Zerfahs et al. | |
| 5,096,195 | A | 3/1992 | Gimmon | |
| 5,103,081 | A | 4/1992 | Fisher et al. | |
| 5,114,155 | A | 5/1992 | Tillery et al. | |
| 5,116,055 | A | 5/1992 | Tracy | 273/138 A |
| 5,123,649 | A | 6/1992 | Tiberio | |
| 5,129,652 | A | 7/1992 | Wilkinson | |
| 5,135,224 | A | 8/1992 | Yamamoto et al. | 273/143 R |
| 5,152,529 | A | 10/1992 | Okada | |
| 5,159,549 | A | 10/1992 | Hallman, Jr. et al. | |
| 5,178,390 | A | 1/1993 | Okada | 273/143 |
| 5,179,517 | A | 1/1993 | Sarbin et al. | |
| 5,185,798 | A | 2/1993 | Hamada et al. | |
| 5,197,094 | A | 3/1993 | Tillery et al. | 379/91 |
| 5,202,549 | A | 4/1993 | Decker et al. | |
| 5,216,613 | A | 6/1993 | Head, III | |
| 5,217,224 | A | 6/1993 | Sincock | 273/138 A |
| 5,224,706 | A | 7/1993 | Bridgeman et al. | |
| 5,242,163 | A | 9/1993 | Fulton | |
| 5,249,800 | A | 10/1993 | Hilgendorf et al. | 273/138 A |
| 5,257,179 | A | 10/1993 | DeMar | 364/410 |
| 5,259,616 | A | 11/1993 | Bergmann | 273/138 A |
| 5,265,874 | A | 11/1993 | Dickinson et al. | 273/138 A |
| 5,275,400 | A | 1/1994 | Weingardt et al. | 273/85 CP |
| 5,276,314 | A | 1/1994 | Martino et al. | |
| 5,280,909 | A | 1/1994 | Tracy | 273/138 A |
| 5,286,023 | A | 2/1994 | Wood | |
| 5,287,269 | A | 2/1994 | Dorrough et al. | 364/408 |
| 5,288,077 | A | 2/1994 | Jones | |
| 5,290,033 | A | 3/1994 | Bittner et al. | |
| 5,292,127 | A | 3/1994 | Kelly et al. | |
| 5,321,241 | A | 6/1994 | Craine | |
| 5,324,035 | A | 6/1994 | Morris | |
| 5,326,104 | A | 7/1994 | Pease et al. | 273/138 A |
| 5,332,219 | A | 7/1994 | Marnell, II et al. | |
| 5,342,049 | A | 8/1994 | Wichinsky et al. | 273/119 R |
| 5,344,144 | A | 9/1994 | Canon | 273/138 A |
| 5,345,379 | A | 9/1994 | Brous et al. | 364/146 |
| 5,351,970 | A | 10/1994 | Fioretti | |
| 5,359,510 | A | 10/1994 | Sabaliauskas | |
| 5,364,104 | A | 11/1994 | Jones et al. | |
| 5,364,105 | A | 11/1994 | Jones et al. | |
| 5,370,306 | A | 12/1994 | Schulze et al. | 273/138 A |
| 5,370,399 | A | 12/1994 | Liverance | |
| 5,371,345 | A | 12/1994 | LeStrange et al. | 235/380 |
| 5,393,057 | A | 2/1995 | Marnell, II | 273/85 CP |
| 5,398,932 | A | 3/1995 | Eberhardt et al. | |
| 5,401,023 | A | 3/1995 | Wood | |
| 5,401,024 | A | 3/1995 | Simunek | |
| 5,410,590 | A | 4/1995 | Blood et al. | |
| 5,423,539 | A | 6/1995 | Nagao | 273/143 R |
| 5,429,361 | A | 7/1995 | Raven et al. | 273/183 |
| 5,470,079 | A | 11/1995 | LeStrange et al. | 273/138 A |
| 5,472,194 | A | 12/1995 | Breeding et al. | |
| 5,473,144 | A | 12/1995 | Mathurin, Jr. | 235/380 |
| 5,476,259 | A | 12/1995 | Weingardt | 273/85 |
| 5,477,040 | A | 12/1995 | Lalonde | 235/380 |
| 5,488,411 | A | 1/1996 | Lewis | |
| 5,494,287 | A | 2/1996 | Manz | 273/143 R |
| 5,505,461 | A | 4/1996 | Bell et al. | |
| 5,507,489 | A | 4/1996 | Reibel et al. | |
| 5,511,781 | A | 4/1996 | Wood et al. | |
| 5,524,888 | A | 6/1996 | Heidel | |
| 5,533,727 | A | 7/1996 | DeMar | 463/23 |
| 5,536,016 | A | 7/1996 | Thompson | |
| 5,542,669 | A | 8/1996 | Charron et al. | |
| 5,544,893 | A | 8/1996 | Jones et al. | 273/309 |
| 5,547,192 | A | 8/1996 | Ishibashi | 463/26 |
| 5,550,359 | A | 8/1996 | Bennett | |
| 5,551,692 | A | 9/1996 | Pettit et al. | |
| 5,557,086 | A | 9/1996 | Schulze et al. | |
| 5,559,312 | A | 9/1996 | Lucero | 235/380 |
| 5,564,700 | A | 10/1996 | Celona | |
| 5,577,959 | A | 11/1996 | Takemoto et al. | 463/25 |
| 5,580,309 | A | 12/1996 | Piechowiak et al. | |
| 5,580,310 | A | 12/1996 | Orus et al. | 463/16 |
| 5,586,936 | A | 12/1996 | Bennett | |
| 5,586,937 | A | 12/1996 | Menashe | |
| 5,603,659 | A | 2/1997 | Okada | |
| 5,611,730 | A | 3/1997 | Weiss | 463/20 |
| 5,635,696 | A | 6/1997 | Dabrowski | |
| 5,645,486 | A | 7/1997 | Nagao et al. | |
| 5,651,057 | A | 7/1997 | Blood et al. | |
| 5,655,961 | A | 8/1997 | Acres et al. | |
| 5,668,950 | A | 9/1997 | Kikuchi | 395/200.47 |
| 5,674,128 | A | 10/1997 | Holch et al. | 463/42 |
| 5,702,304 | A | 12/1997 | Acres et al. | 463/29 |
| 5,722,891 | A | 3/1998 | Inoue | 463/20 |
| 5,741,183 | A | 4/1998 | Acres et al. | 463/42 |
| 5,743,523 | A | 4/1998 | Kelly et al. | 273/138.1 |
| 5,752,882 | A | 5/1998 | Acres et al. | 463/42 |
| 5,758,875 | A | 6/1998 | Giacalone, Jr. | 273/143 R |
| 5,759,102 | A | 6/1998 | Pease et al. | |
| 5,761,647 | A | 6/1998 | Boushy | 705/10 |
| 5,766,076 | A | 6/1998 | Pease et al. | 463/27 |
| 5,770,533 | A | 6/1998 | Franchi | 463/42 |
| 5,772,509 | A | 6/1998 | Weiss | |
| RE35,864 | E | 7/1998 | Weingardt | 463/28 |
| 5,800,269 | A | 9/1998 | Holch et al. | |
| 5,811,772 | A | 9/1998 | Lucero | 235/380 |
| 5,816,917 | A | 10/1998 | Kelmer et al. | 463/16 |
| 5,816,918 | A | 10/1998 | Kelly et al. | 463/16 |
| 5,820,459 | A | 10/1998 | Acres et al. | 463/25 |
| 5,833,540 | A | 11/1998 | Miodunski et al. | 463/42 |
| 5,836,817 | A | 11/1998 | Acres et al. | 463/26 |
| 5,836,818 | A | 11/1998 | Jones et al. | |

| | | | | |
|---|---|---|---|---|
| 5,839,956 | A | 11/1998 | Takemoto | 463/25 |
| 5,848,932 | A | 12/1998 | Adams et al. | |
| 5,851,148 | A | 12/1998 | Brune et al. | 463/25 |
| 5,851,149 | A | 12/1998 | Xidos et al. | 463/42 |
| 5,852,306 | A | 12/1998 | Forbes | |
| 5,854,542 | A | 12/1998 | Forbes | 315/291 |
| 5,876,284 | A | 3/1999 | Acres et al. | |
| 5,902,983 | A | 5/1999 | Crevelt et al. | 235/380 |
| 5,917,725 | A | 6/1999 | Thacher | |
| 5,919,091 | A | 7/1999 | Bell et al. | 463/25 |
| 6,012,982 | A | 1/2000 | Piechowiak et al. | |
| 6,039,648 | A | 3/2000 | Guinn et al. | 463/16 |
| 6,048,269 | A | 4/2000 | Burns et al. | 463/25 |
| 6,077,162 | A | 6/2000 | Weiss | 463/26 |
| 6,146,270 | A | 11/2000 | Huard et al. | 463/12 |
| 6,162,122 | A | 12/2000 | Acres et al. | 463/29 |
| 6,168,523 | B1 | 1/2001 | Piechowiak et al. | 463/26 |
| 6,193,608 | B1 | 2/2001 | Walker et al. | |
| 6,244,958 | B1 | 6/2001 | Acres et al. | |
| 6,254,483 | B1 | 7/2001 | Acres et al. | |
| 6,257,981 | B1 | 7/2001 | Acres et al. | |
| RE37,414 | E | 10/2001 | Harlick | |
| 6,312,333 | B1 | 11/2001 | Acres et al. | |
| 6,319,125 | B1 | 11/2001 | Acres et al. | |
| 6,364,768 | B1 | 4/2002 | Acres et al. | |
| 6,375,567 | B1 | 4/2002 | Acres | |
| 6,375,569 | B1 | 4/2002 | Acres et al. | |
| 6,431,983 | B2 | 8/2002 | Acres et al. | |
| RE37,885 | E | 10/2002 | Acres et al. | 463/42 |
| 6,565,434 | B1 | 5/2003 | Acres et al. | |
| 6,607,441 | B1 | 8/2003 | Acres et al. | |
| 6,800,030 | B2 | 10/2004 | Acres | |
| 6,832,958 | B2 | 12/2004 | Acres et al. | 463/25 |
| 6,910,964 | B2 | 6/2005 | Acres et al. | |
| RE38,812 | E | 10/2005 | Acres et al. | 463/26 |
| 6,984,173 | B1 | 1/2006 | Piechowiak et al. | 463/20 |
| 7,749,077 | B2 | 7/2010 | Acres et al. | |
| 7,798,899 | B2 | 9/2010 | Acres | |
| 2001/0055990 | A1 | 12/2001 | Acres et al. | |
| 2002/0058546 | A2 | 5/2002 | Acres | |
| 2003/0228904 | A1 | 12/2003 | Acres et al. | |
| 2005/0032573 | A1 | 2/2005 | Acres et al. | |
| 2005/0209005 | A1 | 9/2005 | Acres et al. | |
| 2006/0172804 | A1 | 8/2006 | Acres et al. | |
| 2006/0183529 | A1 | 8/2006 | Acres et al. | |
| 2007/0032301 | A1 | 2/2007 | Acres et al. | |

FOREIGN PATENT DOCUMENTS

| | | | | |
|---|---|---|---|---|
| AU | 39363/78 | | 3/1980 | |
| AU | 66683/81 | | 8/1981 | |
| AU | B-27572/84 | | 8/1984 | |
| AU | 542455 | | 10/1984 | |
| AU | B 27572/84 | | 11/1984 | |
| AU | 589158 | | 8/1986 | |
| AU | B 53370/86 | | 8/1986 | |
| AU | B-53370/86 | | 8/1986 | |
| AU | 555905 | | 10/1986 | |
| AU | 593059 | | 8/1987 | |
| AU | 567001 | | 11/1987 | |
| AU | 585160 | | 1/1988 | |
| AU | 628330 | | 11/1989 | |
| AU | 630112 | | 3/1990 | |
| AU | 649009 | | 8/1991 | |
| AU | B 71194/91 | | 8/1991 | |
| AU | B-71194/91 | | 8/1991 | |
| AU | B-77519/91 | | 11/1991 | |
| AU | 647234 | | 7/1992 | |
| AU | B 10488/92 | | 7/1992 | |
| AU | 655801 | | 9/1992 | |
| AU | B 13023/92 | | 9/1992 | |
| AU | 2020986 | | 1/1993 | 273/434 |
| AU | 2020986 | B * | 1/1993 | |
| AU | 199220986 | | 1/1993 | |
| AU | B 20986/92 | | 1/1993 | |
| AU | 668248 | | 7/1994 | |
| AU | 680920 | | 8/1995 | |
| AU | 21618/95 | | 1/1996 | |
| AU | 702021 | | 1/1996 | |
| AU | 686824 | | 2/1998 | |
| AU | 722107 | | 5/1998 | |
| AU | A 48323/97 | | 6/1998 | |
| AU | 748263 | | 11/1998 | |
| AU | 728788 | | 7/1999 | |
| AU | 716421 | | 8/1999 | |
| AU | 716422 | | 8/1999 | |
| AU | 716547 | | 8/1999 | |
| AU | 716548 | | 8/1999 | |
| AU | 63152/99 | | 12/1999 | |
| AU | 697582 | | 4/2001 | |
| AU | 733963 | | 9/2001 | |
| AU | 766341 | | 1/2002 | |
| AU | 75444 | | 3/2003 | |
| AU | 757903 | | 6/2003 | |
| AU | 2006203564 | | 8/2006 | |
| AU | 2006203638 | | 9/2006 | |
| AU | 2003200581 | | 11/2006 | |
| AU | 2007200572 | | 2/2007 | |
| AU | 2007201195 | | 3/2007 | |
| AU | 2002317546 | | 5/2007 | |
| AU | 2003204730 | | 6/2007 | |
| CA | 2443301 | | 4/1998 | |
| DE | 3415114 | | 10/1985 | |
| EP | 0 342 797 | | 11/1989 | |
| EP | 0420586 | | 4/1991 | |
| EP | 0 444 932 | | 10/1995 | |
| EP | 0770415 | | 5/1997 | |
| EP | 0805424 | | 11/1997 | |
| GB | 1242298 | | 8/1971 | |
| GB | 1284898 | | 8/1972 | |
| GB | 2083936 | | 3/1982 | |
| GB | 2099198 | | 12/1982 | |
| GB | 2 139 390 | | 11/1984 | |
| GB | 2 147 773 | | 5/1985 | |
| GB | 2 148 135 | | 5/1985 | |
| GB | 2 151 054 | A | 7/1985 | |
| GB | 2153572 | | 8/1985 | |
| GB | 2169737 | | 7/1986 | |
| GB | 2180087 | | 3/1987 | |
| GB | 2191030 | | 12/1987 | |
| GB | 2 211 975 | A | 7/1989 | |
| GB | 2211975 | | 7/1989 | |
| GB | 2230373 | | 10/1990 | |
| GB | 2262642 | | 6/1993 | |
| GB | 2211975 | | 7/1993 | 273/138 A |
| JP | 62269548 | | 11/1987 | |
| JP | 62275372 | | 11/1987 | |
| JP | 5184709 | | 7/1993 | |
| JP | 6079055 | | 3/1994 | |
| JP | 6246068 | | 9/1994 | |
| JP | 6335560 | | 12/1994 | |
| WO | WO 80/02512 | | 11/1980 | |
| WO | WO 94/12256 | | 6/1994 | |
| WO | WO 95/22811 | | 8/1995 | |
| WO | WO 95/30944 | | 11/1995 | |
| WO | WO 96/08295 | | 3/1996 | |
| WO | WO 96/12262 | | 4/1996 | |
| WO | WO 98/35309 | | 8/1998 | |
| WO | WO 98/40140 | | 9/1998 | |
| ZA | 99/3643 | | 1/1999 | |
| ZA | 98/3158 | | 10/1999 | |

OTHER PUBLICATIONS

Expert Report of Michael J. Bennett Pursuant to Fed. R. Civ. P. 26(A(2) (*sic*), Feb. 1999.

Expert Report of Michael J. Bennett Pursuant to Fed. R. Civ. P. 26(A)(2), Jul. 1999.

Expert Witness Report of Leroy A. Prohofsky, Feb. 1999.

Expert Witness Report of Leroy A. Prohofsky, Jun. 1999.

Supplement to Expert Witness Reports of Leroy A. Prohofsky, Jun. 1999.

Second Supplement to Expert Witness Reports of Leroy A. Prohofsky, Sep. 1999.

Rebuttal Statement by Expert Witness William K. Bertram, Ph.D., Mar. 1999.

Rebuttal Statement by Expert Witness John F. Acres, Jul. 1999.

Rebuttal Statement by Expert Witness William K. Bertram, Ph.D., Jul. 1999.

Expert Witness Report of R. Franklin Burnett, Jun. 1999.
Rebuttal Statement by Expert Witness Thomas F. Smegal, Jr., Jul. 1999.
Campbell, R., Computa Game—Equipment Manual, Revision 1, Sep. 1990.
Davies, C et al., Compute Game—The Software Manual, Revision 3, Jul. 1991.
Aristocrat Buyer's Guide with ACES A, 2 pp. (Mar.-May 1989).
Aristocrat IDS dated Mar. 8, 2005, filed in U.S. Appl. No. 09/462,717, and referring to Surprize Gaming Machine.
Surprize Gaming Machine Advertisement, Aristocrat Leisure Industries, Australia.
"Surprize Software Specification for MV2030—var 01", Aristocrat Leisure Industries, Australia.
Aristocrat, "Catalogue of Champions," 4 pgs. (1990).
"FAST BUCK Systems Manual," 52 pgs. (available to Mirage shift supervisors at least as early as May 30, 1990).
Deposition of Derell M. Jones and Exhibits 618, 619 & 620.
Deposition of John F. Acres and Exhibits 706 (color copies), 709 & 715.
Acres' Reponses to CDS' Proposed Findings of Fact Regarding CDS' Motion for Summary Judgment of Invalidity of U.S. Patent No. 5,752,882 (On-Sale Bar) [Filed *Under Seal*—Subject to Protective Order].
CDS' Reply Memorandum in Support of CDS' Motion for Summary Judgment of Invalidity of U.S. Patent No. 5,752,882 (On-Sale Bar) [Filed.
Acres Gaming's Opposition to CDS' Motion for Summary Judgment of Invalidity of U.S. Patent No. 5,752,882 (On-Sale Bar) [Filed *Under Seal*—Subject to Protective Order].
Acres' Responses to Proposed Findings of Fact of Casino Data Systems Regarding CDS' Motion for Summary Judgment of Invalidity of US Patent No. 5,836,817 (On-Sale Bar) [Filed *Under Seal*—Subject to Protective Order].
CDS' Reply Memorandum in Support of CDS' Motion for Summary Judgment of Invalidity of US Patent No. 5,836,817 (On-Sale Bar) [Filed *Under Seal*—Subject to Protective Order].
Proposed Findings of Fact in Support of CDS' Memorandum of Points and Authorities in Support of CDS' Third Motion for Summary Judgment of Invalidity of US Patent No. 5,836,817 (On-Sale Bar) [Filed *Under Seal*—Subject to Protective Order].
CDS' Motion and Memorandum of Point and Authorities in Support of CDS' Motion for Summary Judgment of Invalidity of US Patent No. 5,836,817 (On-Sale Bar) [Filed *Under Seal*—Subject to Protective Order].
Acres Gaming's Opposition to CDS' Motion for Summary Judgment of Invalidity of US Patent No. 5,836,817 (On-Sale Bar) [Filed *Under Seal*—Subject to Protective Order].
Exhibits in Support of CDS' Memorandum of Point and Authorities in Support of CDS' Motion for Summary Judgment of Invalidity of US Patent No. 5,836,817 (On-Sale Bar) [Filed *Under Seal*—Subject to Protective Order].
Jan. 1993 Product Catalog (Mikohn).
1989 Mikohn Super Controller Manual.
Casino Data Systems and Sunset Station Hotel & Casino's ("CDS") Motion for Summary Judgment of Invalidity of U.S. Patent No. 5,752,882.
CDS' Memorandum of Points and Authorities in Support of CDS' Motion for Summary Judgment of Invalidity of U.S. Patent No. 5,752,882 [Filed *In Camera*—Subject to Protective Order].
CDS' Supplemental Brief Regarding CDS' First Motion for Summary Judgment of Invalidity.
CDS' Reply Memorandum in Support of CDS' Motion for Summary Judgment of Invalidity of U.S. Patent 5,752,882.
Casino Data Systems and Sunset Hotel & Casino's Evidence in Support of CDS' Motion for Summary Judgment of Invalidity and Opposition to Acres' Motion for Preliminary Injunction ("CDS Exhibits") [Filed *In Camera*—Subject to Protective Order], including Exhibit T, of Acres Gaming Incorporated Form SB-2 filed with the Securities and Exchange Commission on Sep. 20, 1993.
Acres' Response to the Proposed Findings of Fact of Casino Data Systems Regarding CDS' Motion for Summary Judgment of Invalidity.
Acres Gaming, Inc.'s Opposition to Casino Data Systems' and Sunset Station Hotel and Casino's Motion for Summary Judgment.
Acres Gaming, Inc.'s Supplement to its Opposition to Casino Data Systems' and Sunset Station Hotel and Casino's Motion for Summary Judgment.
Acres Gaming, Inc.'s Second Supplement to its Opposition to Casino Data Systems' and Sunset Station Hotel and Casino's Motion for Summary Judgment.
Acres Gaming, Inc.'s Third Supplement to its Opposition to Casino Data System's and Sunset Station Hotel and Casino's Motion for Summary Judgment.
Expert Report of W. Alan Jorgensen Pursuant to Federal Rule of Civil Procedure 26(a)(2).
Expert Report of Samuel Wolff Pursuant to Federal Rule of Civil Procedure 26(a)(2).
Transcript of Motion for Summary Judgment of Invalidity of U.S. Patent No. 5,752,882 Before the Honorable Howard D. McKibben on Jan. 19, 1999.
Deposition of Disclosure, Inc. And Exhibits.
Additional Exhibits to deposition of Disclosure, Inc.
CDS' Third Motion and Memorandum of Points and Authorities in Support of CDS' Motion for Summary Judgment of Invalidity of U.S. Patent No. 5,752,882 (On-Sale Bar).
Exihibits in Support of CDS' Third Motion and Memorandum of Points and Authorities in Support of CDS' Motion for Summary Judgment of Invalidity of U.S. Patent No. 5,752,882 (On-Sale Bar).
Acres Gaming's Opposition to CDS's Third Motion for Summary Judgment of Invalidity of U.S. Patent No. 5,752,882 (On-Sale Bar).
Deposition of Jose Vega Dated Jan. 25, 1999 with Exhibit Nos. 191, 193, 194, 195, 197, 198.
CDS Motion and Memorandum of Points and Authorities in Support of CDS' Motion for Summary Judgment of Invalidity of US Patent No. 5,752,882 (On-Sale Bar) [Filed *Under Seal*—Subject to Protective Order].
Proposed Findings of Facts in Support of CDS' Memorandum of Points and Authorities in Support of CDS' Third Motion for Summary Judgment of Invalidity of U.S. Patent No. 5,752,882 (On-Sale Bar) [Filed *Under Seal*—Subject to Protective Order].
Exhibits in Support of CDS' Motion and Memorandum of Points and Authorities in Support of CDS' Motion for Summary Judgment of Invalidity of U.S. Patent No. 5,752,882 (On-Sale Bar), with Affidavit of Gregory C. Schodde [Filed *Under Seal*—Subject to Protective Order].
R. Stäuble, MPL 4215 Interface, Oct. 1991, pp. 1-16.
BYTE, Hardware/Software Showcase, Dec. 1992, p. 308.
Inder S. Gopal and Adrian Segall, IEEE Transactions on Communications, "Dynamic Address Assignment in Broadcast Networks," Jan. 1986, vol. Com-34, No. 1, pp. 32-37.
Fred Swainston, A Systems Approach to Programmable Controllers, 1992, pp. ix-226.
Bueschel, *Lemons, Cherries and Bell-Fruit-Gum,* 346 pp. (Royal Bell Books, Nov. 1995).
"Clubs Now Have a Sporting Chance," (including Aristocrat insert), *Slotworld Magazine,* vol. 5, No. 6, pp. 16-17 (Jun. 1992).
Information Disclosure Statement and Form 1449 submitted by Aristocrat Leisure Industries Pty Ltd. on Apr. 16, 2007, in U.S. Appl. No. 11/365,007.
Information Disclosure Statement and Form 1449 submitted by Aristocrat Leisure Industries Pty Ltd. on Apr. 16, 2007, in U.S. Appl. No. 11/365,177.
Information Disclosure Statement and Form 1449 submitted by Aristocrat Leisure Industries Pty Ltd. on Apr. 16, 2007, in U.S. Appl. No. 11/445,969.
Exhibit A cited in Information Disclosure Statements dated Apr. 16, 2007, submitted in U.S. Appl. Nos. 11/365,007, 11/365,177, and 11/445,969, entitled "Documents related to the Surprize game".
Exhibit B cited in Information Disclosure Statements dated Apr. 16, 2007, submitted in U.S. Appl. Nos. 11/365,007, 11/365,177, and 11/445,969, entitled "Documents related to the Surprize (MV2030) game".
Exhibit C cited in Information Disclosure Statements dated Apr. 16, 2007, submitted in U.S. Appl. Nos. 11/365,007, 11/365,177, and 11/445,969, entitled "Documents related to the Fast Buck game".

Exhibit E cited in Information Disclosure Statements dated Apr. 16, 2007, submitted in U.S. Appl. Nos. 11/365,007, 11/365,177, and 11/445,969, entitled "Documents related to the ACES game".
Exhibit F cited in Information Disclosure Statements dated Apr. 16, 2007, submitted in U.S. Appl. Nos. 11/365,007, 11/365,177, and 11/445,969, entitled "Documents related to the Best-and-Fairest game".
Exhibit G cited in Information Disclosure Statements dated Apr. 16, 2007, submitted in U.S. Appl. Nos. 11/365,007, 11/365,177, and 11/445,969, entitled "Documents related to the Cricketer game".
Fey, *Slot Machines: A Pictorial History of the First 100 Years,* Fourth Edition, 261 pp. (1994).
US Office Action dated Dec. 8, 2008 issued in U.S. Appl. No. 11/118,163.
US Office Action dated Aug. 30, 2000 issued in U.S. Appl. No. 09/425,544 (6565434).
US Office Action Interview Summary dated Aug. 28, 2002 issued in U.S. Appl. No. 09/425,544 (6565434).
US Notice of Allowability and Allowable Claims dated Sep. 9, 2002 in U.S. Appl. No. 09/425,544 (6565434).
US Notice of Allowance dated Sep. 17, 2002 in U.S. Appl. No. 09/425,544 (6565434).
Australian Office Action dated Feb. 22, 1996 issued in AU27192/95 (AU686824).
Australian Notice of Acceptance dated Jul. 20, 2006 issued in AU2003200581.
Australian Notice of Acceptance dated Feb. 8, 2007 issued in AU2003204730.
Australian Office Action dated Jul. 2, 1999 issued in AU24977/99.
Australian Office Action dated Jul. 2, 1999 issued in AU24978/99.
Australian Office Action dated Jul. 2, 1999 issued in AU24979/99.
Australian Office Action dated Jul. 2, 1999 issued in AU24981/99.
Australian Office Action dated May 26, 2008 issued in 2007200572.
Australian Notice of Opposition re Aristocrat dated May 11, 1998 filed in Application No. AU 27192/95 (now Pat No. AU686824).
Australian Notice of Opposition re Mikohn dated May 12, 1998 filed in Application No. Au 27192/95 (now Pat No. AU686824).
Australian Statement of Grounds and Particulars in Support of Opposition by Aristocrat Leisure Industries dated Aug. 11, 1998 filed in Application No. AU27192/95 (now Pat No. AU686824).
Australian Statement of Grounds and Particulars in Support of Opposition by Mikohn Gaming dated Aug. 12, 1998 filed in Application No. AU27192/95 (now Pat No. AU686824)).
Australian Decision on Opposition dated Nov. 14, 2001 issued in Application No. AU27192/95 (now Pat No. AU686824).
Australian Notice of Opposition by Aristocrat Leisure Industries dated Jan. 8, 1999 filed in Patent Acceptance No. AU697582 (App. No. AU19970048478).
Australian Statement of Grounds and Particulars in Support of Opposition by Aristocrat Leisure Industries dated Apr. 7, 1999 filed in Patent Acceptance No. AU697582 (App. No. AU19970048478).
Australian Notice of Withdrawal of Opposition by Aristocrat Leisure Industries dated Oct. 18, 1999 filed in Patent Acceptance No. A11697582 (App. No. AU19970048478).
Australian Notice of Opposition by Aristocrat Leisure Industries dated Dec. 24, 2002 filed in Patent Acceptance No. AU752636 (App. No. AU19990063152).
Australian Statement of Grounds and Particulars in Support of Opposition by Aristocrat Leisure Industries dated Mar. 24, 2003 filed in Patent Acceptance No. AU752636 (App. No. AU19990063152).
Australian Notice of Assertion of Invalidity by Aristocrat Technologies dated Oct. 5, 2007 filed in Patent Application No. AU2007201195.
Notice of Allowance dated Oct. 24, 2008 issued in U.S. Appl. No. 09/878,111.
Notice of Allowance dated Apr. 10, 2009 issued in U.S. Appl. No. 09/878,111.
US Office Action Final dated Feb. 13, 2008 issued in U.S. Appl. No. 10/932,615.
US Office Action dated Feb. 13, 2009 issued in U.S. Appl. No. 11/380,895.
US Office Action Final dated May 11, 2009 issued in U.S. Appl. No. 11/380,879.
US Office Action dated Jul. 14, 2008 issued in U.S. Appl. No. 10/932,615.
Request for Inter Partes Reexamination filed by party in interest, Bally Technologies, Inc., dated Jul. 17, 2007 filed in U.S. Appl. No. 95/000,279.
Order Granting Request for Inter Partes Reexamination of USP 6,832,958 [filed by Bally Technologies, Inc.]; issued in U.S. Appl. No. 95/000,279 dated Sep. 21, 2007; 17 pgs.
Action Closing Prosecution issued in U.S. Appl. No. 95/000,279 [reexamination] on Sep. 21, 2007, 10 pgs.
Third Party Requestor [Bally Technologies, Inc.] Appeal Brief in Inter Partes Reexamination filed in U.S. Appl. No. 95/000,279 on Jul. 14, 2008, 34 pgs.
Respondent's Brief in Inter Partes Reexamination Under 37 CFR 41.68 dated Aug. 11, 2008 filed in U.S. Appl. No. 95/000,279 [reexamination], 19 pgs.
Third Party Requestor [Bally Technologies, Inc.] Appeal Brief in Inter Partes Reexamination filed in U.S. Appl. No. 95/000,279 on Apr. 1, 2009, 37 pgs.
Third Party Requestor [Bally Technologies, Inc.] *Corrected* Appeal Brief in Inter Partes Reexamination (w/attachments) filed in U.S. Appl. No. 95/000,279 on Apr. 1, 2009, 37 pgs.
Related Proceedings to Appeal Brief of Third Party Requestor [Bally Technologies, Inc.] in Inter Partes Reexamination [U.S. Appl. No. 95/000,279]: "*Plaintiff IGT's Memorandum in Support of Its Motion for a Preliminary Injunction*," U.S. District Court, Delaware, Case No. 06-282, Confidential, Filed Under Seal, dated Oct. 31, 2006, 45 pgs.
Related Proceedings to Appeal Brief of Third Party Requestor [Bally Technologies, Inc.] in Inter Partes Reexamination [U.S. Appl. No. 95/000,279]: "*Declaration of Bart A. Lewin in Support of Plaintiff IGT's Motion for Preliminary Injunction*," U.S. District Court, Delaware, Case No. 06-282, dated Oct. 30, 2006, 42 pgs.
Related Proceedings to Appeal Brief of Third Party Requestor [Bally Technologies, Inc.] in Inter Partes Reexamination [U.S. Appl. No. 95/000,279]: "*Report & Recommendation* (*Findings of Fact 7 Conclusions of Law Re: Claim Construction*)," *Mikohn Gaming Corp.* v. *Acres Gaming, Inc.* etc., U.S. District Court Nevada, Case No. CV-S-97-1383, dated May 24, 2000, 51 pgs.
Related Proceedings to Appeal Brief of Third Party Requestor [Bally Technologies, Inc.] in Inter Partes Reexamination [U.S. Appl. No. 95/000,279]: "*Order and Decision re Report & Recommendation* (*Findings of Fact 7 Conclusions of Law Re: Claim Construction*)," *Mikohn Gaming Corp.* v. *Acres Gaming, Inc. etc.,* U.S. District Court Nevada, Case No. CV-S-97-1383, dated Jul. 27, 2000, 23 pgs.
Australia/New Zealand Gaming Machine Standards, Revision 1.0, 127 pages, (Dec. 1997).
U.S. Appl. No. 09/373,034, filed Aug. 11, 1999, Acres et al.
U.S. Appl. No. 09/572,749, filed May 16, 2000, Acres et al.
Australian Office Action dated Apr. 17, 2001 issued in AU61905-98.
Australian Office Action dated Dec. 15, 2000 issued in AU63152-99.
US Office Action dated Aug. 14, 1996 issued in U.S. Appl. No. 08/467,793 (5820459).
US Office Action Final dated Jun. 9, 1997 issued in U.S. Appl. No. 08/467,793 (5820459).
Notice of Allowance dated Feb. 17, 1998 issued in U.S. Appl. No. 08/467,793 (5820459).
US Office Action dated Apr. 17, 2003 issued in U.S. Appl. No. 09/572,749.
US Office Action dated Jan. 13, 2004 issued in U.S. Appl. No. 09/572,749.
US Office Action Final dated Jun. 30, 2005 issued in U.S. Appl. No. 09/572,749.
US Office Action dated Mar. 31, 2006 issued in U.S. Appl. No. 09/572,749.
Notice of Allowance dated May 1, 2008 issued in U.S. Appl. No. 09/878,111.
US Office Action dated Apr. 2, 2008 issued in U.S. Appl. No. 11/118,163.
Notice of Allowance dated May 6, 2002 issued in U.S. Appl. No. 09/573,470.
US Office Action dated Mar. 17, 2008 issued in U.S. Appl. No. 11/380,895.

US Office Action dated Apr. 25, 2008 issued in U.S. Appl. No. 11/580,667.
US Office Action—Final dated Jan. 6, 2005 issued in U.S. Appl. Nos. 90/006,655; 90/007,212.
Notice of Allowance dated Jul. 11, 2008 issued in U.S. Appl. No. 09/827,870.
US Office Action dated Jun. 28, 2005 issued in U.S. Appl. Nos. 90/006,655; 90/007,212.
GRIPS International, "Integrated Real Time On-Line Slot System—SDI" (website reported as archived Feb. 20, 1997) (available at http://web.archive.org/web/19970220165559/ www.grips.com/sdi.htm).
GRIPS International, "PEM—Precision Electronic Meter" (website reported as archived Feb. 20, 1997) (available at http://web.archive.org/web/19970220165753/www.grips.com/pem.htm).
GRIPS International, "Player Tracking on Slots" (website reported as archived Feb. 20, 1997) (available at http://web.archive.org/web/19970220165921/www.grips.com/playtrac.htm).
GRIPS International, "Wide Area Progressive Link System" (website reported as archived Feb. 20, 1997) (available at http://web.archive.org/web/19970220165457/www.grips.com/wap.htm).
*IGT's Infringement Contentions filed in IGT* v. *Bally Gaming International, Inc. et al.,* Civil Action No. 06-282 (SLR), U.S. District court for the District of Delaware.
ZWorld, Innovations in Control Technology, Guide to Control Products, 1999.
Australian Office Action dated Oct. 8, 2008 issued in AU2007201195.
Australian Office Action dated Jun. 15, 2009 issued in 2007200572.
Canadian Office Action dated Sep. 5, 2006 issued in CA2,443,301.
Canadian Office Action dated Oct. 16, 2002 issued in CA 2,234,681.
Canadian Office Action dated May 28, 2001 issued in CA 2,234,681.
US Notice of Allowance dated Oct. 24, 2008 issued in U.S. Appl. No. 09/878,111.
US Notice of Allowance dated Apr. 10, 2009 issued in U.S. Appl. No. 09/878,111.
US Notice of Allowance dated Nov. 2, 2009 issued in U.S. Appl. No. 09/878,111.
US Office Action—Examiner's Communication re IDS filed Oct. 31, 2008, mailed on Mar. 13, 2009 in reexam case No. 95/000,279.
US Office Action—Examiner's Communication re IDS filed on Jun. 9, 2009, mailed on Sep. 23, 2009 in reexam case No. 95/000,279.
US Notice of Allowance dated Mar. 31, 2009 issued in U.S. Appl. No. 09/827,870.
US Office Action Final dated Dec. 24, 2009 issued in U.S. Appl. No. 10/932,615.
US Office Action dated Nov. 23, 2009 issued in 11/118,163.
US Office Action Final dated Dec. 9, 2009 issued in U.S. Appl. No. 11/380,879.
US Office Action Final dated Dec. 30, 2009 issued in U.S. Appl. No. 11/380,895.
US Office Action dated Apr. 16, 2009 issued in U.S. Appl. No. 11/580,667.
Acres Gaming, Inc.'s Opposition to Casino Data Systems' and Sunset Station Hotel and Casino's Motion for Summary Judgment dated Oct. 5, 1998, 25 pages.
Acres Gaming, Inc.'s Second Supplement to its Opposition to Casino Data Systems' and Sunset Station Hotel and Casino's Motion for Summary Judgment (vol. II) dated Oct. 13, 1998, 4 pages.
Acres Gaming, Inc.'s Supplement to its Opposition to Casino Data Systems' and Sunset Station Hotel and Casino's Motion for Summary Judgment (vol. II) dated Oct. 8, 1998, 4 pgs.
Acres Gaming, Inc.'s Third Supplement to its Opposition to Casino Data System's and Sunset Station Hotel and Casino's Motion for Summary Judgment (vol. II)dated Oct. 14, 1998, 5 pges.
Acres Gaming's Opposition to CDS' Motion for Summary Judgment of Invalidity of U.S. Patent No. 5,752,882 (On-Sale Bar) [Filed *Under Seal*—Subject to Protective Order] dated Sep. 7, 1999, 33 pages.
Acres Gaming's Opposition to CDS' Motion for Summary Judgment of Invalidity of US Patent No. 5,836,817 (On-Sale Bar) [Filed *Under Seal*—Subject to Protective Order] dated Aug. 18, 1999, 33 pgs.
Acres' Reponses to CDS' Proposed Findings of Fact Regarding CDS' Motion for Summary Judgment of Invalidity of U.S. Patent No. 5,752,882 (On-Sale Bar) [Filed *Under Seal*—Subject to Protective Order] dated Sep. 7, 1999, 12 pages.
Acres' Response to the Proposed Findings of Fact of Casino Data Systems Regarding CDS' Motion for Summary Judgment of Invalidity (vol. II) dated Oct. 5, 1998, 15 pages.
Acres' Responses to Proposed Findings of Fact of Casino Data Systems Regarding CDS' Motion for Summary Judgment of Invalidity of US Patent No. 5,836,817 (On-Sale Bar) [Filed *Under Seal*—Subject to Protective Order] dated Aug. 18, 1999, 7 pages.
Deposition of Jose Vega dated Jan. 25, 1999 with Exhibit Nos. 191, 193, 194, 195, 197, 198 (vol. VII), 51 pgs.
Exhibit A of Bally's First Supplemental Responses to IGT's First Set of Interrogatories to Defendants (Nos. 1-3) filed in *IGT* v. *Bally Gaming International, Inc., et. al.,* Civil Action No. 06-282 (SLR), U.S. District Court for the District of Delaware, filed on Apr. 28, 2006, including documents dated Nov. 17, 1992 and Jul. 12, 1990, 8 pgs.
Exhibit B of Bally's First Supplemental Responses to IGT's First Set of Interrogatories to Defendants (Nos. 1-3) filed in *IGT* v. *Bally Gaming International, Inc., et. al.,* Civil Action No. 06-282 (SLR), U.S. District Court for the District of Delaware filed on Apr. 28, 2006, 3 pages.
Exhbit D of Bally's First Supplemental Response to IGT's First Set of Interrogotaries in Defendants (Nos. 1-3) file din *IGT* v. *Bally Gaming International, Inc., et al.,* Civil Action No. 06-282 (SLR), U.S. District Court for the District of Delaware filed on Apr. 28, 2006, 3 pages.
Exhibits in Support of CDS' Memorandum of Point and Authorities in Support of CDS' Motion for Summary Judgment of Invalidity of US Patent No. 5,836,817 (On-Sale Bar) [Filed *Under Seal*—Subject to Protective Order] Jul. 23, 1999, 319 pages.
Expert Report of Samuel Wolff Pursuant to Federal Rule of Civil Procedure 26(a)(2) (vol. III) dated Feb. 15, 1999.
Expert Report of W. Alan Jorgensen Pursuant to Federal Rule of Civil Procedure 26(a)(2) (vol. III) dated Feb. 13, 1999.
IGT/ACRES P289/AC001 Flowchart dated Jun. 5, 2006, 1 page.
IGT's Infringement Contentions filed in *IGT* v. *Bally Gaming International, Inc. et al.,* Civil Action No. 06-282 (SLR), U.S. District court for the District of Delaware filed on Apr. 28, 2006, 1 page.
Proposed Findings of Fact in Support of CDS' Memorandum of Points and Authorities in Support of CDS' Third Motion for Summary Judgment of Invalidity of US Patent No. 5,836,817 (On-Sale Bar) [Filed *Under Seal*—Subject to Protective Order] dated Jul. 23, 1999, 41 pages.
Notice of Allowance dated Sep. 8, 2008 issued in U.S. Appl. No. 10/932,615.
US Office Action dated Aug. 21, 1997 issued in U.S. Appl. No. 08/647,621 (now 5,876,284).
US Notice of Allowance dated Jun. 3, 1998 issued in U.S. Appl. No. 08/647,621 (now 5,876,284).
US Office Action dated Aug. 19, 2008 issued in U.S. Appl. No. 11/380,879.
Acres Gaming Incorporated Form SB-2 filed with the Securities and Exchange Commission on Sep. 20, 1993.
"Action Jackpot Brochure", Atronic Casino Technology (no date available).
Exhibit A of Bally's First Supplemental Responses to IGT's First Set of Interrogatories to Defendants (Nos. 1-3) filed in *IGT* v. *Bally Gaming International, Inc., et. al.,* Civil Action No. 06-282 (SLR), U.S. District Court for the District of Delaware.
Exhibit B of Bally's First Supplemental Responses to IGT's First Set of Interrogatories to Defendants (Nos. 1-3) filed in *IGT* v. *Bally Gaming International, Inc., et. al.,* Civil Action No. 06-282 (SLR), U.S. District Court for the District of Delaware.
Exhibit D cited in Information Disclosure Statements dated Apr. 16, 2007, submitted in U.S. Appl. Nos. 11/365,007, 11/365,177, and 11/445,969, entitled "Documents related to the DLSAR document".
Exhibit H cited in Information Disclosure Statements dated Apr. 16, 2007, submitted in U.S. Appl. Nos. 11/365,007, 11/365,177, and 11/445,969, entitled "Documents related to the Thrillions game".
Mikohn, Excerpt from, 1989 Super Controller Manual, Chapters 1-3 and 6-7, 207pp.

Mikohn, Excerpt from, Jan. 1993 Product Catalog, Chapters 1, 2, 6, 7, and 8, 64pp.
Australian Office Action dated May 31, 2010 issued in AU2007201195.
US Notice of Allowance dated May 10, 2010 issued in U.S. Appl. No. 09/878,111.
US Office Action—Examiner's Answer on Appeal dated Sep. 23, 2009 issued in Reexam case No. 95/000,279.
US Notice of Allowance and Examiner's Amendment dated Oct. 22, 2009 issued in U.S. Appl. No. 09/827,870.
US Office Action dated May 4, 2010 issued in U.S. Appl. No. 10/932,615.
US Office Action dated May 13, 2010 issued in U.S. Appl. No. 11/118,163.
US Office Action Final dated Jul. 12, 2010issued in 11/380,879.
US Office Action dated Apr. 29, 2010 issued in U.S. Appl. No. 11/380,895.
US Office Action dated Mar. 30, 2010 issued in U.S. Appl. No. 11/580,667.
US Office Notice of Allowance dated Nov. 28, 2011 issued in U.S. Appl. No. 10/932,615.
Related Proceedings—Third Party Requester Rebuttal Brief dated Oct. 19, 2009 re Examiner's Answer on Appeal, 12 pgs. [U.S. Appl. No. 95/000,279].
Transmittal of Communication to Third Party Requester Inter Partes Reexamination dated Dec. 7, 2009, 3 pgs. [U.S. Appl. No. 95/000,279].
Board of Appeals Docketing Notice dated Dec. 15, 2009, 3 pgs. [U.S. Appl. No. 95/000,279].
Before the Board of Patent Appeals and Interferences Decision dated Aug. 24, 2010, 16 pgs. [U.S. Appl. No. 95/000,279].
Notice of Intent to Issue Inter Partes Reexamination Certificate dated Nov. 18, 2010 issued in U.S. Appl. No. 95/000,279, 5 pgs.
Re-Examination Certificate Issued Mar. 1, 2011, 5 pgs. [U.S. Appl. No. 95/000,279].
US Supplemental Notice of Allowability dated Sep. 15, 2008 issued in U.S. Appl. No. 09/827,870.
US Office Action Final dated Sep. 17, 2010 issued in U.S. Appl. No. 10/932,615.
US Office Action dated Sep. 27, 1995 issued in U.S. Appl. No. 08/322,172.
US Final Office Action dated Apr. 25, 1996 issued in U.S. Appl. No. 08/322,172.
US Notice of Allowance dated Aug. 26, 1996 issued in U.S. Appl. No. 08/322,172.
US Office Action dated Aug. 16, 1996 issued in U.S. Appl. No. 08/465,717.
US Office Action dated Jun. 24, 19 U.S. Appl. No. 97 issued in 08/465,717.
US Office Action dated Apr. 14, 1998 issued in U.S. Appl. No. 08/465,717.
US Notice of Allowance dated Apr. 28, 1998 issued in U.S. Appl. No. 08/465,717.
US Office Action dated Sep. 26, 2003 issued in U.S. Appl. No. 09/574,632.
US Final Office Action dated May 5, 2004 issued in U.S. Appl. No. 09/574,632.
US Notice of Allowability and Examiner-Initiated Interview Summary dated Aug. 4, 2004 in U.S. Appl. No. 09/574,632.
US Notice of Allowance dated Oct. 29, 2004 in U.S. Appl. No. 09/574,632.
US Office Action dated Aug. 4, 1998 issued in U.S. Appl. No. 08/922,046.
US Notice of Allowance dated Mar. 29, 1999 issued in U.S. Appl. No. 08/922,046.
US Office Action dated Apr. 25, 2000 issued in U.S. Appl. No. 08/922,046.
US Notice of Allowance dated Jan. 16, 2001 issued in U.S. Appl. No. 08/922,046.
US Office Action (Restriction Requirement) dated Aug. 6, 2002 issued in U.S. Appl. No. 09/827,870.
US Office Action (Restriction Requirement) dated Jan. 29, 2003 issued in U.S. Appl. No. 09/827,870.
US Office Action dated Jan. 12, 2004 issued in U.S. Appl. No. 09/827,870.
US Office Action dated Nov. 5, 2003 issued in U.S. Appl. No. 10/443,685.
US Office Action Final dated Apr. 19, 2004 issued in U.S. Appl. No. 10/443,685.
US Notice of Allowance dated Jul. 22, 2004 issued in U.S. Appl. No. 10/443,685.
US Office Action dated Aug. 6, 2007 issued in U.S. Appl. No. 10/932,615.
US Office Action dated Mar. 12, 2007 issued in U.S. Appl. No. 10/932,615.
US Notice of Allowance dated Nov. 7, 2008 issued in U.S. Appl. No. 10/932,615.
US Notice of Allowance dated Mar. 11, 2009 issued in U.S. Appl. No. 10/932,615.
US Office Action dated Jul. 14, 2009 issued in U.S. Appl. No. 10/932,615.
US Allowed Claims dated Nov. 28, 2011 issued in U.S. Appl. No. 10/932,615.
US Office Action dated May 23, 2006 issued in U.S. Appl. No. 11/118,163.
US Final Office Action dated Mar. 5, 2007 issued in U.S. Appl. No. 11/118,163.
US Office Action dated Sep. 27, 2007 issued in U.S. Appl. No. 11/118,163.
US Office Action (Advisory) dated Jul. 10, 2007 issued in U.S. Appl. No. 11/118,163.
US Office Action dated Aug. 20, 1998 issued in U.S. Appl. No. 09/086,964.
US Office Action (Examiner Interview Summary) dated Apr. 14, 1999 issued in U.S. Appl. No. 09/086,964.
US Office Action dated May 11, 1999 issued in U.S. Appl. No. 09/086,964.
US Office Action dated Jul. 14, 2000 issued in U.S. Appl. No. 09/086,964.
US Notice of Allowance dated Nov. 17, 2000 in U.S. Appl. No. 09/086,964.
US Office Action dated Oct. 3, 2002 issued in U.S. Appl. No. 09/878,111.
US Final Office Action dated Jun. 26, 2003 issued in U.S. Appl. No. 09/878,111.
US Office Action (Examiner's Answer to Appeal Brief) dated Mar. 8, 2004 issued in U.S. Appl. No. 09/878,111.
US Notice of Allowance dated Mar. 2, 2006 in U.S. Appl. No. 09/878,111.
US Office Action dated Oct. 5, 2006 issued in U.S. Appl. No. 09/878,111.
US Office Action dated Apr. 30, 2007 issued in U.S. Appl. No. 09/878,111.
US Office Action dated Nov. 13, 2007 issued in U.S. Appl. No. 09/878,111.
US Office Action dated Aug. 22, 2011 issued in U.S. Appl. No. 11/824,467.
US Final Office Action dated Aug. 22, 2011 issued in U.S. Appl. No. 11/824,467.
US Office Action dated Aug. 13, 1996 issued in U.S. Appl. No. 08/465,915.
US Office Action dated Jun. 9, 1997 issued in U.S. Appl. No. 08/465,915.
US Notice of Allowance dated Jan. 5, 1998 in U.S. Appl. No. 08/465,915.
US Office Action dated Oct. 19, 2000 issued in U.S. Appl. No. 09/573,470.
US Office Action dated Jul. 31, 2001 issued in U.S. Appl. No. 09/573,470.
US Office Action dated Oct. 9, 2001 issued in U.S. Appl. No. 09/573,470.
US Office Action dated Apr. 17, 2002 issued in U.S. Appl. No. 09/573,470.
US Office Action dated Jan. 22, 1999 issued in U.S. Appl. No. 08/843,411.

US Office Action dated Aug. 25, 1999 issued in U.S. Appl. No. 08/843,411.
US Office Action dated Jul. 14, 2000 issued in U.S. Appl. No. 08/843,411.
US Notice of Allowance dated Mar. 9, 2001 issued in U.S. Appl. No. 08/843,411.
US Notice of Allowance dated Mar. 21, 2001 issued in U.S. Appl. No. 08/843,411.
US Office Action dated Jan. 7, 2004 issued in U.S. Appl. No. 10/366,036.
US Final Office Action dated Jul. 21, 2004 issued in U.S. Appl. No. 10/366,036.
US Notice of Allowance dated Feb. 25, 2005 issued in U.S. Appl. No. 10/366,036.
US Final Office Action dated Sep. 18, 1996 issued in U.S. Appl. No. 08,467,072.
US Notice of Allowance dated Jun. 10, 1997 issued in U.S. Appl. No. 08,467,072.
US Office Action dated Mar. 18, 1999 issued in U.S. Appl. No. 08/998,285.
US Office Action dated Dec. 10, 1999 issued in U.S. Appl. No. 08/998,285.
US Notice of Allowance dated Jun. 29, 2000 issued in U.S. Appl. No. 08/998,285.
US Office Action dated Aug. 13, 1996 issued in U.S. Appl. No. 08/465,942.
US Final Office Action dated Jun. 9, 1997 issued in U.S. Appl. No. 08/465,942.
US Notice of Allowance dated Nov. 19, 1997 issued in U.S. Appl. No. 08/465,942.
US Final Office Action dated Sep. 29, 2006 issued in U.S. Re-Exam U.S. Appl. No. 90/006,655; U.S. Appl. No. 90/007,212.
Australian Office Action dated Jul. 10, 1998 issued in Ser. No. AU48478-97.
Australian Office Action dated Nov. 23, 2004 issued in AU 2002317546.
Australian Office Action dated Dec. 14, 2000 issued in AU 32346/99.
Australian Office Action dated Sep. 11, 2002 issued in AU 32346/99.
Australian Office Action dated Oct. 22, 2004 issued in AU 2003200581.
Australian Office Action dated May 10, 2005 issued in 2003204730.
Canadian Office Action dated Dec. 7, 2001 issued in CA 2,272,499.
Canadian Office Action dated Dec. 30, 2003 issued in CA 2,442,444.
Canadian Office Action dated Jul. 20, 2004 issued in CA 2,442,444.
Canadian Office Action dated Jan. 26, 2004 issued in CA 2,442,442.
Canadian Office Action dated Jun. 7, 2004 issued in CA 2,442,442.
Canadian Office Action dated Jun. 10, 2005 issued in CA 2,442,442.
Canadian Office Action dated Aug. 31, 2004 issued in CA 2,443,301.
Canadian Office Action dated Aug. 29, 2005 issued in CA 2,443,301.
New Zealand Office Action dated May 22, 1998 issued in 330189.
New Zealand Office Action dated Mar. 8, 1999 issued in 330189.

* cited by examiner

METHOD FOR OPERATING NETWORKED GAMING DEVICES

Matter enclosed in heavy brackets [ ] appears in the original patent but forms no part of this reissue specification; matter printed in italics indicates the additions made by reissue.

BACKGROUND OF THE INVENTION

This invention relates generally to gaming devices, and more particularly to a method and apparatus for controlling gaming devices interconnected by a computer network.

Networked gaming devices are know in the art. Interconnecting a plurality of gaming devices such as slot machines via a computer network to a central computer provides many advantages. The primary advantage of networked gaming devices is the ability to extract accounting data from the individual gaming devices as well as providing player tracking. An example of a data collection system is described in U.S. Pat. No. 4,283,709 issued to Lucero et al. Network systems such as described in Lucero et al. allow the central host computer to monitor the usage and payout, collectively known as audit data, of the individual gaming devices. This audit data includes data related to the number of coins or tokens inserted into the device, the number of times the device has been played, the amount paid in raises, the number and the type of jackpots paid by the machine, the number of door openings, etc. The host computer can then compile an accounting report based on the audit data from each of the individual gaming devices. This report can then be used by management, for example, to assess the profitability of the individual gaming devices.

Player tracking, as the name indicates, involves tracking individual player usage of gaming devices. In prior art player tracking systems, the player is issued a player identification card which has encoded thereon a player identification number that uniquely identifies the player. The individual gaming devices are fitted with a card reader, into which the player inserts a player tracking card prior to playing the associated gaming device. The card reader reads the player identification number off the card and informs a central computer connected thereto of the player's subsequent gaming activity. By tracking the individual players, individual player usage can be monitored by associating certain of the audit data with the player identification numbers. This allows gaming establishments to target individual players with direct marketing techniques according to the individual's usage.

One problem that can occur with current player tracking systems is that the player can insert a player identification card incorrectly unbeknownst to the player. Currently, if a player inserts a player identification card improperly into the card reader, a message appears on a display located away from the card reader. Unfortunately, the player may not be looking at the display while inserting the card. As a result, the player may not see the message on the display. Another prior art approach has been to provide a light emitting diode on the gaming device to indicate to the player the status of the card insertion. This too has been ineffective because the player may not know the purpose of the LED or the LED may be drowned out by all the other lights of the casino. The player may therefore commence playing with the card improperly inserted. In this case, both the player and the casino lose valuable player tracking information. This is frustrating for the player because his activity will not be credited to his account and frustrating for the casino because the casino's records will be incomplete. Accordingly, a need remains for an improved method and apparatus for informing the player when a player tracking card has been improperly inserted.

The full power of networked gaming devices has not been completely realized. Although the audit data indicates which devices are being under utilized and when, there is currently no automated method for altering under utilized gaming devices' configurations to make them more attractive to play. For example, during certain hours of the day, e.g. four to six a.m., the audit data may indicate that the machines are being under utilized. Thus, it would be desirable to reconfigure the under utilized gaming devices to provide an additional incentive to players to use these devices. In the past casinos have run "bonuses" during these times. An example of such bonuses include a "double jackpot" wherein a player hitting a jackpot is paid double the jackpot amount. Currently this is implemented by having an attendant manually payout the additional payout amount. This manual technique, however, is cumbersome and inefficient to administer because an attendant must be constantly supervising the bonusing gaming devices. Accordingly, a need remains for an automated method and apparatus to provide bonusing for gaming devices.

Another limitation of the current bonusing systems is that only predetermined machines are eligible for the bonusing. For example, in a progressive bonusing machine a plurality of machines are connected together to form a bank. Only the machines in the bank are then eligible to win the progressive jackpot. Thus, a casino must dedicate a certain number of its machines to these banks. This limits the casino's flexibility in tailoring its bonusing to the number and make-up of its customers. Accordingly, a need remains for a more flexible bonusing system whereby any of the casino's machines can participate in the bonusing.

SUMMARY OF THE INVENTION

It is, therefore, an object of the invention to reconfigure gaming devices remotely over a network to provide bonusing.

Another object of the invention is to provide an integrated system usable with a variety of gaming devices made by different manufacturers.

Another object of the invention is to integrate player tracking, data collection, and bonusing over the same network.

A further object of the invention is to provide visual feedback to the user when a player tracking card has been improperly inserted.

A system for operating networked gaming devices is described. The system according to the invention allows a casino in which the system is installed to run promotions or bonuses on any properly equipped gaming machines while simultaneously gathering player tracking and accounting data from all machines. The system provides the capability for the casino to select which of the plurality of machines are used in any given promotion. The system further allows any number of different promotions to operate simultaneously.

The system includes a plurality of gaming devices or machines connected to an associated floor controller over a network. The system includes one or more of said floor controllers. The floor controllers are interconnected by a high-speed network, such as an Ethernet network, to a database where accounting and player tracking data is stored. The system can also include pit terminals and/or fill and jackpot processing terminals. Each promotion involves sending a reconfiguration command from the floor controller to a gaming device that has been selected to be part of a given promotion over the associated network. Upon receipt of the reconfiguration command, the gaming device reconfigures its payout schedule in accordance with the received reconfiguration command. In the preferred embodiment, this reconfiguration includes activating a bonus payout schedule. A partial list of the promotions according to the invention include, but are not limited to: a multiple jackpot wherein the gaming device reconfigures its payout to be a multiple of its default payout schedule; a bonus jackpot wherein the gaming device reconfigures its payout schedule to payout an additional bonus amount when certain conditions are met; and a progressive jackpot wherein two or more gaming devices are combined in a progressive jackpot having a progressive jackpot payout schedule. In addition to these, many other promotions are possible by the above-described system for controlling and monitoring a plurality of gaming devices.

The system also allows for improved player tracking by recording each and every machine transaction including time of play, machine number, duration of play, coins in, coins out, hand paid jackpots and games played. The player tracking is conducted over the same network as the accounting data is extracted. This allows the invention to provide bonusing to certain individual players as well as during certain times. As with standard player tracking, the above-described system monitors and reports how many coins are played by each player. The system according to the invention, however, also includes the ability to record how long each player spends at each machine and the number of coins won, games played, and hand jackpots won by each player. The invention is able to record all this information because the system operates on a transaction by transaction basis. Each transaction, whether it be a coin in, a handle pull, etc., is recorded by the system. Other systems simply compile the player tracking information at the completion of play. All this information is stored on the database, which can be later analyzed for future targeted direct mailing campaigns. The player tracking according to the invention also allows the casino to schedule buses and other groups and measure their profitability. The system also allows for cashless play as well as advanced accounting and security features.

An advantage of the invention is that any of the casino's machines can be incorporated into a bonus promotion.

Another advantage of the invention is that several bonus promotions can operate simultaneously.

A further advantage of the invention is the ability to record each and every machine transaction including time of play, machine number, duration of play, coins in, coins out, hand paid jackpots and games played.

A further advantage of the invention is the ability to associate a player with a certain machine.

A further advantage of the invention is the ability to perform more targeted direct mailing based on individual play.

A further advantage of the invention is the ability to calculate a theoretical win exactly.

A further advantage of the invention is the ability to generate jackpot announcements, which provides for, among other things, better slot tournaments.

A yet further advantage of the invention is the ability to quickly and easily add new machines to the network.

The foregoing and other objects, features and advantages of the invention will become more readily apparent from the following detailed description of a preferred embodiment of the invention which proceeds with reference to the accompanying drawings.

DETAILED DESCRIPTION

Table of Contents

I. SYSTEM ORGANIZATION
A. SYSTEM OVERVIEW
B. DATA COMMUNICATION NODE
1. OVERVIEW
2. CONTROLLER AND MEMORY
3. NETWORK INTERFACE
4. SERIAL MACHINE INTERFACE
5. SERIAL DISPLAY INTERFACE
6. DISCRETE MACHINE INTERFACE
7. MACHINE CONFIGURATION
C. PLAYER TRACKING MODULE
1. OVERVIEW
2. SERIAL DISPLAY CIRCUIT
3. SERIAL EXPANSION PORTS
4. CARD READER
5. DISPLAY
6. DISCRETE INPUT SECTION
D. PERSONALITY BOARD
E. BONUS DISPLAY DRIVERS
F. FLOOR CONTROLLER
II. OPERATION
A. DATA COMMUNICATION NODE
1. POWER UP PROCEDURE
2. READING UNIQUE IDENTIFICATION NUMBER
3. MONITORING GAMING DEVICE DISCRETE INPUT
4. PROCESSING GAMING DEVICE SERIAL INTERFACE
5. PROCESSING NETWORK INTERFACE
6. PROCESSING PLAYER TRACKING INTERFACE
7. PROCESSING CARD INSERTION
B. PLAYER TRACKING MODULE
1. POWER UP PROCEDURE
2. PROCESSING DCN INTERFACE
3. PROCESSING DISPLAY UPDATE
4. PROCESSING BEZEL UPDATE
5. PROCESSING CARD READER
C. FLOOR CONTROLLER
1. POWER UP PROCEDURE
2. MESSAGE PROCESSING
3. ASSIGNING GAMING DEVICE ADDRESSES
4. SYSTEM MONITORING
5. BONUS CONTROL

I. SYSTEM ORGANIZATION

A. SYSTEM OVERVIEW

Figure 1:
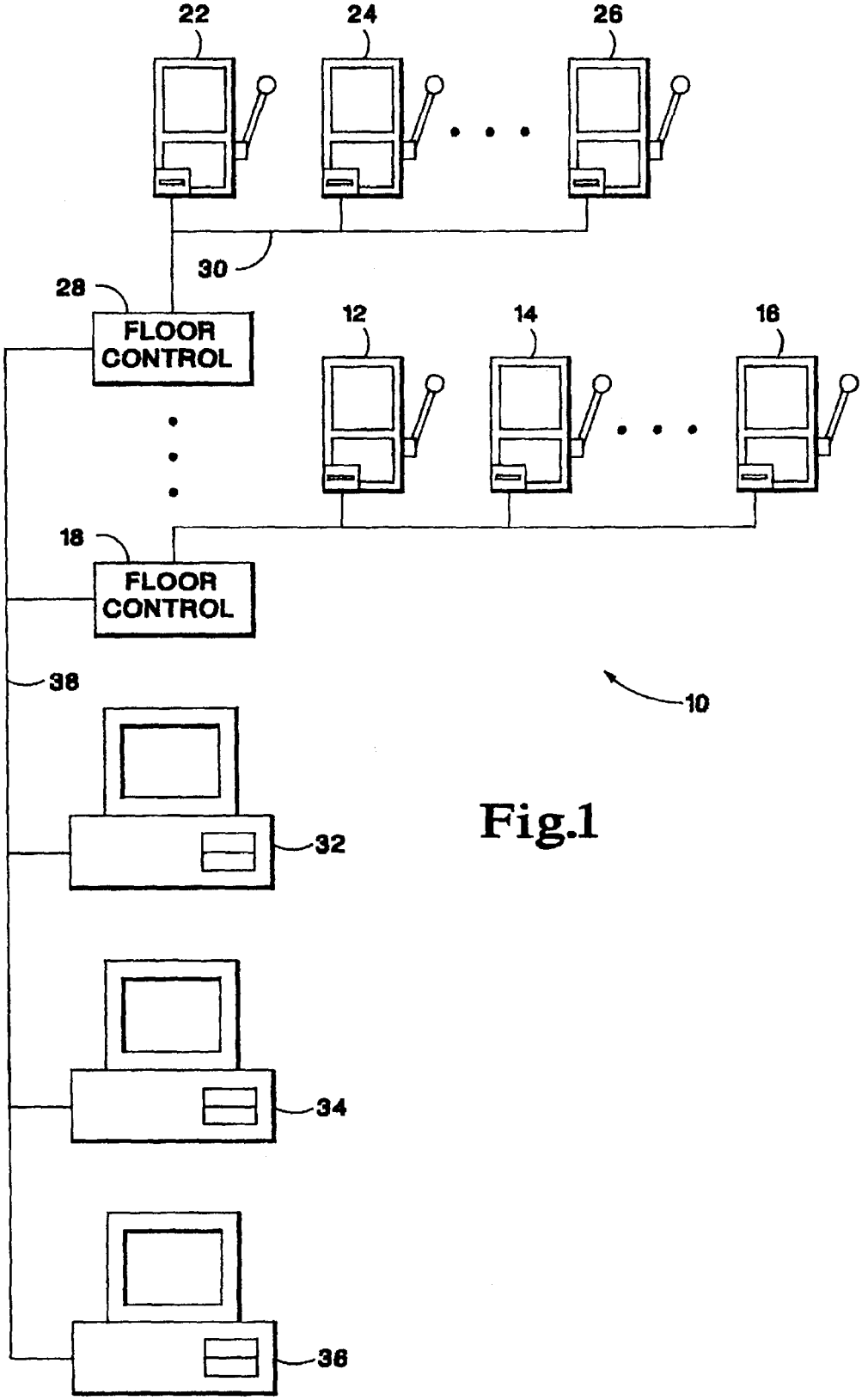
FIG. 1 is an illustration of a system for monitoring and configuring gaming devices according to the invention.

A system for operating a plurality of gaming devices is shown generally at 10 in FIG. 1. The system, hereinafter described, monitors and reconfigures a plurality of gaming devices or machines 12–16 and 22–26. The system includes the following capabilities: remote reconfiguration, accounting data extraction, integrated player tracking, and cashless play. Remote reconfiguration includes sending a reconfiguration command from a host computer to one or more of the gaming devices. The gaming devices, on receiving a reconfiguration command, will reconfigure its jackpot payout schedule in accordance with the reconfiguration command.

This reconfiguration, in the preferred embodiment, comprises activating a bonus payout schedule. This bonus payout schedule is in addition to the normal pay table of the gaming device. The bonus payout schedule provides for additional bonus payouts in addition to the payouts specified by the device's normal pay table. The difference between the two is important for regulatory reasons. The composition of the pay table is subject to regulation by the various state gaming commissions while the bonus payout schedule is not. The preferred embodiment currently activates only the bonus payout schedule responsive to the reconfiguration command, while not altering the payout table. The invention, however, is not limited to activating only the bonus payout schedule. Other embodiments, which would be subject to regulatory approval, could modify the device's payout table. The preferred embodiment, however, does not.

The system, according to the invention, implements a variety of bonusing events through this reconfiguration process. These bonusing events include: a multiple jackpot wherein the gaming device reconfigures its payout to be a multiple of its default payout schedule; a bonus jackpot wherein the gaming device reconfigures its payout schedule to payout an additional bonus amount when certain conditions are met; and a progressive jackpot wherein two or more gaming devices are combined in a progressive jackpot having a progressive jackpot payout schedule.

The system, according to the invention, also provides for integrated player tracking and accounting data extraction. Unlike prior art systems that use disparate systems for player tracking and accounting data extraction, the system 10 provides for player tracking and accounting data extraction over the same network. The player tracking, according to the invention, allows the casino to run certain promotional events. The integrated player tracking and accounting data extraction also allows the system to support cashless play wherein a credit is given to a player over the network.

The system 10 includes one or more floor controllers 18 and 28. Each floor controller supports up to a predetermined maximum number of gaming devices. In the preferred embodiment, each floor controller can support up to 1024 gaming devices. The preferred embodiment also supports up to eight floor controllers. Thus, the system 10 can support up to 8192 separate gaming devices.

The system supports a multiplicity of various gaming devices. The gaming devices 12–16 and 22–26 shown in FIG. 1 are the type having a pull handle for initiating a game, e.g., slot machines. However, the invention is not limited to such gaming devices. The gaming devices shown in FIG. 1 can also be gaming tables or push button operated machines as well, e.g. video poker. As will be described hereinafter, the system supports any gaming device providing traditional discrete connections, e.g.. coins-in, coins-out. etc., as well as those having serial interfaces, as described below.

The floor controllers 18 and 28 are, in the preferred embodiment. IBM-compatible personal computers. Each floor controller is responsible for monitoring the activity level of the corresponding gaming devices connected thereto and issuing commands to the associated gaming devices to reconfigure their payout schedules during certain bonusing events. The floor controllers issue status requests to each of the individual gaming devices to determine the activity level of each. In the event the floor controller detects any activity, the floor controller communicates that activity to a file server 32, which is connected to the floor controllers via a high speed network 38 connected therebetween.

In the preferred embodiment, the file server 32 includes a high performance personal computer or work station having a large hard disk capacity in order to store the gaming device activity therein. In the preferred embodiment, the high speed network 38 is a ten megabyte ethernet network. The system 10 also includes commercially available network software to support the industry-standard ethernet network 38. An example of such network software is Novell network software sold by Novell of Provo, Utah. The file server 32 also includes a database program by which reports can be generated using the data stored on the file server. Such reports include, e.g. area, model, denomination and summary reports. The database software also allows a user to generate custom reports. The database software is based on the industry-standard Paradox database language.

The system 10 also includes a pit terminal 34 which is also connected to the ethernet network 38. The pit terminal 34 is also a standard personal computer. in the preferred embodiment, and can be used to monitor the gaming device activity in the pit. This terminal 34 can also be used as a security monitoring device to detect any unanticipated events like fills or payouts.

The system 10 further includes any number of fill and jackpot processing terminals 36. These terminals 36 are placed in the cage and/or the change booth areas of the casino for fill and hand-paid jackpot processing. When a fill is required. a floor person goes to the nearest cashier's booth and states the gaming device number requiring a fill. The booth attendant enters the number into the fill and jackpot processing terminal 36 located in the cashier's booth. The terminal 36 then looks up the record associated with the particular gaming device in the file server 32 to determine the correct fill amount. The terminal 36 also calculates a theoretical hopper balance for the particular device based on the latest meter information, as described further below. If the calculation shows a significant hopper balance, a warning is given on the computer screen from which security can then be alerted.

A fill and jackpot processing terminal 36 prints a fill ticket upon demand. If the calculated hopper balance was nearly zero, the terminal 36 cause the words "computer verified" to be printed on the ticket in place of a supervisor's signature. In the event that the calculated hopper balance was not near zero, an extra signature is required to complete the fill transaction. The system follows a similar procedure for processing hand-paid jackpots.

A dispatch station (not shown) can also be included in the system. The dispatch station allows the casino to monitor activity on the gaming devices and "run the casino" from one location. The dispatch station allows the dispatcher to monitor customer service, maintenance, and security events and direct other casino personnel to handle these situations appropriately. For example. during hopper empties (fills) and jackpot events, as indicated by the dispatcher station, the dispatcher could radio down to the floor to have someone verify the event. The dispatcher station can also indicate when a machine door is opened without a technician card inserted, for example, in which case the dispatcher could take the appropriate course of action.

The above-described system 10 is but one embodiment of the system according to the invention. The system tasks can be allocated in a variety of ways amongst the system computers including floor controllers 18 and 28, file server 32, pit terminal 34 and fill and jackpot terminals 36. In some cases, the pit terminal 34 and fill and jackpot terminals 36 can even be eliminated and their tasks allocated to the floor controller or file server. In fact, because the file server 32 is essentially a virtual hard disk for the floor controllers 18 and 32, the floor controllers and the file server can be considered a single host computer for the system 10.

B. DATA COMMUNICATION NODE

1. OVERVIEW

Figure 2:
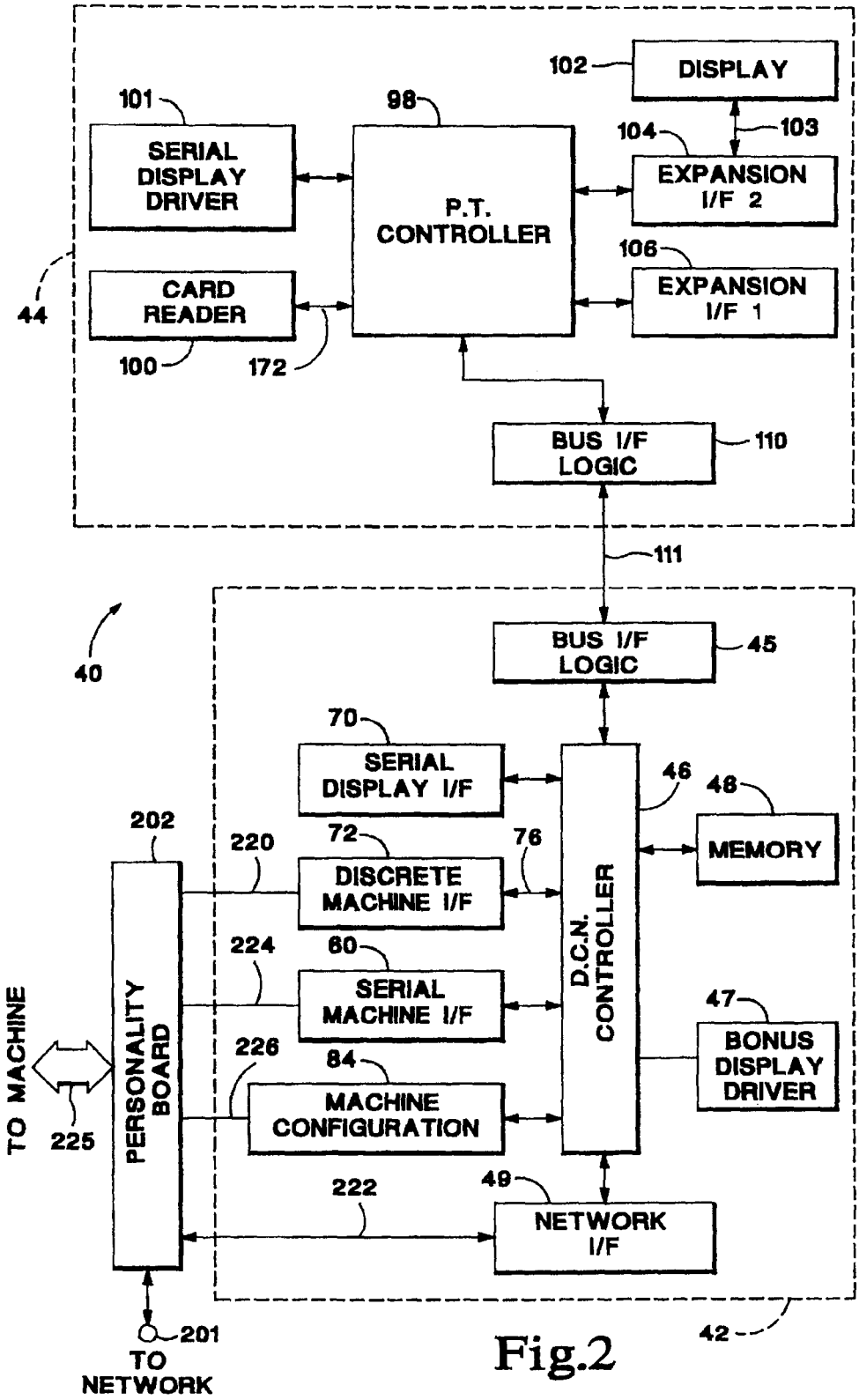
FIG. 2 is a block diagram of an electronic module associated with each gaming device to permit monitoring and configuring thereof.

In order to communicate with the floor controller, each gaming device includes therein an electronic module 40, as shown in FIG. 2. This module 40 can be inserted into a variety of pre-existing gaming devices. The module allows the host computer to uniquely identify the gaming device on the network, including the device type. The module 40 includes two main subcomponents: a data communication node 42 and a player tracking module 44. The data communication node 42 keeps track of the coins-in, coins-out, coins to drop, games played, jackpot occurrences and other related functions of the associated gaming device. The player tracking module 44 keeps track of the player that is playing the associated gaming device. Together, the data communication node 42 and the player tracking module 44 allow the floor controller connected to the associated gaming device to monitor and control the activity of the gaming device. The system hereinafter described in detail includes the following capabilities: slot accounting, player tracking, bonus jackpots and cashless play.

2. CONTROLLER AND MEMORY

The data communication node (DCN) 42 includes a data communication node controller 46. which in the preferred embodiment is an HD6473258P10 controller manufactured by Hitachi of Tokyo, Japan. The DCN 42 is coupled to the player tracking controller 44 through bus interface logic 45. The bus interface logic 45 is conventional interface logic including, for example, transceivers, as is known in the art of digital design.

A memory 48 is connected to the DCN controller 46. The memory includes program memory for storing program instructions for the DCN controller 46. In the preferred embodiment, this program memory includes a nonvolatile read-only memory (ROM). However, this program memory could also be flash or "battery" backed RAM in order for the program memory to be updated by the floor controller. In the event flash or "battery" back RAM is used the floor controller would download the updated program to the DCN controller and the DCN controller would overwrite the program memory with the downloaded program.

The memory 48 also includes system memory, e.g., static random-access memory (SRAM) for storing the gaming device information. This gaming device information includes at least the following meters: coins-in, coins-out, coins to drop, games played, jackpot occurrences. A separate meter counter is kept in memory 48 for each of these values. To increase reliability of the data, in the preferred embodiment, a redundant set of these counters is kept in a physically separate memory device within memory 48. Moreover, the memory devices storing these counters are nonvolatile so that in the event of a power failure the counts will be retained. The nonvolatile memories can either be battery-backed SRAM or electrically erasable programmable read-only memory (EEPROM). Although memory 48 is shown external to DCN controller 46, much if not all of the memory 48 can be included in the DCN controller 46.

3. NETWORK INTERFACE

The data communication node 42 also includes a network interface 49 for connecting the data communication node 42 to the associated floor controller. The network interface is coupled to the floor controller through a personality board 202, described below.

Figure 3:
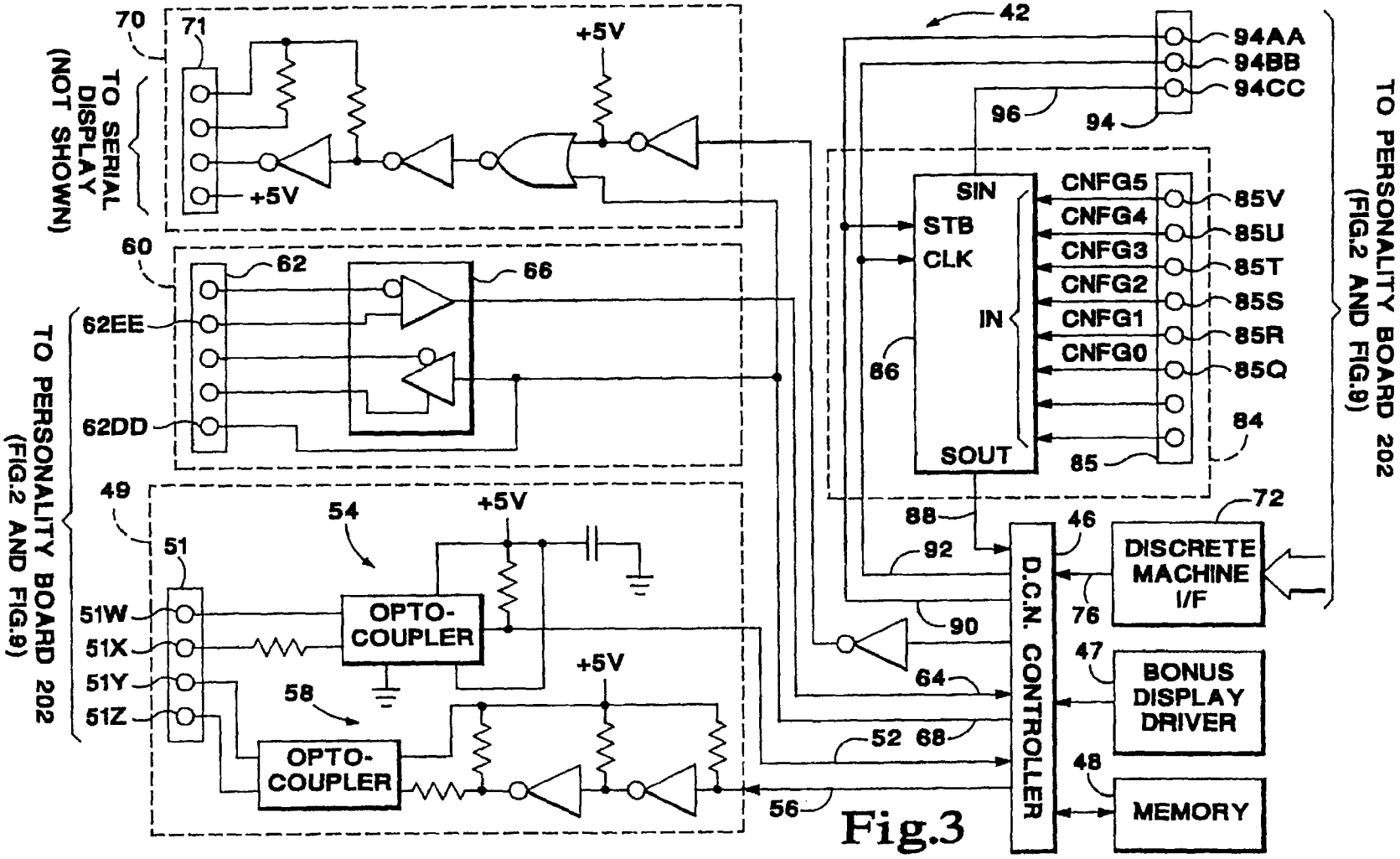
FIG. 3 is a schematic diagram of a data communication node of the electronic module of FIG. 2.

A more detailed drawing of network interface 49 is shown in FIG. 3. In FIG. 3, the DCN controller 46 receives data from the floor controller over conductor 52 which is optically isolated from a connector 51 by optical isolator circuit 54. The DCN controller 46 transmits data to the floor controller over conductor 56, which is optically isolated from the connector 51 by optical isolator circuit 58. Each of the opto-isolator circuits 54 and 58 include an opto-coupler as are known in the art. A bus 222 (FIG. 2) is connected between the network interface 49 and the personality board 202.

4. SERIAL MACHINE INTERFACE

Referring to FIG. 2, the data communication node includes a serial machine interface 60. The serial machine interface 60 allows the data communication node 42 to communicate with the associated gaming device advance serial interface as contrasted with the discrete interface, to be described further hereinafter. A bus 224 (FIG. 2) connects the serial machine interface 60 to the associated gaming device at connector 62. The serial interface, in the preferred embodiment, is a standard RS232 three wire interface.

Referring to FIG. 3, the DCN controller 46 receives data from the gaming device over conductor 64 which is connected between the DCN controller 46 and a differential to single-ended converter 66. The DCN controller 46 transmits data to the gaming device over conductor 68 connected between the DCN controller 46 and the converter 66. The converter 66 converts the differential inputs of the serial interface 62 to a single-ended output which is transmitted over conductor 64 to the DCN controller 46. The converter 66 also converts the single-ended input received from the DCN controller 46 to a differential output signal and transmits that to the serial interface 62. The serial machine interface is the means by which the DCN controller communicates certain reconfiguration data, referred to as reconfiguration commands, to the machine. These reconfiguration commands cause the machines to activate a bonus payout table to allow the machine to append bonus payments to their standard jackpot payouts, as specified by their payout table, during certain bonus activities.

5. SERIAL DISPLAY INTERFACE

The data communication node 42 further includes a serial display interface 70 illustrated in more detail in FIG. 3. The serial display interface 70 includes logic coupled between the DCN controller 46 and an expansion connector 71. The expansion connector 71 allows the DCN controller 46 to communicate with an expansion device connected thereto.

6. DISCRETE MACHINE INTERFACE

Figure 4:
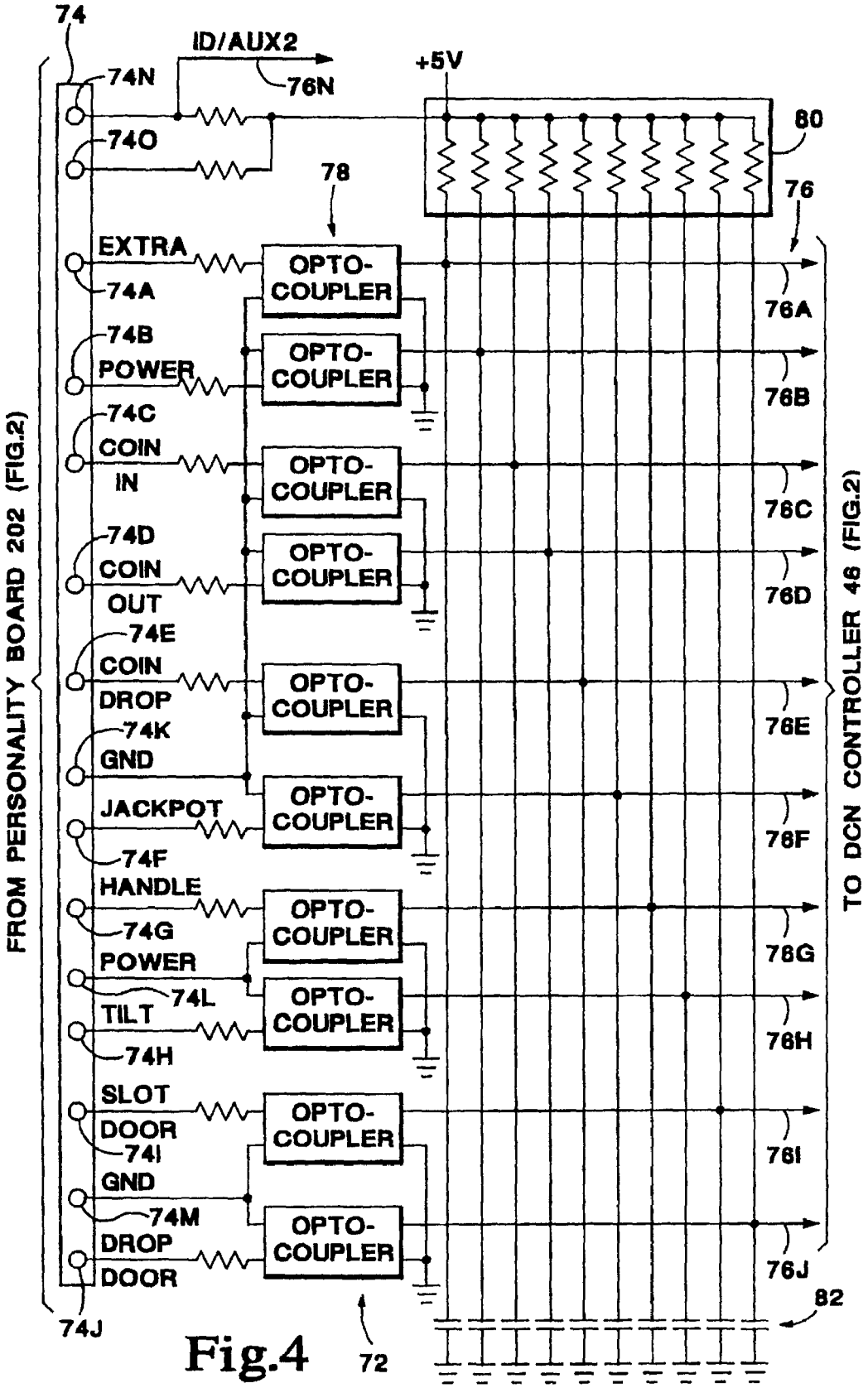
FIG. 4 is a schematic diagram of a discrete machine interface circuit of the electronic module of FIG. 2.

The data communication node 42 also includes a discrete machine interface 72, which is shown in detail in FIG. 4. The discrete machine interface 72 includes a plurality of opto-couplers 78 coupled between the discrete outputs from the gaming device or machine and the DCN controller 46. The discrete outputs of the machine are received at terminals 74A–74J of a connector 74 via a cable (not shown) connected between the machine and the connector 74. The discrete outputs are coupled to corresponding inputs 76A–76J via opto-couplers 78. The discrete outputs from the machine include: an EXTRA signal, a POWER signal, a COIN IN signal, a COIN OUT signal, a COIN DROP signal, a JACKPOT signal, a HANDLE signal, a TILT signal, a SLOT DOOR signal, and a DROP DOOR signal. Each of these signals correspond to a known event in the machine. For example, when a coin is dropped in the machine a COIN IN signal appears on terminal 74C. This COIN IN signal is then transmitted to the DCN controller 46 on line 76C via the associated opto-coupler.

All of the signal lines 76A–76J include a pullup resistor and a pulldown capacitor, which combined form an RC network on the associated line. The resistors are, in the preferred embodiment, in the form of a resistor pack 80 and the capacitors are individual discrete capacitors 82. Alternatively, the capacitors can be removed for high-speed signals.

7. MACHINE CONFIGURATION CIRCUIT

The data communication node 42, as shown in FIGS. 2 and 3, further includes a machine configuration circuit 84. In the preferred embodiment, as shown in FIG. 3, the machine configuration circuit 84 includes a parallel to serial converter 86, which includes eight parallel inputs IN, a serial input SIN, a clock input CLK, a strobe input STB, and a serial output SOUT. The parallel inputs IN are connected to a personality board, as described hereinafter, to receive a unique machine configuration number therefrom, which uniquely identifies the type of machine that the data communication node is connected to. In the preferred embodiment, the machine identification number is comprised of six bits. Therefore, the two remaining parallel inputs can be used to provide additional inputs, such as additional discrete machine inputs, to the DCN controller 46.

The machine configuration number presented on the parallel inputs of the parallel to serial converter 86 is latched therein responsive to a strobe signal received at the strobe STB input. A strobe input is generated by the DCN controller 46 on conductor 90 which is coupled to the strobe STB input. The parallel data is clocked out of the converter 86 to the DCN controller 46 on conductor 88 and connected between the serial output SOUT of the converter 86 and an input of the DCN controller 46 responsive to a clock signal received on the clock input CLK of the converter 86. The clock signal is generated by the DCN controller 46 and is transmitted to the converter 86 via conductor 92 which is coupled between an output of the DCN controller 46 and the clock input CLK of the converter 86.

The converter 86 also includes a serial input SIN for receiving serial input data. The serial input SIN is coupled to an expansion terminal 94C of expansion connector 94. Conductors 90 and 92 are also coupled to the expansion terminal 94 to provide the clock and strobe signals thereto. The expansion terminal 94 therefore provides the means for the DCN controller 46 to access additional serial information through the parallel to serial converter 86. In the preferred embodiment, the parallel to serial converter 86 is part number 4021 manufactured by Toshiba Corporation of Tokyo, Japan.

C. PLAYER TRACKING MODULE

1. OVERVIEW

Referring again to FIG. 2, the module 40 coupled to each of the gaming devices includes a player tracking module 44. The player tracking (PT) module 44 includes a player tracking controller 98, a card reader 100, a serial display driver 101, a display 102, and expansion interfaces 104 and 106. The player tracking controller 98 communicates with the data communication node controller 46 through bus interface logic 110. The DCN controller 46 and PT controller 98 maintain a master-slave relationship, respectively. Therefore, all communication is initiated by the DCN controller 46. The bus interface logic is conventional logic and its design is well-known in the art of digital electronics.

In the preferred embodiment, the player tracking module 44, with the exception of the card reader 100 and the display 102, resides on a single printed circuit board, while the data communication node 42 resides on a separate printed circuit board. The player tracking module 44 and the data communication node 42 are then connected by a cable 111 such as a ribbon cable.

2. SERIAL DISPLAY CIRCUIT

Figure 5:
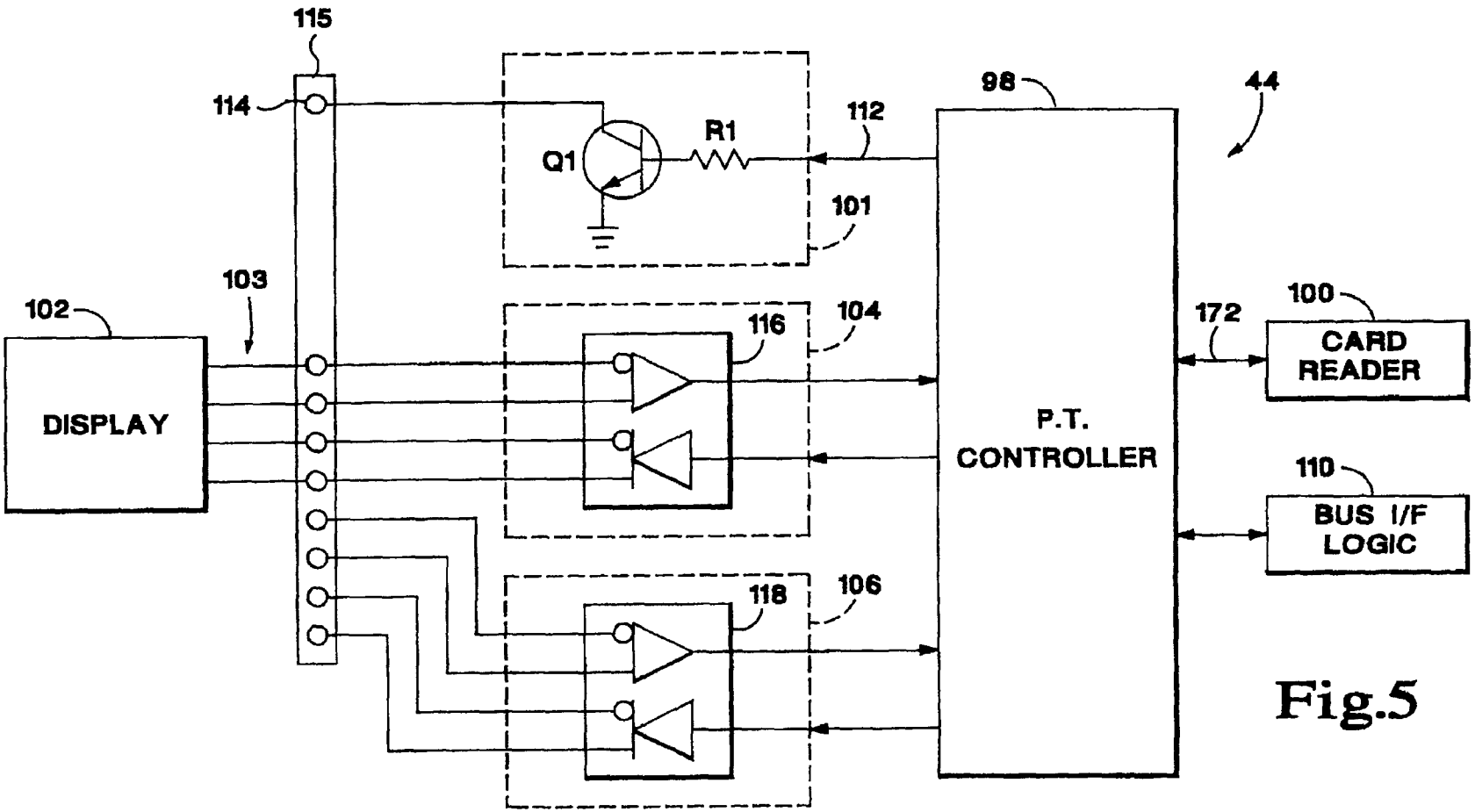
FIG. 5 is a schematic diagram of a player tracking module of the electronic module of FIG. 2.

A more detailed drawing of the player tracking module 44 is shown in FIG. 5. In FIG. 5, the serial display circuit 101 includes a transistor Q1 and a resistor R1 connected to the base thereof. A conductor 112 is connected between the PT controller 98 and the resistor R1 to provide a drive signal to transistor Q1. The drive signal causes transistor Q1 to conduct a current and thereby drive a display connected to the collector of Q1 at a terminal 114 of a connector 115. In the preferred embodiment, the terminal 114 is connectable to a small vacuum florescent display to provide serial display data thereto.

3. SERIAL EXPANSION PORTS

The player tracking module 44 also includes two serial expansion ports 104 and 106. Each of the expansion ports 104 and 106 includes a differential to single-ended converter 116 and 118, respectively. In the preferred embodiment, these converters 116 and 118 are part number LTC490 manufactured by Linear Technology Corporation of Milpitas, Calif. The PT controller 98 communicates with each converter via two single-ended, serial signal lines: an input signal line and an output signal line. The converters convert the single ended signals appearing on these lines to differential signals. The differential signals, however, can be used as single-ended signals as is known in the art. The first expansion port 104 interfaces the player tracking node 44 with a large vacuum florescent display 102 (FIG. 5) used to display player tracking messages, as described further below. The display is connected to the connecter 115, in the preferred embodiment, by a cable 103. The other expansion ports 106 provides the player tracking module with future expansion capabilities to support additional features.

4. CARD READER

Figure 6:
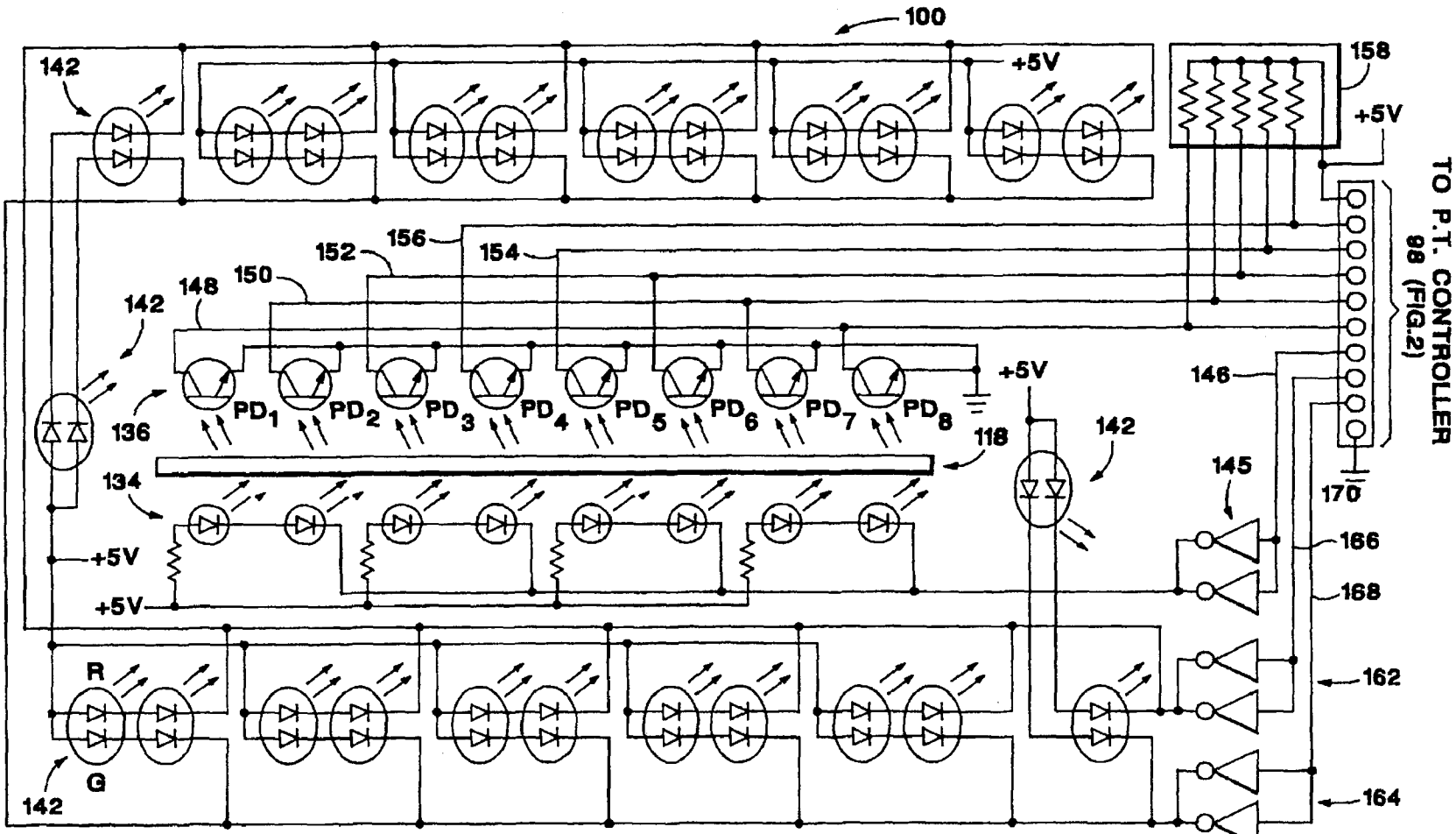
FIG. 6 is a schematic diagram of a card reader circuit of the electronic module of FIG. 2.
Figure 7A:
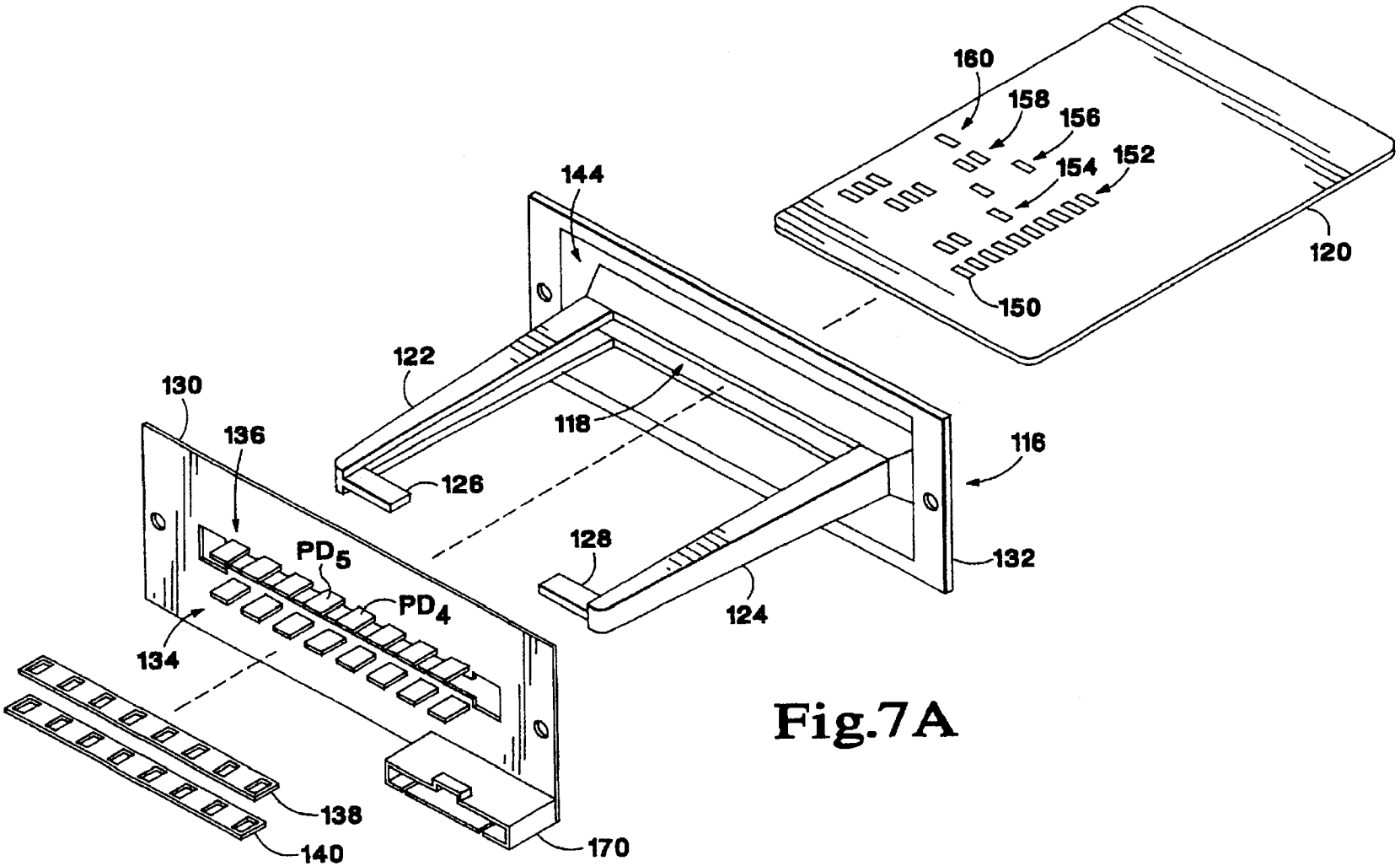
FIG. 7A is an exploded view of a card reader according to the invention.
Figure 7C:
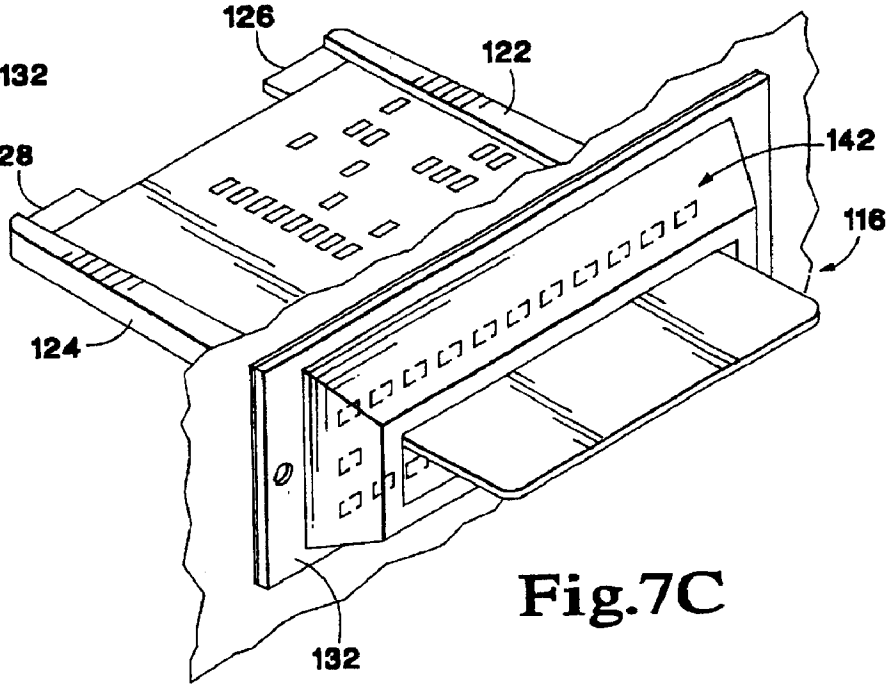
FIG. 7C is a front perspective view of the card reader of FIG. 7A.
Figure 7B:
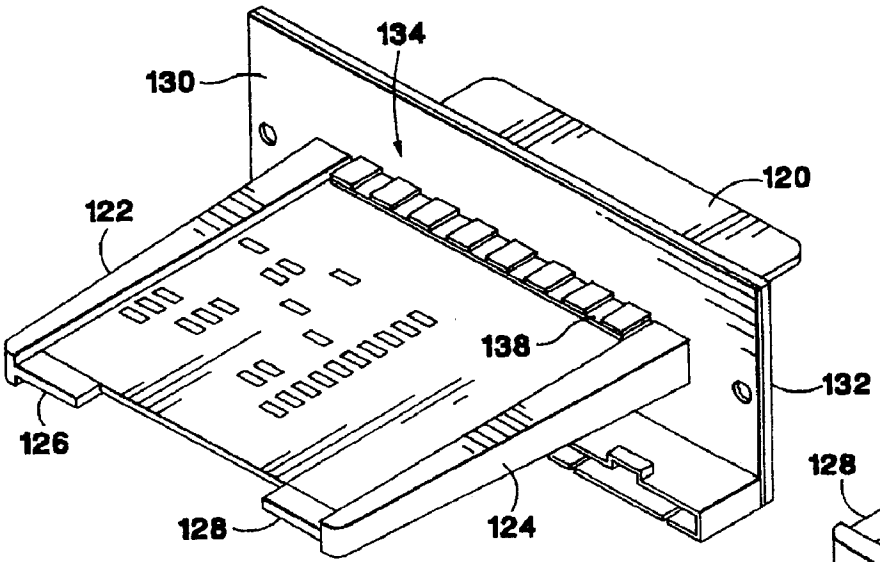
FIG. 7B is a rear perspective view of the card reader of FIG. 7A.

Referring now to FIGS. 6 and 7, the card reader 100 will now be described. FIG. 6 shows the electrical schematic for the card reader while FIG. 7 shows the mechanical drawing thereof. In FIG. 7A, an exploded view of the card reader is shown. The card reader includes a plastic bezel 116 having a card reader opening 118 formed therealong for receiving a card 120 therein. The bezel 116 includes guide rails 122 and 124 disposed at opposite, respective lateral ends of the opening 118. The guide rails 122 and 124 have stops 126 and 128. respectively. The guide rails 122 and 124 guide the card 120 through the opening 118 until an end of the card 120 contacts stops 126 and 128. The card is shown fully inserted in FIGS. 7B and 7C with the end of the card 120 abutting the stops 126, 128.

The card reader also includes a printed circuit board 130 having a longitudinal opening to allow the guide rails 122 and 124 to be inserted therein in order to allow the printed circuit board 130 to be pushed up flush against a mounting plate 132 of the bezel 116, as shown in FIGS. 7B and 7C. Mounted on one side of the printed circuit board 130 is an array of photodiodes 134 and an array of photodetectors 136. The photodiodes 134 are mounted on the printed circuit board along one side of the opening in the printed circuit board, while the photo detectors 136 are mounted on the printed circuit board along an opposite side of the opening. The photodiodes and the photodetectors are vertically aligned in a one-to-one relationship, i.e., one photodiode for each photodetector. In the preferred embodiment, the array of photodiodes includes eight individual diodes spaced equidistance along the opening in the printed circuit board 130. The photodiodes 134 are mounted along the opening in the printed circuit board 130 so as to align with separate rows of openings in the card 120, as described further below. The card reader also includes optional light masks 138 and 140. The light mask 138 is associated with the array of photodiodes 134 and has a plurality of openings therein, each opening corresponding to an individual photodiode in the array 134. Similarly, light mask 140 is associated with the array of photodetectors 136 and also has one opening for each of the photodetectors. The light mask 138 is mounted on the printed circuit board 130 beneath the array of photodiodes 134 along the opening in the printed circuit board 130. The light mask 138 is aligned with the photodetectors 134 so that the openings in the light mask 138 are directly beneath a corresponding photodiode in the array. The light mask 138 minimizes the amount of light emitted by a photodiode that can be detected by a photodetector other than the corresponding photodetector. The light mask 140 is mounted on top of the photodetector array 136 so that the openings therein align with the individual photodetectors. The light mask 140 further eliminates extraneous light from the photodiodes as well as extraneous ambient light.

Also mounted on the printed circuit board 130 are a plurality of light-emitting diodes 142, as shown in FIG. 7C in broken line. The light-emitting diodes are mounted on a side of the printed circuit board opposite the side on which the photodiodes and photodetectors are mounted on. The light-emitting diodes 142 are mounted around the perimeter of the opening in the printed circuit board 130 and are received in a recessed portion 144 of the bezel 116. The light-emitting diodes 142 comprise a means for providing visual feedback to a user inserting a card 120 into the bezel 116, as described further below. In the preferred embodiment, the light-emitting diodes 142 are dual light-emitting diodes capable of producing two primary colors and a third combination color.

Referring now to FIG. 6, an electrical schematic of the card reader is shown. The schematic includes the array of photodiodes 134 disposed along one side of the card reader opening 118 and the array of photodetectors 136 disposed along the opposite side of the opening 118. In the preferred embodiment, there are eight photodiodes and eight corresponding photodetectors. The photodiodes are arranged in pairs, with the two photodiodes within each pair being connected in a serial fashion. The anode of the first photodiode in the pair is coupled to the supply voltage through resistor, while the cathode of a second photodiode in the pair is connected to an output of a driver circuit 144. The driver circuit, in the preferred embodiment, includes two open collector inverters connected in parallel. A signal is provided to the driver circuit 144 by the PT controller 98 over a conductor 146. A signal on conductor 146 causes the driver circuit 144 to conduct current and thereby actuate the photodiodes 134 substantially simultaneously.

The photodetectors 136 are comprised of a plurality of light-sensitive phototransistors PD1–PD8. The emitters of the phototransistors PD1–PD8 are all coupled to ground. The collectors of phototransistor PD1 and PD8 are connected together and to a conductor 148 by which the PT controller 98 senses light detected by either phototransistor PD1 or PD8. Phototransistors PD2 and PD7 are similarly connected with the collectors of each being connected to a conductor 150. The collectors of phototransistors PD3 and PD6 are also commonly connected to a conductor 152. The collectors of the center phototransistors PD4 and PD5, however, are connected to separate conductors 156 and 154, respectively. Also connected to each of the conductors 148–156 is a corresponding pullup resistor. In the preferred embodiment, the pullup resistors are included in a resistor pack 158. Each of the conductors 148–156 are connected to a connector 170, which is coupled to the PT controller 98 as described below.

Based on the above configuration of the phototransistors PD1 and PD8, only five conductors are required to sample all eight of the phototransistors. Without more information, however, the player tracking controller 98 would be unable to determine which of the two phototransistors commonly connected to a particular conductor, e.g., conductor 148, detected light. For example, if either phototransistor PD1 or phototransistor PD8 detect light, the voltage level on conductor 148 will drop from a high voltage of approximately 5 volts to a low voltage of approximately 0.7 volts. Without more information, the player tracking controller 98 would be unable to determine which of the two phototransistors, PD1 or PD8, actually sensed the light. According to the invention, however, the card 120, as shown in FIG. 7A, includes a first slot 150 by which the PT controller 98 can determine which of the two photodetectors detected the light, as described below.

The card 120 includes five rows of slots 152–160. The rows of slots 152–160 are arranged in a matrix with the corresponding slot locations within each of the rows being aligned in columns. Only the first slot 150 of row 152 cannot be aligned with any other slots, i.e., slot 150 is in a column all by itself. The individual slots within the rows of slots 152–160 encode unique player tracking information. Each slot represents a single binary bit in the player tracking information. Either one of two conventions can be used to encode the information. First, a slot can represent a binary 1 and no slot can represent a binary 0. Second, a slot can represent a binary 0 and no slot can represent a binary 1. The player tracking information can include: a unique player identification number, the casino issuing the card, player membership information, etc.

In the preferred embodiment, the card includes five rows of slots each having a maximum number of nine individual slots, thereby producing 45 possible slots. The first row of slots 152, however, is not used to encode player tracking information, but instead is used to synchronize the sampling of the player tracking information by the player tracking controller 98. Thus, only 36 slots are used to encode player tracking information in the preferred embodiment. This still allows $2^{36}$ possible combinations, which is more than adequate.

The PT controller 98 uses the first row 152 to synchronize the sampling as follows. The PT controller 98 continuously samples the outputs of PD4 and PD5 looking for a slot. If a slot is detected on either PD4 and PD5 and no other slots are detected by any other phototransistors the PT controller 98 determines that the detected slot must be slot 150. The PT controller 98 then continuously samples the output of the phototransistor that detected slot 150. Once a new slot is detected by that phototransistor, the PT controller 98 then samples the outputs of the other phototransistors, i.e., PD1–PD3 and PD6–PD8, on conductors 148, 150 and 152 for slots in of the other rows. Thus, the PT controller 98 synchronizes the sampling of the other rows of slots to the detection of a slot in the first row 152.

It is important for the card reader to detect the orientation of the card in order to correctly interpret the player identification information encoded on the card. The card reader detects the orientation of the card 120 by detecting the slot 150. If slot 150 is detected by phototransistor PD4, then the card reader knows that the card is in the orientation shown in FIG. 7A. In that case, the card reader knows that the player tracking information is actually being detected on phototransistors PD5–PD8, and can interpret the player tracking information accordingly. If, however, phototransistor PD5 detects slot 150, then the card reader knows that the card 120 is oriented 180 degrees from that shown in FIG. 7A. In that case, the card reader knows that the player tracking information is being detected by phototransistors PD1–PD4, and can interpret the information accordingly. The PT controller 98 can simply transpose the player tracking information sensed on conductors 148–152 depending upon the detected orientation of the card. Thus, the card reader according to the invention is able to correctly interpret the player tracking information regardless of how the player inserts the card 120 into the bezel 116 of the card reader. The invention is able to accomplish this with only five conductors between the eight phototransistors PD1–PD8 and the PT controller 98.

The card reader further includes a plurality of light-emitting diodes 142 that are mounted on the printed circuit board 130 and received in the recess 144 of the bezel 116, as shown in FIG. 7C. The LEDs 142 are mounted on the printed circuit board 130 so as to surround the card reader opening 118 as shown in FIG. 6. In the preferred embodiment, the card reader includes 24 dual diodes arranged in pairs. The dual diodes have two separate diodes, each being able to emit a different primary color of light. In the preferred embodiment, the dual diodes emit either red or green light. The dual diodes can also emit a third combination color if the two individual diodes in the dual diode are actuated simultaneously so that the two primary colors combine. In the preferred embodiment, this combination color is approximately orange due to the differences in the intensities of the red and green light.

The dual diodes are essentially treated as two individual diodes. The red diodes R in the dual diodes are driven by a driver circuit 162, while the green diodes G in the dual diodes are driven by another driver circuit 164. The driver circuits 162 and 164 are, in the preferred embodiment, two open collector drivers connected in parallel, as with driver 145. However, other equivalent driver circuits would be apparent to those skilled in the art.

The dual diodes are arranged in pairs with the anodes of one of the dual diodes being coupled to the supply voltage +5V and the cathodes of the other dual diode being connected to the output of the corresponding driver circuit. Accordingly, the red diodes are commonly driven by driver circuit 162, which is responsive to a signal received from the PT controller 98 on conductor 166. Similarly, the green diodes are commonly driven by driver circuit 164, which is responsive to a signal received from the PT controller 98 on conductor 168. Therefore, the PT controller 98 can selectively actuate the red diodes, the green diodes or both by generating the corresponding signals on conductors 166 and 168.

All of the conductors over which the PT controller communicates with the card reader, i.e., 146–156 and 166–168, are connected to a connector 170 as shown in FIGS. 6 and 7A. The player tracking module 44 then includes a cable 172 that is connected between the connector 170 and the PT controller 98, as shown in FIG. 5.

Although the preferred embodiment of the card reader is an optical card reader, the invention is not limited to such. The lighted bezel can be used in conjunction with any form of card reader such as a magnetic card reader, a bar code reader, etc. The method of providing visual feedback to the player herein described is a general method which can be used with a plurality of cards and card readers.

5. DISPLAY

Figure 8:
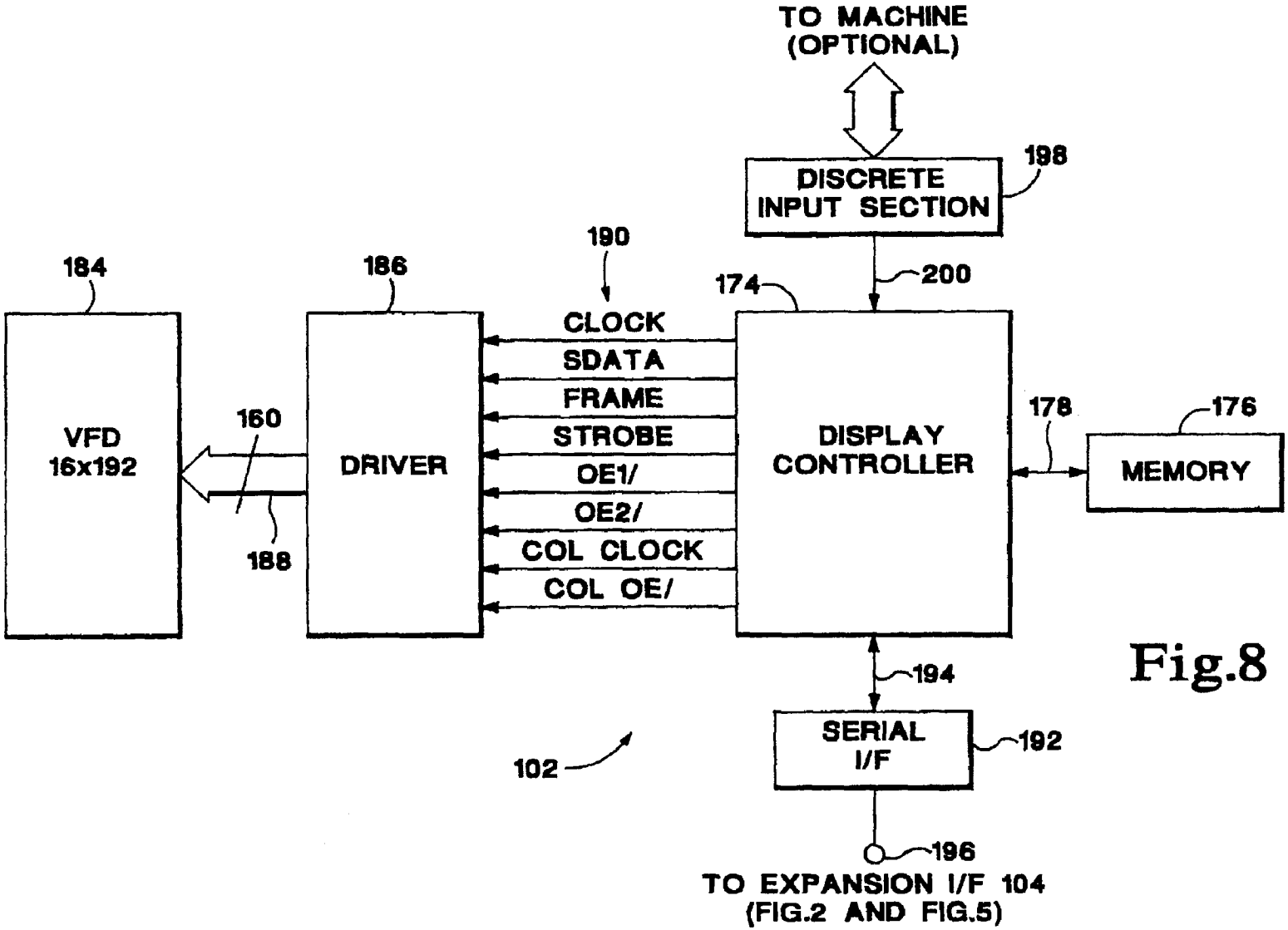
FIG. 8 is a schematic diagram of a display circuit of the player tracking module of FIG. 2.

Referring now to FIG. 8, a schematic for the display circuit 102 of the player tracking module 44 is shown. The circuit 102 includes a display controller 174, which in the preferred embodiment is a part number HD6473258P10 manufactured by Hitachi of Tokyo, Japan. Coupled to the display controller 174 is a memory 176 via bus 178. The memory 176. in the preferred embodiment, is a 32KB SRAM. The memory 176 stores the variables and parameters necessary for the controller 174 to communicate with both the PT controller 98 and the display driver 186. The bus 178 includes the necessary address lines, data lines and control lines to interface in memory 176.

In the preferred embodiment, the display 102 includes a vacuum fluorescent display (VFD) 184, which is organized as a 16×192 display matrix. Such displays are well-known in the art of digital electronics. The VFD 184 is driven by a driver circuit 186, which includes a plurality of individual drivers serially interconnected. In the preferred embodiment, these serial drivers are part number UCN5818EPF-1, manufactured by Allegro Microsystems, Inc. of Worcester. Mass. The driver circuit 186 is connected to the VFD 184 by bus 188 which includes 160 individual conductors. The manner in which the 160 bus lines are connected between the driver circuit 186 and the VFD 184 is known in the art, and is therefore not described in detail herein.

The display controller 174 interfaces with the driver circuit 186 by a plurality of signal lines 190. These signal lines transmit the standard driver interface signals to the driver circuit 186. These signals include: a clock signal CLOCK, serial input data signal SDATA, a frame signal FRAME, a strobe signal STROBE, two output enable signals OE1/and OE2/, a column clock signal COL CLOCK, and a column output enable signal COL OE/. These signals have well known functions in the display art and are therefor not discussed in detail. The signal names having a "/" represent active low signals while all other signals are active high. The display controller 174 generates these signals in the required sequence in order to serially clock the reformatted display data to the driver circuit. One of ordinary skill in the art could program the display controller 176 to generate these signals in order to display the desired message on the VFD 184 based on the foregoing description.

The display 102 also includes a serial interface 192. The serial interface 192 is the means by which the PT controller 98 communicates a player tracking message to the display 102. In the preferred embodiment, the serial interface 192 includes two opto-isolator circuits: one for the serial send data, the other for the serial transmission data. The display controller 174 is connected to the serial interface 192 over a two conductor serial bus 194, one conductor for receiving serial data from the serial interface 192, the other for transmitting serial data thereto. A connector 196 is also coupled to the serial interface 192. The connector 196 includes four terminals. Two of the connector terminals are dedicated to receiving serial input data and the other two terminals are dedicated to transmitting serial data. A cable (not shown) couples the display 102 to the player tracking module 44 between connectors 196 (FIG. 8) and connector 115 (FIG. 5).

6. DISCRETE INPUT SECTION

The display 102 further includes a discrete input section 198. The discrete input section 198 is an interface between the discrete outputs of a gaming device and the display controller 174 much in the same way that the discrete machine interface 72 allows the data communication node to interface with a gaming device. Although in the preferred embodiment the discrete input section is unconnected to any discrete machine inputs, the discrete input section 198 allows the display 102 to operate as a stand-alone module for gaming devices in certain configurations. The discrete input section provides discrete input signals from an external device to the display controller 174 over a bus 200. The discrete input section 198 includes opto-isolator circuits such as part number TLP620 manufactured by Toshiba Corporation of Tokyo, Japan which provide single-ended input signals to the display controller 174.

D. PERSONALITY BOARD

Figure 9:
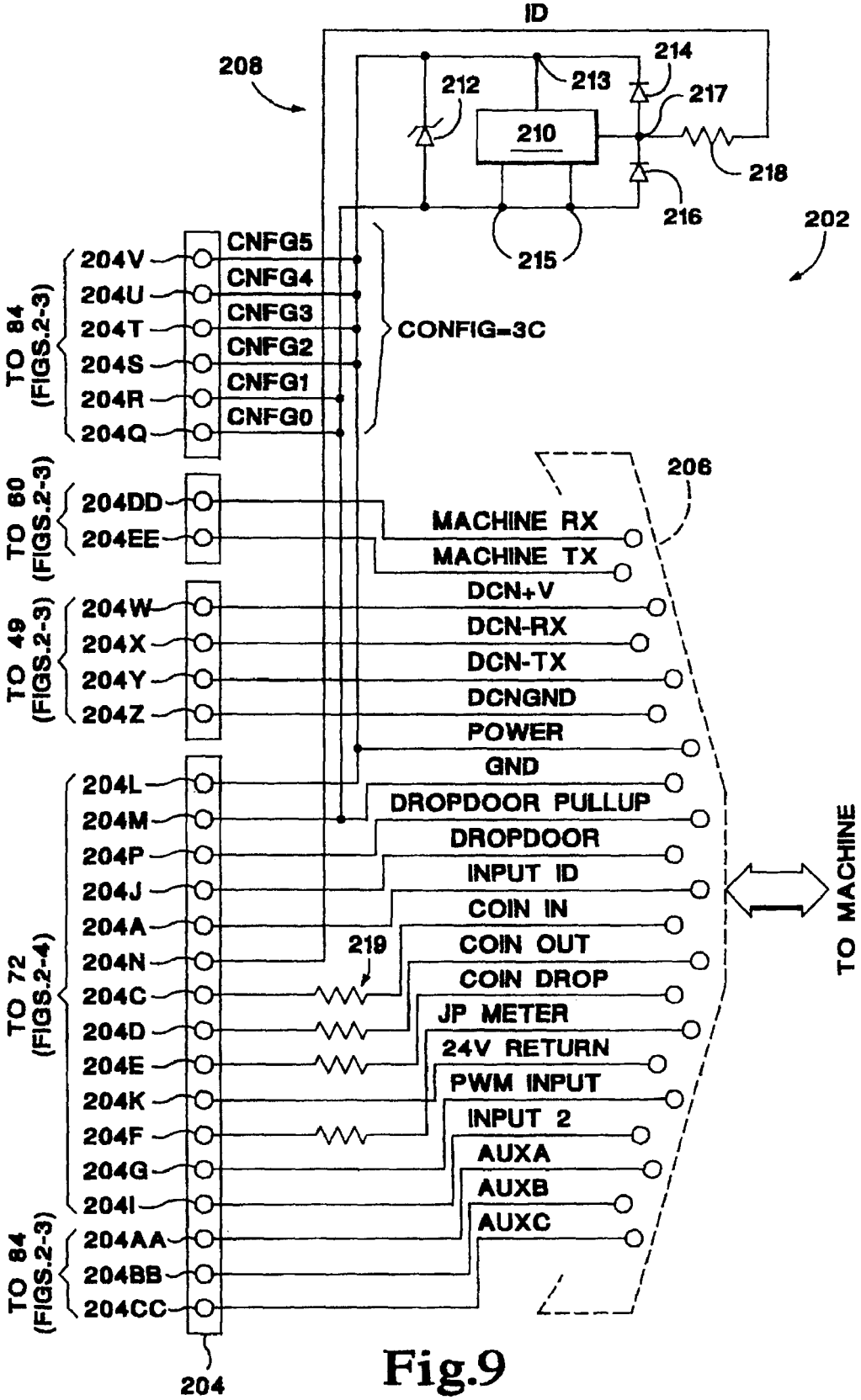
FIG. 9 is a schematic diagram of a personality board of the electronic module of FIG. 2.

Referring now to FIG. 9, a personality board 202 is shown in schematic form. The personality board 202 uniquely identifies the gaming device on the network. The personality board 202 indicates the type of gaming device, e.g., slot machine or video poker, including the manufacturer, and provides a unique machine identification number that the host computer can use to uniquely address the gaming device. The personality board 202 allows the devices to be readily removed and reinstalled in the network without any manual reconfiguration by the operator, such as resetting dip switches.

The personality board 202 couples the data communication node 42 to a gaming device. The personality board 202 includes two connectors 204 and 206 and an identification circuit 208. The connector 204 couples to the data communication node 42, as described further below. The connector 206 connects to the particular gaming device. The components shown in FIG. 9 are mounted on a printed circuit board that is mounted inside a connector harness (not shown). The personality board allows the DCN to be easily removed and reinstalled from the network with minimal effort.

The personality board uniquely identifies the machine by providing both a configuration number, which indicates the type of gaming device that is connected to the connector 206 and a unique identification number, which is used by the system 10 to maintain records on the machine. The configuration number includes a six bit binary number which indicates the type of gaming device connected to the personality board 202. Each machine type is assigned a unique configuration number. This configuration number is encoded on lines CNFG0–CNFG5, which are connected to terminals 204Q–204V, respectively, of connector 204. Each line represents one bit of the binary configuration number. The individual lines are either tied to a supply voltage to represent a binary one or to ground to represent a binary zero. The six bit configuration number used in the preferred embodiment can encode up to $2^{6}$ different combinations and, therefore, different machine types. The configuration number for the embodiment shown in FIG. 9 is equal to 3CH.

The configuration lines CNFG0–CNFG5 are coupled to the inputs of parallel to serial converter 86 (FIG. 3) through a connector (not shown). The terminals 204Q–204V of connector 204 have corresponding terminals 85Q–85V of connector 85, as indicated by corresponding lettered suffixes. This same lettering convention is used throughout.

The configuration number is used by the DCN controller 46 as a means of interpreting the discrete input signals received from the machine through connector 206. Individual conductors coupled between connector 204 and 206 are labeled to correspond to the machine type having a configuration number 3CH. For a different machine type having a different configuration number, many of these conductors may have different functions. By providing a unique configuration number, the DCN controller can interpret the signals received on these lines accordingly.

The personality board 202 also includes an identification circuit 208 which provides a unique machine identification number to the data communication node 42. The unique identification number is stored in a nonvolatile memory 210 and provided to a terminal 204N on conductor ID. In the preferred embodiment, the nonvolatile memory 210 is a part number DS2224 manufactured by Dallas Semiconductor of Dallas, Tex. In the preferred embodiment, the nonvolatile memory 210 includes a 32 bit ROM having a factory-lasered unique serial number stored therein. This serial number, i.e., the machine identification number, can be read out of the memory 210 by the DCN controller 46 to uniquely identify the machine connected thereto. The protocol for reading the identification number out of the memory 210, as is described in the data sheet for the part, is well known in the art.

The identification circuit 208 includes a number of discrete components. The memory 210 has a zener diode 212 coupled across the power and ground terminals of 213 and 215 thereof. The identification circuit 202 also includes a first diode 214 coupled between the power terminal 213 and a data output terminal 217. The circuit 208 further includes a second diode 216 coupled between the data output terminal 217 and the ground terminals 215. A resistor 218 is interposed between the data output terminal 217 and the connector terminal 204N. The terminal 204N is coupled to a corresponding terminal 74N of connector 74 (FIG. 4) by a bus 220 (FIG. 2).

The discrete outputs from the machine, e.g., coin in, coin out, etc., are also supplied to the data communication node 42 via bus 220. The bus 220 connects connector 74 of the data communication node 42 and the connector 204 of the personality board 202 such that terminals having corresponding lettered suffixes are connected. For example, terminal 74C of connector 74 is connected to terminal 204C of connector 204 by a individual conductor within bus 220. All the other terminals are similarly connected by the bus 220.

The network interface 49 of the data communication node 42 is also coupled to the personality board by a bus 222, as shown in FIG. 2. Bus 222 includes four conductors which connects the four terminals of connector 51 with four corresponding terminals of connector 204, as indicated by the common lettered suffixes. It is over these four lines that the DCN controller 46 indirectly communicates with the floor controller.

The serial machine interface 60 is also coupled to the personality board 202 by a bus 224, as shown in FIG. 2. The bus 224 includes four conductors which couple four terminals 62DD and 62EE of connector 62 with corresponding terminals 204DD and 204EE, respectively. It is over these four conductors that the DCN controller 46 communicates reconfiguration commands to the machine. The DCN controller transmits data through the terminal 204DD, which is provided to the machine on conductor MACHINE RX. The machine responds to the configuration command on the conductor MACHINE TX. The use of these two conductors will become more apparent in the description of the operation hereinbelow.

Although buses 220, 222, 224 and 226 have been described as separate buses, the individual conductors within these buses could, and are in the preferred embodiment, combined into a single bus that is connected between the data collection node 42 and the personality board 202. To connect the data collection node 42 and the personality board 202 a connector (not shown) is mounted on the data collection node 42 and a mating connector (not shown) is mounted on the personality board 202. The two connectors are then mated together to connect the data collection node 42 to the personality board 202. The personality board is then coupled to the corresponding gaming device by a cable 225 (FIG. 2).

E. BONUS DISPLAY DRIVERS

Figures 10, 11:
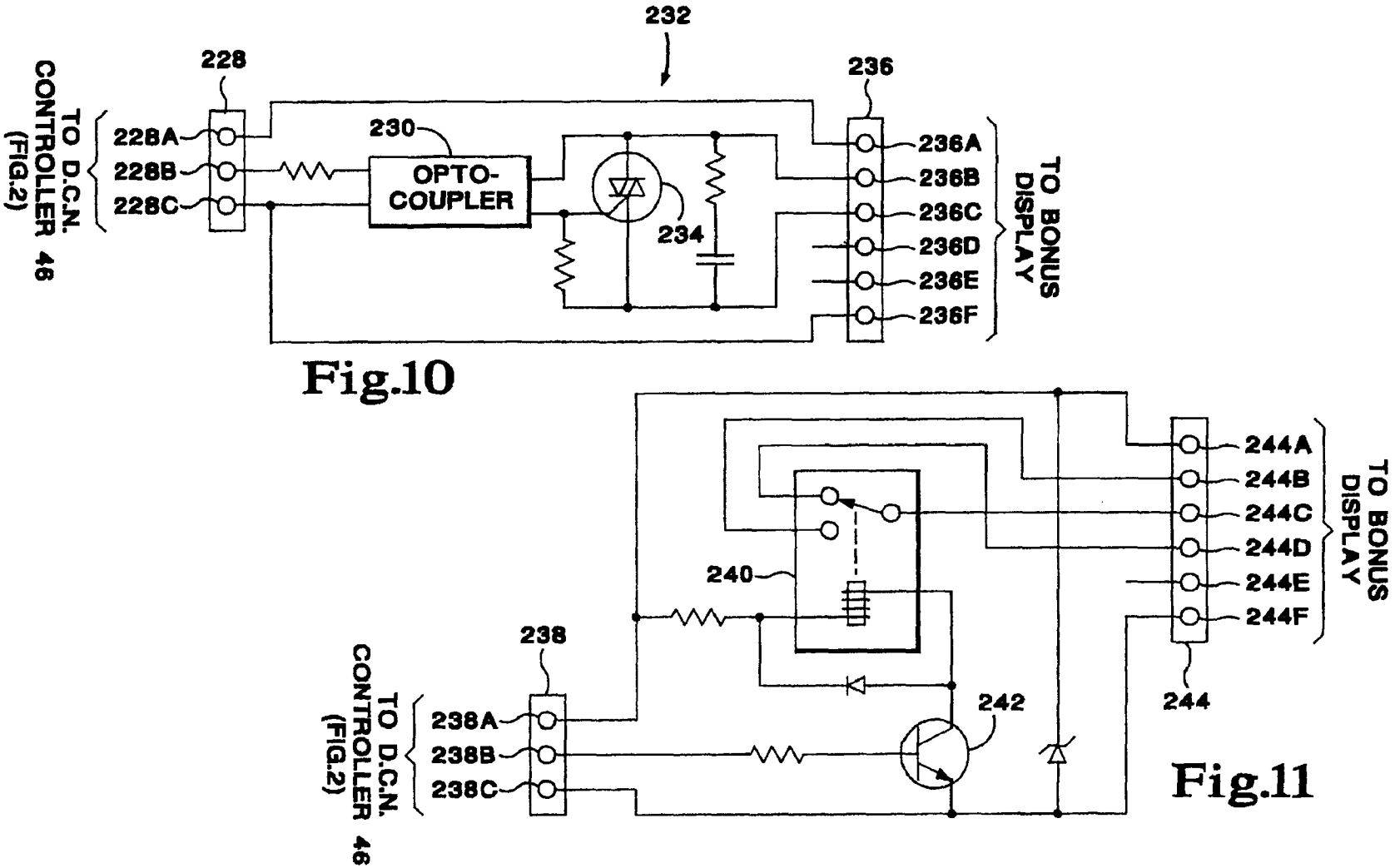
FIG. 10 is a schematic diagram of a triac driver circuit of the electronic module of FIG. 2.
FIG. 11 is a schematic diagram of a relay driver circuit of the electronic module of FIG. 2.

Referring now to FIGS. 10 and 11, two bonus display drivers are shown. The data communication node 42 is designed to support either of the display drivers. The data communication node 42 is coupled to the display driver of FIG. 10 through connector 228. An opto coupler 230 optically isolates the data communication node from a triac circuit 232 which includes a triac 234. One terminal of the triac 234 is connected to a terminal 236B of a connector 236. Another terminal of the triac 234 is connected to a terminal 236C of connector 236. A bonus display such as a light or sound generating means is coupled across terminals 236B and 236C so that the triac 234 could drive the external bonus display responsive to an actuation signal from the data communication node 42.

A second embodiment of the display driver is shown in FIG. 11. In this embodiment, the data communication node 42 is coupled to the driver circuit through connector 238. The driver circuit of FIG. 11 includes a relay 240 operatively coupled to a transistor 242. The relay 240 is a two-position relay which toggles between the two positions responsive to a current passing through transistor 242. The transistor 242 conducts a current responsive to an actuation signal received on terminal 238B from the data communication node 42.

The display drivers are used by the data communication node 42 to activate a display on the gaming device which indicates that the machine is now in a bonus mode or condition.

F. FLOOR CONTROLLER

As shown in FIG. 1, the floor controller is directly connected to both the high speed network 38 and a plurality of gaming devices. The floor controller is responsible for monitoring the activity of each of the gaming devices connected thereto and reporting this activity to the database 32. In addition, the floor controller is responsible for transmitting a reconfiguration command to a selected one or more of the gaming devices during certain bonus conditions. These conditions will be described in detail in the operation section below.

Figure 12:
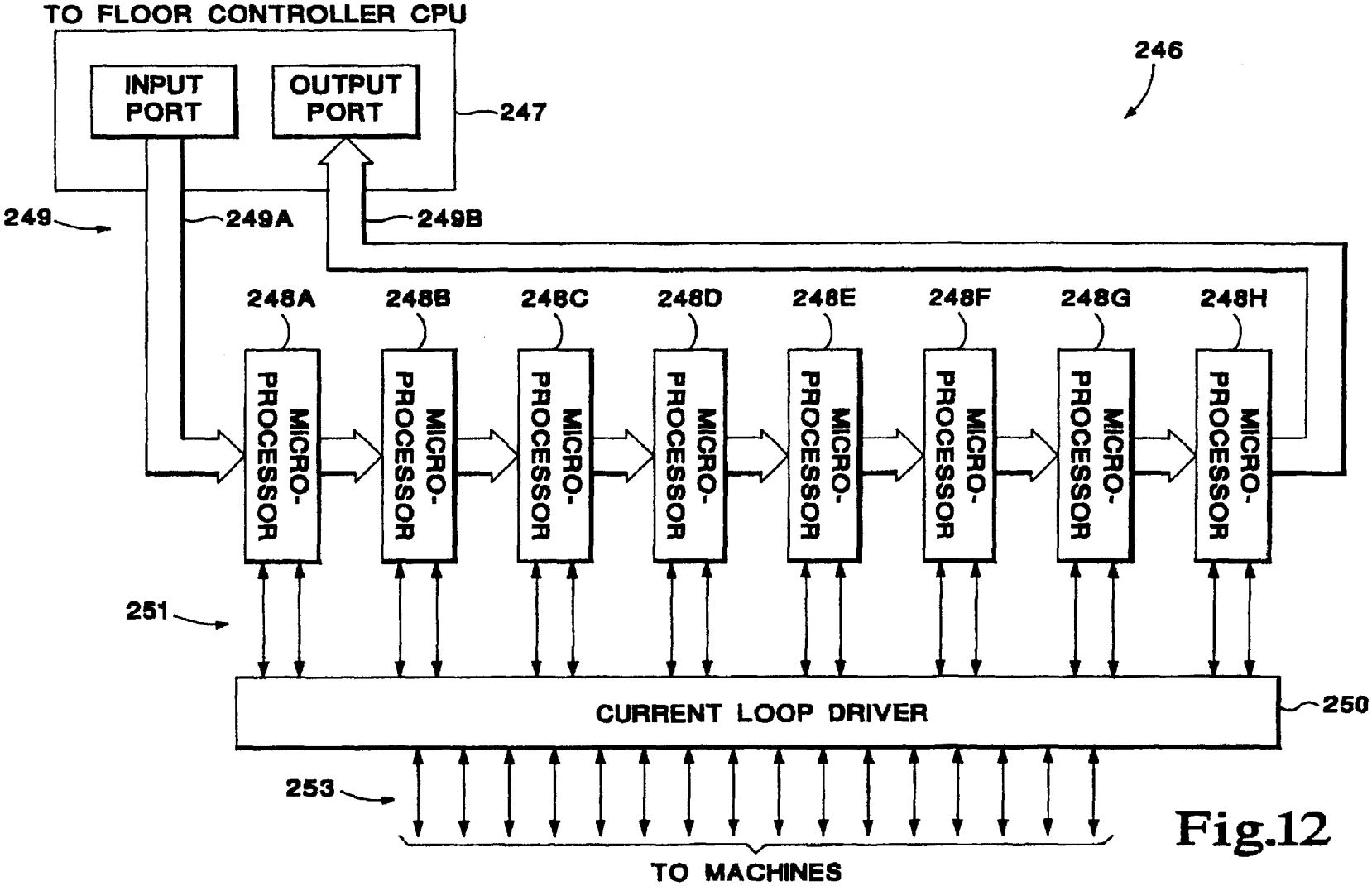
FIG. 12 is a block diagram of a communication board included in each floor controller of FIG. 1.

The floor controller is connected to the associated gaming devices by current loop networks. Because of the limitations of the current loop network, only a predetermined number of gaming devices can be supported on any one current loop network. In the preferred embodiment, each current loop network supports up to 64 gaming devices. In order for each floor controller to support more than this predetermined number of gaming devices, each floor controller is equipped with a communication board 246, as shown in FIG. 12. The communication board 246 supports up to 16 separate current loop networks. The board is a standard size card that fits into one of the ISA card slots in the back of the floor controller. The board includes a male edge connector (not shown) which mates with a female back plane connector (not shown) in the floor controller. The back plane connector provides the floor controller CPU data, address, and control lines to the communication board 246 to enable the communication board and the floor controller CPU to communicate.

The communication board 246 includes eight separate microcontrollers 248A–248H. The microcontrollers communicate with the floor controller through ISA bus interface logic 247 over buses 249A and 249B. The microcontrollers are shown in a daisy-chain connection in FIG. 12, but any other equivalent interconnection scheme can be used. The data received from the floor controller microprocessor is passed between the microcontrollers from 248A to 248H, as indicated by the arrows. Each microcontroller is responsible for passing the data along and determining whether the data includes a message for a machine connected to its corresponding current loop networks.

Each microcontroller is responsible for two current loop networks. Each microcontroller communicates with its associated gaming devices via two corresponding current loop networks. Two serial signal lines 251 connect each microcontroller to a current loop driver circuit 250. The driver circuit 250 provides the necessary current drive to support the current loop network. Each pair of serial signal lines 251 has a corresponding pair of current loop lines 253. The current loop driver circuit 250 can either be located on the communication board as shown in FIG. 12 or on a separate printed circuit board (not shown). If located on a separate board, the current loop driver circuit 250 can be connected to the communication board by a cable.

In the preferred embodiment, the last microcontroller 248H is solely responsible for communicating with the floor controller microprocessor. All of the data received from the machines over the various current loop networks are passed along to the microcontroller 248H by the associated microcontroller. The microcontroller 248H analyses the data and determines whether the data needs to be communicated to the floor controller. If not, the last microcontroller records the communication but does not forward the data to the floor controller. This helps off-load some of the floor controller communication processing to the communication board.

II. OPERATION

The above-described system allows a casino in which the system is installed to run promotions on any properly equipped gaming machines while simultaneously gathering player tracking and accounting data from all machines. The system provides the capability for the casino to select which of the plurality of machines are used in any given promotion. The system further allows any number of different promotions to operate simultaneously.

Each promotion involves sending a reconfiguration command from the floor controller to a gaming device that has been selected to be part of a given promotion over the associated network. Upon receipt of the reconfiguration command, the gaming device reconfigures its payout schedule in accordance with the received reconfiguration command. As described above, reconfiguring a gaming device payout schedule, in the preferred embodiment, includes activating a bonus payout schedule that pays out bonus amounts in addition to the amount determined by the device payout table.

A partial list of the promotions according to the invention include, but are not limited to: a multiple jackpot wherein the gaming device reconfigures its payout to be a multiple of its default payout schedule; a bonus jackpot wherein the gaming device reconfigures its payout schedule to payout an additional bonus amount when certain conditions are met; and a progressive jackpot wherein two or more gaming devices are combined in a progressive jackpot having a progressive jackpot payout schedule. In addition to these, many other promotions are possible by the above-described system for controlling and monitoring a plurality of gaming devices.

The system 10 also allows for improved player tracking. As with standard player tracking, the above-described system monitors and reports how many coins are played by each player. The system 10, however, also includes the ability to record how long each player spends at each machine and the number of coins won, games played, and hand jackpots won by each player. All this information is stored on the database, which can be later analyzed for future targeted direct mailing campaigns. The player tracking according to the invention also allows the casino to schedule buses and other groups and measure their profitability. The system also allows for cashless play as well as advanced accounting and security features.

Another feature of the above-described system is jackpot announcements. The jackpot announcement feature displays a message on a reader board or display located in the casino which announces a jackpot as soon as a jackpot is won, i.e., as soon as the reels stop spinning. The floor controller generates the jackpot announcement once a DCN connected thereto indicates a jackpot is won. An example of such a message might be: "Now paying on machine 1342, a jackpot of $300." With prior art data collection systems, the amount of the jackpot is only known after the payment is made. Even then the system must account for partial pays, hopper empty, etc.

An advantage of the current system over prior art systems is the ability to implement better tournament systems. In a slot tournament, players pay a fee to play. All play during the session is free. The players accumulate credits instead of cash. The person with the most credits at the end of the tournament wins. Games are usually manually altered to provide payouts of 200 to 300% to make the games more fun. The games are altered manually by replacing the read only memory (ROM) in the gaming devices.

One exciting aspect of tournament play is to see who is ahead. No current system can display this information in real time. This is because current systems can only measure winnings as they are added to the credit meter or paid from the hopper (some casinos use tournament tokens instead). Since credits are usually added at a rate of 10 per second, a 1,000 credit win can take 100 seconds to register. Casinos attempting to create display boards showing who is ahead are frustrated by the lag time. The jackpot announcement of the invention allows casinos to display the player with the most credits by comparing the number of credits for each player. This comparison and display is performed real time as each transaction is completed.

In order to implement each of these features, the various computers and microcontrollers each execute software or firmware. This software and firmware routines are described below. These routines are described with reference to accompanying flow charts. These flow charts would enable one of ordinary skill in the art of computer programming to write a corresponding computer program which the computer or microcontroller could execute.

A. DATA COMMUNICATION NODE

1. POWER UP PROCEDURE

Figure 13:
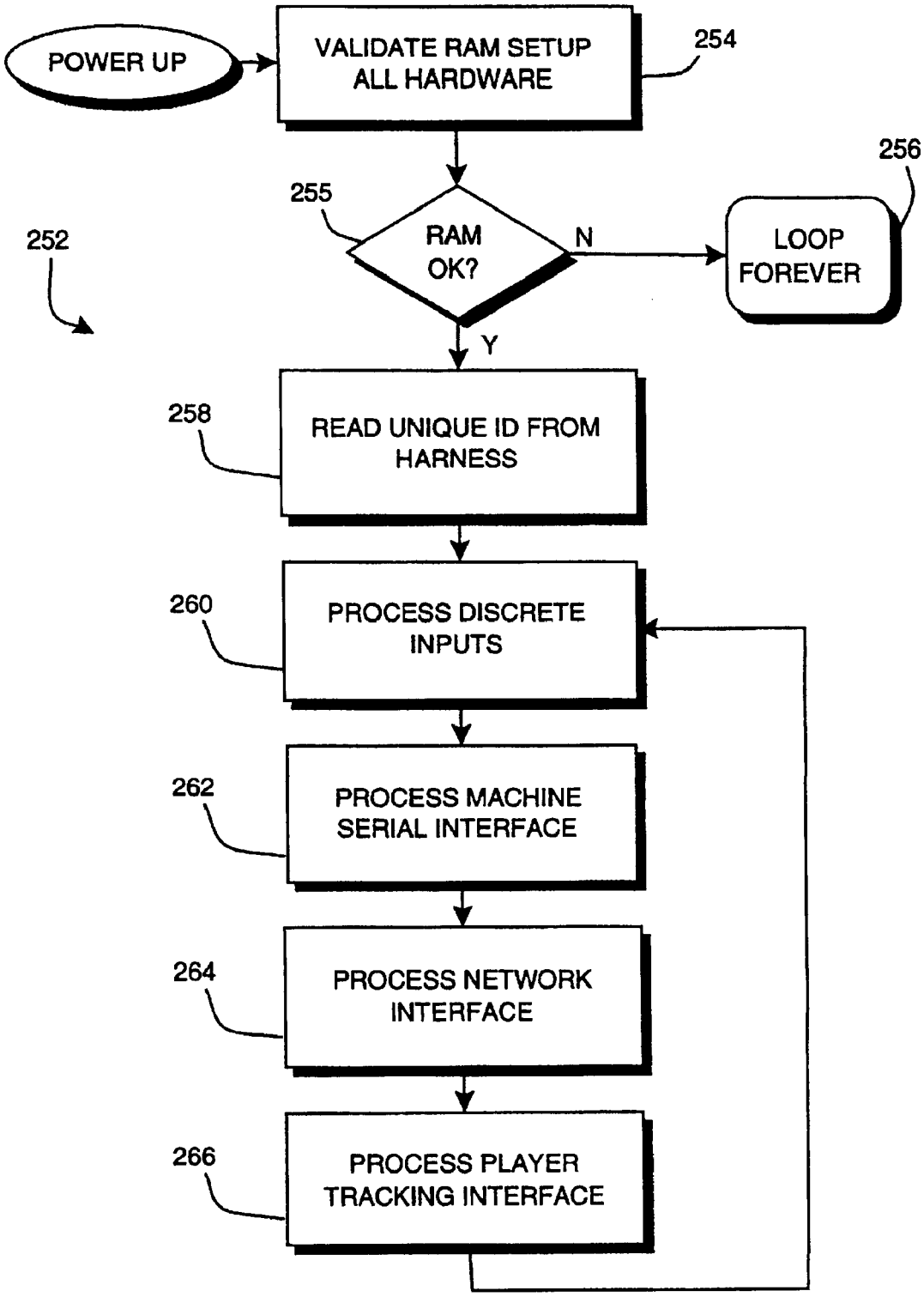
FIG. 13 is a flow chart for the power-on procedure for the data communication node (DCN) of FIG. 2, which is implemented in firmware executed by the DCN controller.

Referring now to FIG. 13, a power up procedure 252 for the data communication node is shown. This procedure is executed by the DCN controller 46 when initially powered up. The first step of the procedure is to validate the RAM to ensure that it is not corrupted and to set up all the DCN hardware. Validating the RAM involves writing known patterns of 1s and 0s to the DCN RAM. This RAM can either be internal to the DCN controller 42 or external as shown in FIG. 2. Setting up the DCN hardware includes initializing timers and interrupts.

Next the DCN controller checks the RAM in step 255 by reading the pattern of 1s and 0s back out of the RAM to ensure that the RAM is fully functional. If the RAM turns out to be defective the DCN controller goes into an endless loop in 256.

2. READING UNIQUE IDENTIFICATION NUMBER

If the RAM is fully functional, the DCN then reads the unique identification number from the personality board. As described above, this unique identification number is stored in a nonvolatile memory 210 on the personality board. Reading the unique ID number out of the nonvolatile memory involves following the memory manufacturer's interface protocol as specified in the nonvolatile memory data sheet. The unique identification number provides a means for uniquely identifying the gaming device.

After the unique ID has been read from the personality board, the DCN processes the discrete machine inputs in step 260. This step will be described in further detail in Subsection 3, MONITORING GAMING DEVICE DISCRETE INPUT below. After the discrete inputs have been processed in step 260, the DCN processes the machine serial interface in step 262. This step is described further below in Subsection 4, PROCESSING GAMING DEVICE SERIAL INTERFACE. Next, the DCN processes the network interface, i.e., the interface between the DCN and the floor controller connected thereto. The process network interface step 264 is described further below in Subsection 5, PROCESSING NETWORK INTERFACE. Finally, the DCN processes the player tracking interface in step 266. This step is described below in Subsection 6, PROCESSING CARD INSERTION. At the completion of step 266 the DCN loops back to step 260 and continuously, sequentially executes steps 260–266.

3. MONITORING GAMING DEVICE DISCRETE INPUT

Figure 14:
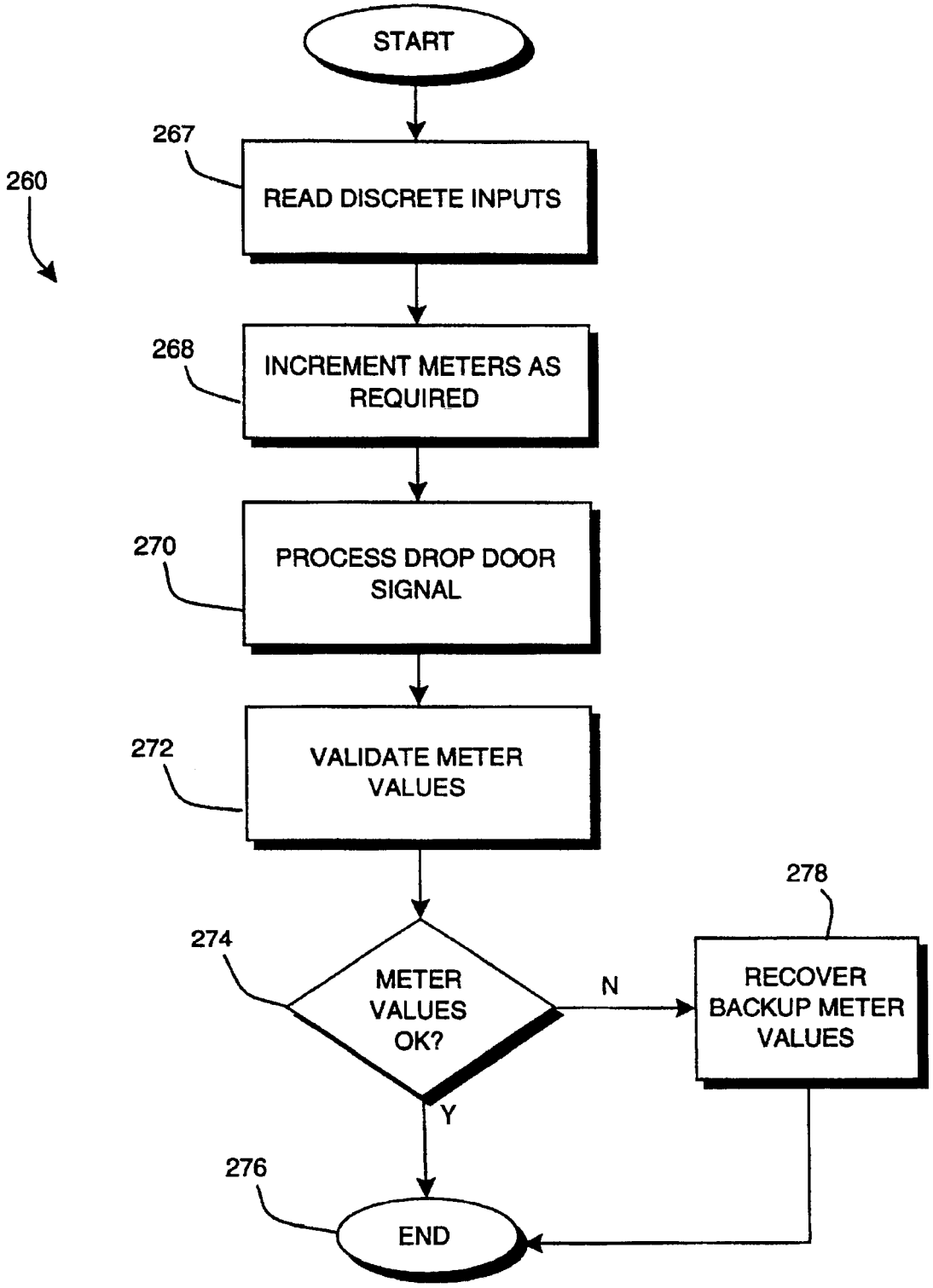
FIG. 14 is a flow chart for processing of the discrete gaming device inputs, of FIG. 13.

Referring now to FIG. 14, the DCN step of monitoring the gaming device discrete inputs 260 will now be described. The DCN first reads the discrete inputs on input lines 76 in step 267. One particular set of discrete inputs is shown in FIGS. 4 and 9 for a particular gaming device. The actual discrete inputs present will depend on the machine type, as indicated by the configuration number, which is also read by the DCN controller 46. Most gaming devices provide at least some of the following discrete inputs: coins in, coins out, coins to drop, games played, attendant paid jackpots, slot door, drop door, progressive jackpots, and bill validators. The system supports all of these discrete inputs as well as others.

The DCN keeps track of the machine activity by maintaining several meters in memory. Each meter, in the preferred embodiment, includes six digits. Moreover, to improve the reliability of the system, the DCN maintains redundant backup copies of these meters with an order to replace the original meters in the event that the originals are corrupted. In step 268, the DCN increments the meters as required based on the discrete inputs. The meters are maintained even in the event that the DCN is disconnected from the floor controller. Once the DCN is reconnected to the floor controller, all the activity level information is then available. Step 268 will be discussed further below.

Next, the DCN processes the drop door signal in step 270. The drop door signal DROP DOOR indicates that the drop door on the machine has been opened. This is an important event and is therefore processed separately.

In step 272, the DCN validates the meter values to determine whether the values stored in the meters are valid. The DCN checks whether the meter values are valid in step 274. In the preferred embodiment, a check sum is maintained for each meter value. Thus, the DCN in step 274 checks to see whether the check sum is correct based on the current meter value. If the meter values are okay, the discrete input monitoring step 260 is complete. If the meter values are not valid, the DCN replaces the meter values with the redundant back copy of the meter values in step 278, and then the step 260 is complete.

Figure 15:
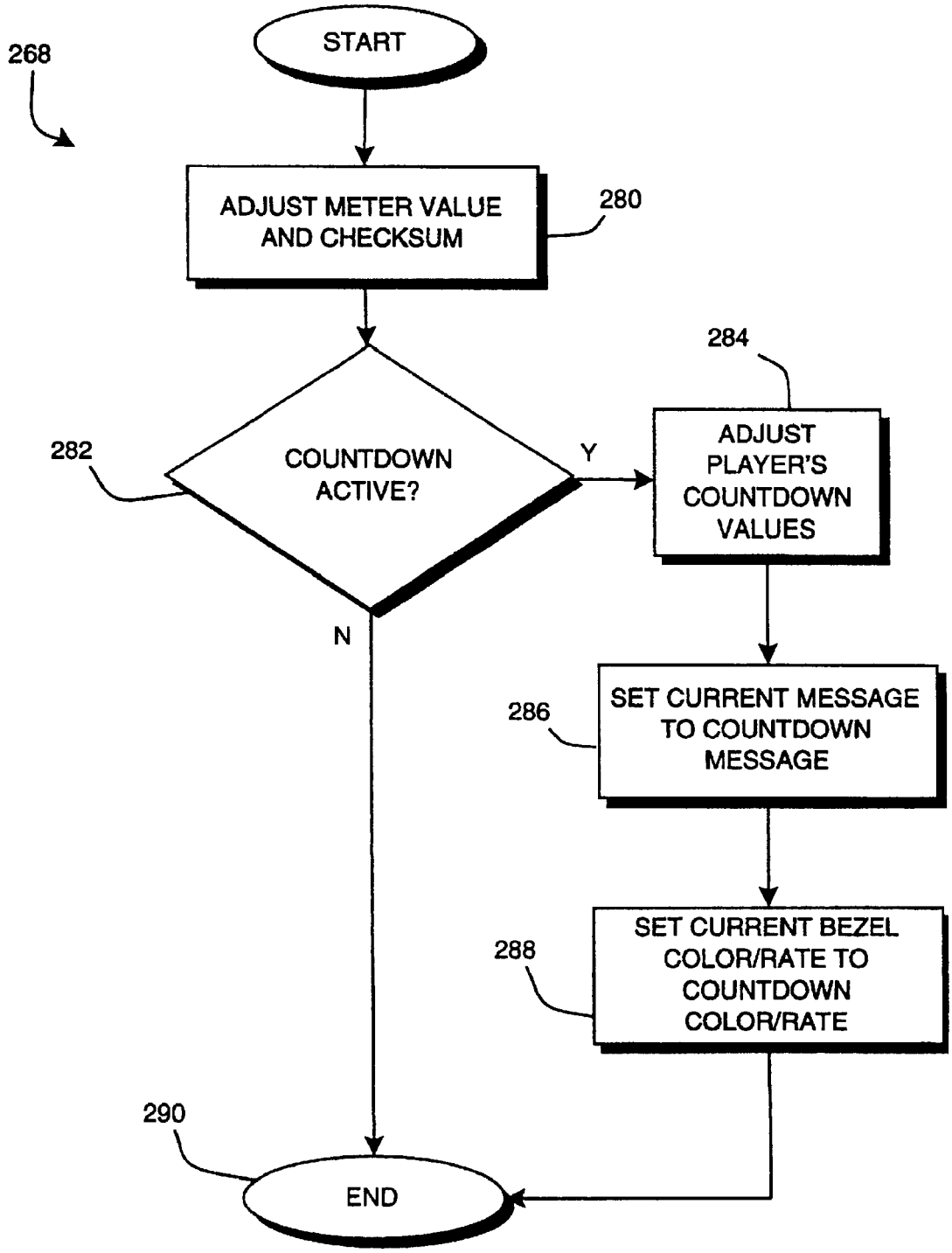
FIG. 15 is a flow chart for the step of incrementing meter counts associated with each gaming device of FIG. 14, which is implemented in firmware executed by the DCN controller.

Referring now to FIG. 15, increment meter step 268 is shown in further detail. The sequence shown in FIG. 15 is repeated for each meter value that has changed. The first step is to adjust the meter value based on the discrete inputs and to calculate the associated check sum. Next, the DCN determines whether the particular meter has an active associated countdown count in step 282. Some games or promotional activities require the player to reach a certain level of activity in order to be eligible for certain bonus points. These countdown counts are used to determine whether the player has achieved this level of activity. For example, the player may be required to play a certain number of coins before being awarded any points. If the countdown count is active, the DCN adjusts the current players count down values in step 284 based on the corresponding adjustment of the associated meter.

In step 286, the DCN sets the current message to the count down message. The count down message indicates to the player when he or she will be eligible for the bonus points. Finally, in step 288 the DCN sets the current bezel color and rate to a count down color and rate. This color and rate information is subsequently transmitted to the player tracking node for processing, as described further below. The countdown color indicates the bezel color and the count down rate indicates that flashing rate of the bezel color displayed during the count down message.

4. PROCESSING GAMING DEVICE SERIAL INTERFACE

Figure 16:
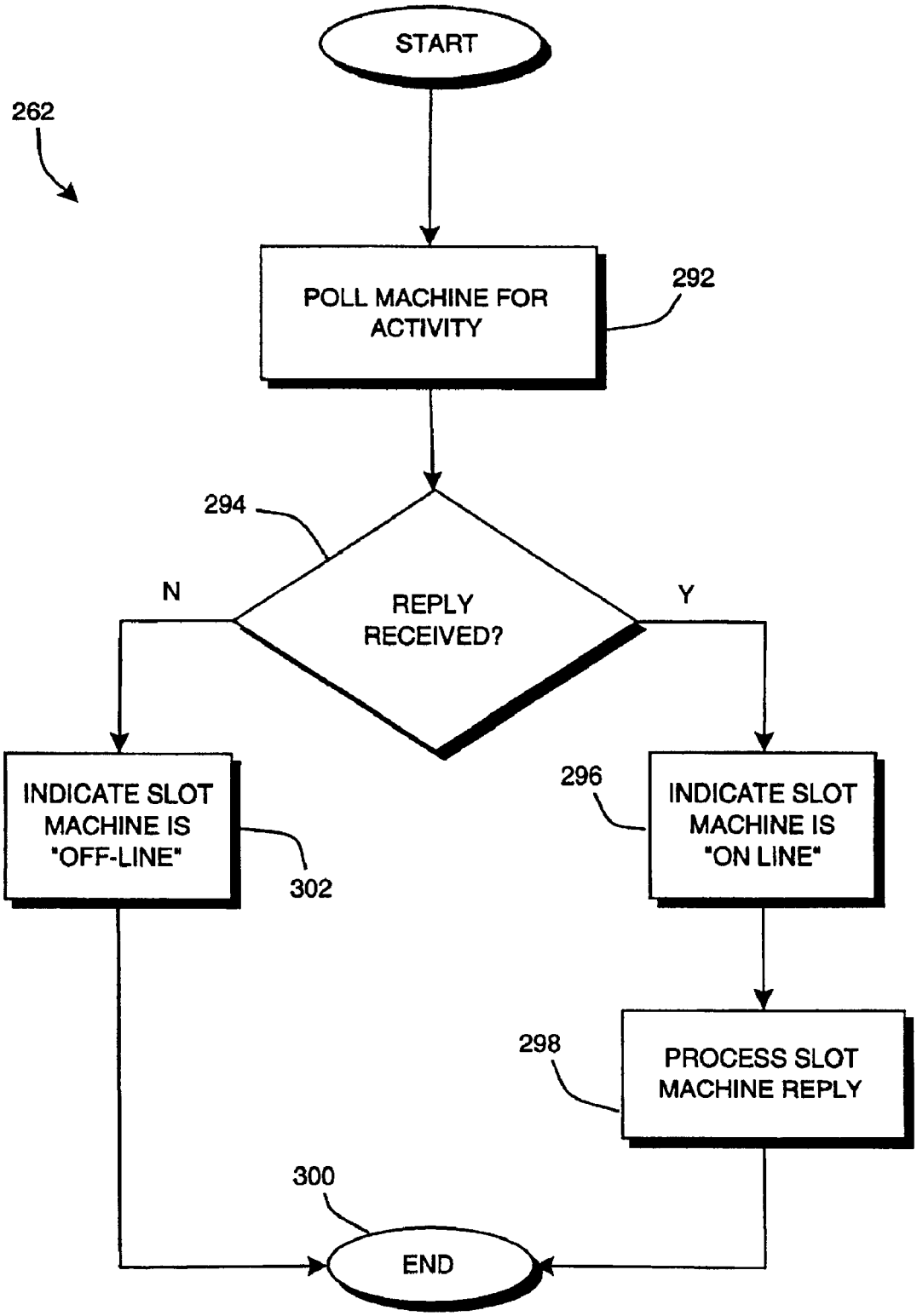
FIG. 16 is a flow chart for the step of processing the serial interface between the gaming device and the data communication node of FIG. 13, which is implemented in firmware executed by the DCN controller.

Referring now to FIG. 16, a process 262 for processing the gaming device serial interface is shown. The serial machine interface 60, as shown in FIG. 2, allows the DCN controller 46 to communicate with the gaming device through the personality board. This serial machine interface allows the DCN controller 46 to transmit reconfiguration commands to the gaming device in order to reconfigure the payout schedule of the machine in accordance with the reconfiguration command. In addition, the serial machine interface provides an additional means for determining the activity level of the gaming device. Instead of reading the discrete machine inputs, the DCN controller 46 can transmit a status request command to the machine over the serial interface and the machine can respond back with the requested status information.

Any communication protocol can be used to implement this communication path over the serial machine interface, as is known in the art. An example of one such protocol uses a data packet including a command code, a message sequence number, a CRC, and a variable length message. In the preferred embodiment, either the DCN controller 46 or the machine can initiate communications over the serial machine interface. However, if the machine detects that the DCN is trying to send a message to the machine, the machine must abort its message and attempt to resend the message at a later time.

The preferred embodiment of the system supports many different reconfiguration commands. A partial list of the reconfiguration commands is given below in Table 1. These reconfiguration commands are sent from the DCN controller 46 to the machine over the serial machine interface wherein the machine reconfigures its payout schedule in accordance with the particular reconfiguration command. The reconfiguration commands do not originate with the DCN, instead the reconfiguration commands originate from the floor controller and are transmitted to a particular machine over the associated current loop network or the command can originate at one of the other computers on the high speed network. The DCN is simply responsible for forwarding the reconfiguration command onto the gaming device on receipt of the reconfiguration command over the associated current loop network coupled between the floor controller and the DCN.

TABLE 1

| Examples of Reconfiguration Commands |
|---|
| 1. Bonus Pay From Hopper (Coin Format) |
| 2. Bonus Pay to Credit Meter (Coin Format) |
| 3. Bonus Pay from Hopper (Dollar Format) |
| 4. Bonus Pay To Credit Meter (Dollar Format) |
| 5. Add Non-cash outable credits to Game |
| 6. Begin Double Jackpot Time |
| 7. Stop Double Jackpot Time |

The actual process of processing the machine serial interface begins in step 292 wherein the DCN polls the machine to determine its level of activity. This polling step includes sending a status message from the DCN to the machine over the serial machine interface. In response, the machine will send a packet of status information indicating the current amount of activity on the machine. The status information included in the response will depend on the type of machine that the DCN is communication with.

The data communication node 42, in step 294, waits for a reply to the status request. If a reply is received, the DCN indicates that the machine is "on line" in step 296 and processes the machine reply in 298. The step of processing the machine reply includes updating the meter values, as done when processing the discrete inputs. After the machine reply has been processed, the process 262 is complete.

If the DCN does not receive a reply from the machine in step 294, the DCN indicates that the machine is "off line". The DCN will wait for a predetermined amount of time before deciding that the reply is not received. In the preferred embodiment, this predetermined period is approximately 110 milliseconds.

5. PROCESSING NETWORK INTERFACE

Figure 17:
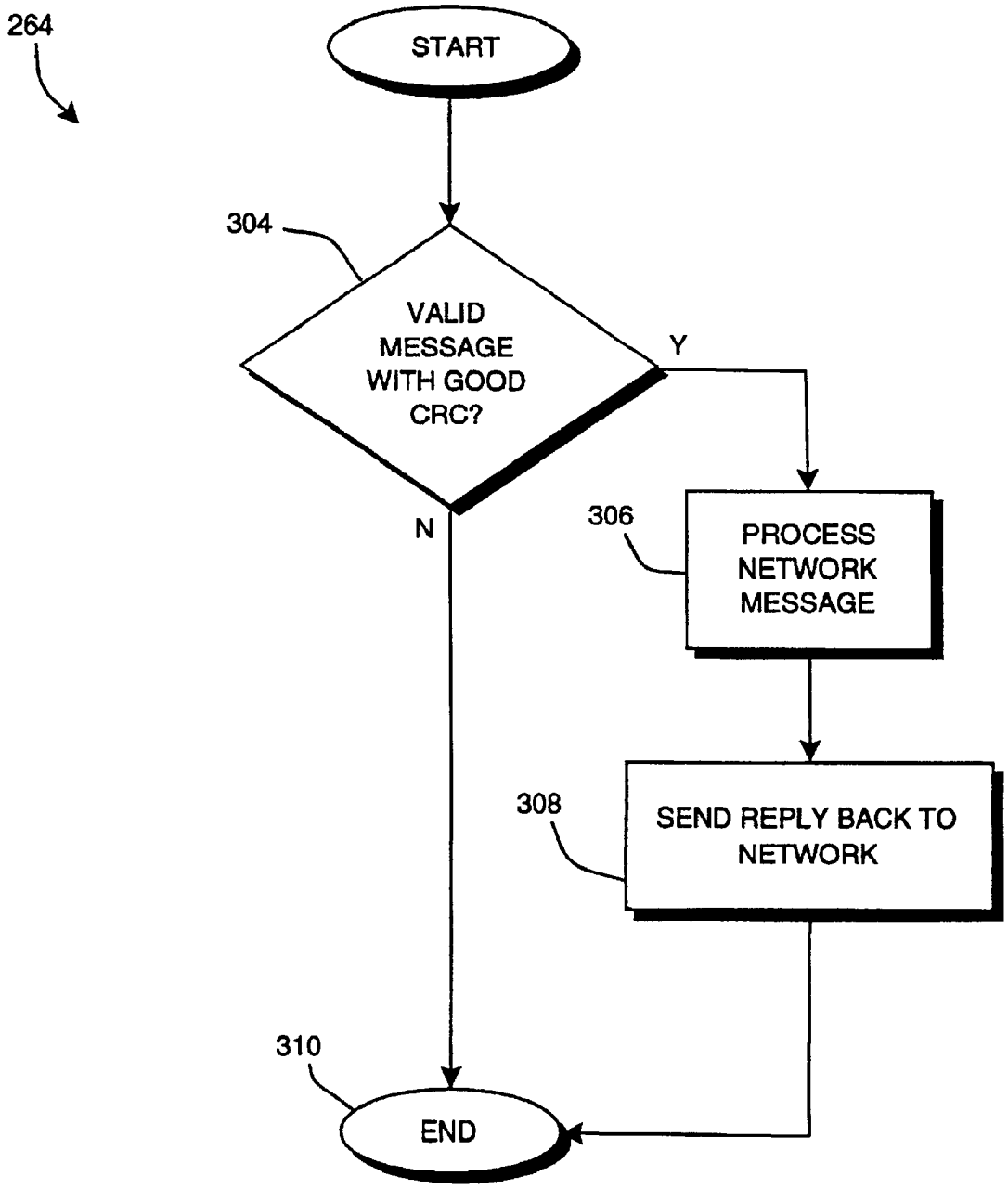
FIG. 17 is a flow chart for the step of processing the network interface between the floor controller and the data communication node of FIG. 13, which is implemented in firmware executed by the DCN controller.

Another step in the DCN power up procedure 252 is the step of processing the network interface 264. This step is described with reference to FIGS. 17–19. The network interface refers to the current loop that connects the particular DCN with the associated floor controller. The following description assumes that the DCN has received a valid message from the associated floor controller. Because there are multiple DCNs connected to any one current loop, the floor controller must include some means for addressing a particular machine.

Although each machine includes a unique identification number which could be used as the actual address for each DCN on the current loop, it is unnecessary to use the unique identification as the actual address because there are only a limited number of DCNs connected to each current loop. Accordingly. in the preferred embodiment of the invention, the floor controller uses a shorthand token representation of the DCN's unique identification number to address the DCN. In the preferred embodiment, a single byte address is used to address a DCN on any given current loop. This one-byte address allows up to 256 DCNs to be supported on any given current loop network. In the preferred embodiment, however, only 64 such DCNs are connected to a single current loop and therefore the single byte address is more than adequate. The single byte address substantially reduces the amount of traffic on the current loop network by reducing the number of bytes from four in the unique identification number to one for the shorthand token representation.

The floor controller is responsible for generating the unique single byte address for each data communication node on a given current loop network. The process of assigning unique single byte addresses to the DCNs is described below in Section C.

Once all the DCNs have been assigned a unique address, the DCN can begin monitoring the current loop network for messages addressed to it. If the DCN detects a message addressed to it, the DCN executes step 264. The DCN first checks to see whether the message is valid in step 304. This check is done by computing the CRC value of the message and comparing it to the CRC included with the message. If the two CRCs match, the message is valid and the DCN processes the network message in step 306. Processing the network message is described further below with reference to FIGS. 18 and 19. Once the message has been processed, the DCN sends a reply back to the floor controller over the current loop network in step 308. The actual substance of the reply will depend on the message received in step 306. If the message is invalid, the DCN does not reply.

Figure 18:
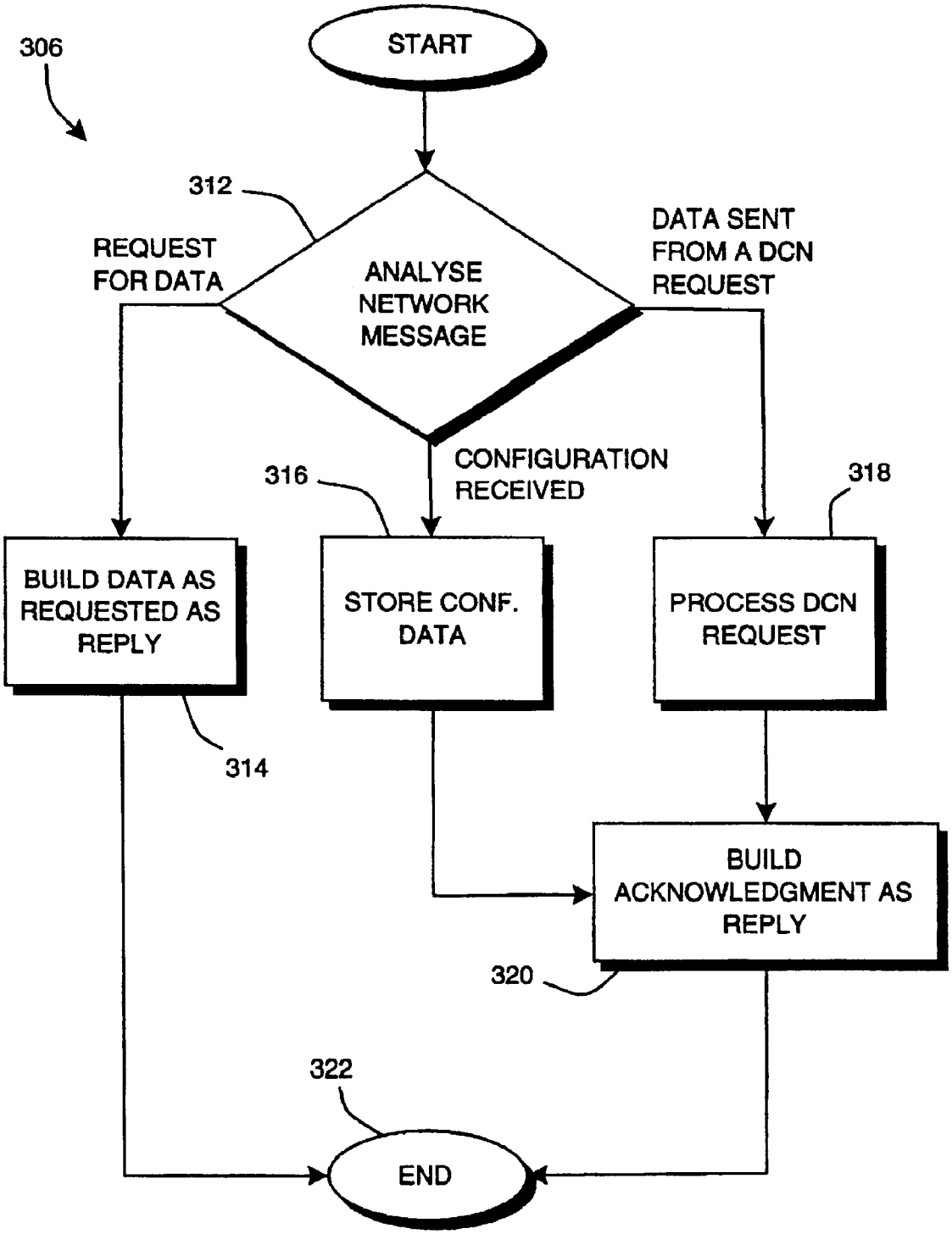
FIG. 18 is a flow chart for the step of processing the network message of FIG. 17, which is implemented in firmware executed by the DCN controller.

Referring now to FIG. 18, the first step of processing the network message is to determine what type of message was sent from the floor controller in step 312. There are three basic types of messages that the floor controller sends to the DCN. The first is a request for data from the DCN. If this type of message is detected the DCN builds the data requested and transmits the data in a reply message. The main use of this message type is to gather status and meter information from the DCN.

Another type of message is one including configuration data for the DCN. This message allows the floor controller to implicitly set the DCN's memory to a fixed value. This message is used to override the DCN's internal variables, e.g., to get a DCN out of a lock-up condition, or to download new firmware to the DCN for execution. On receiving this type of message, the DCN simply overwrites its memory with the configuration data included in the configuration message in step 316. The DCN then builds an appropriate acknowledgment and transmits this acknowledgment message to the floor controller in step 320.

The other type of message is one sent in response to a DCN request. The DCN processes this data in step 318, which is described further in FIG. 19. If the message includes either the configuration data or the data in response to a DCN request, the DCN builds an acknowledge message in step 320 and transmits this message to the floor controller.

Figure 19:
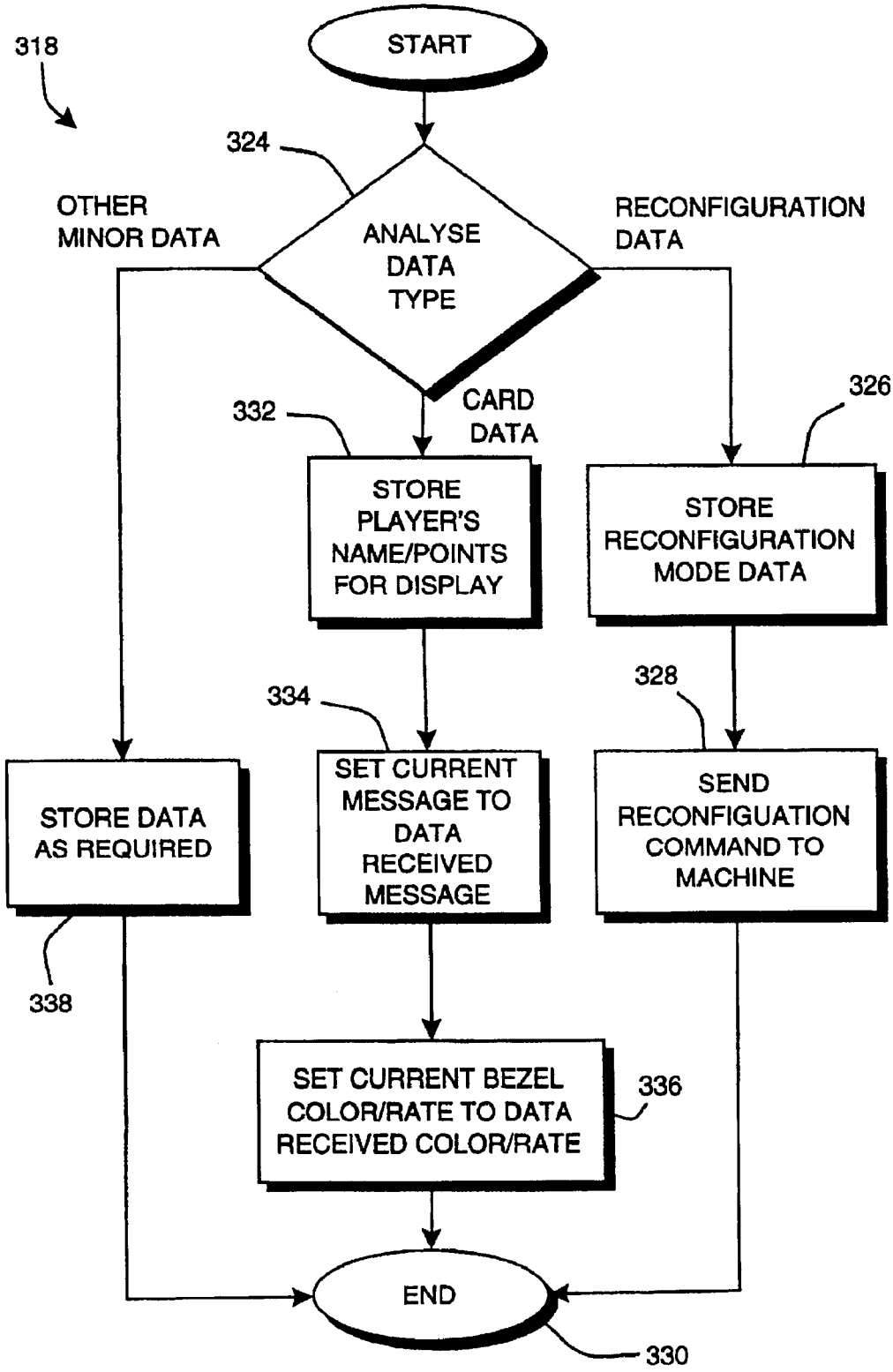
FIG. 19 is a flow chart for the step of processing the data communication node request of FIG. 18, which is implemented in firmware executed by the DCN controller.
Figure 20:
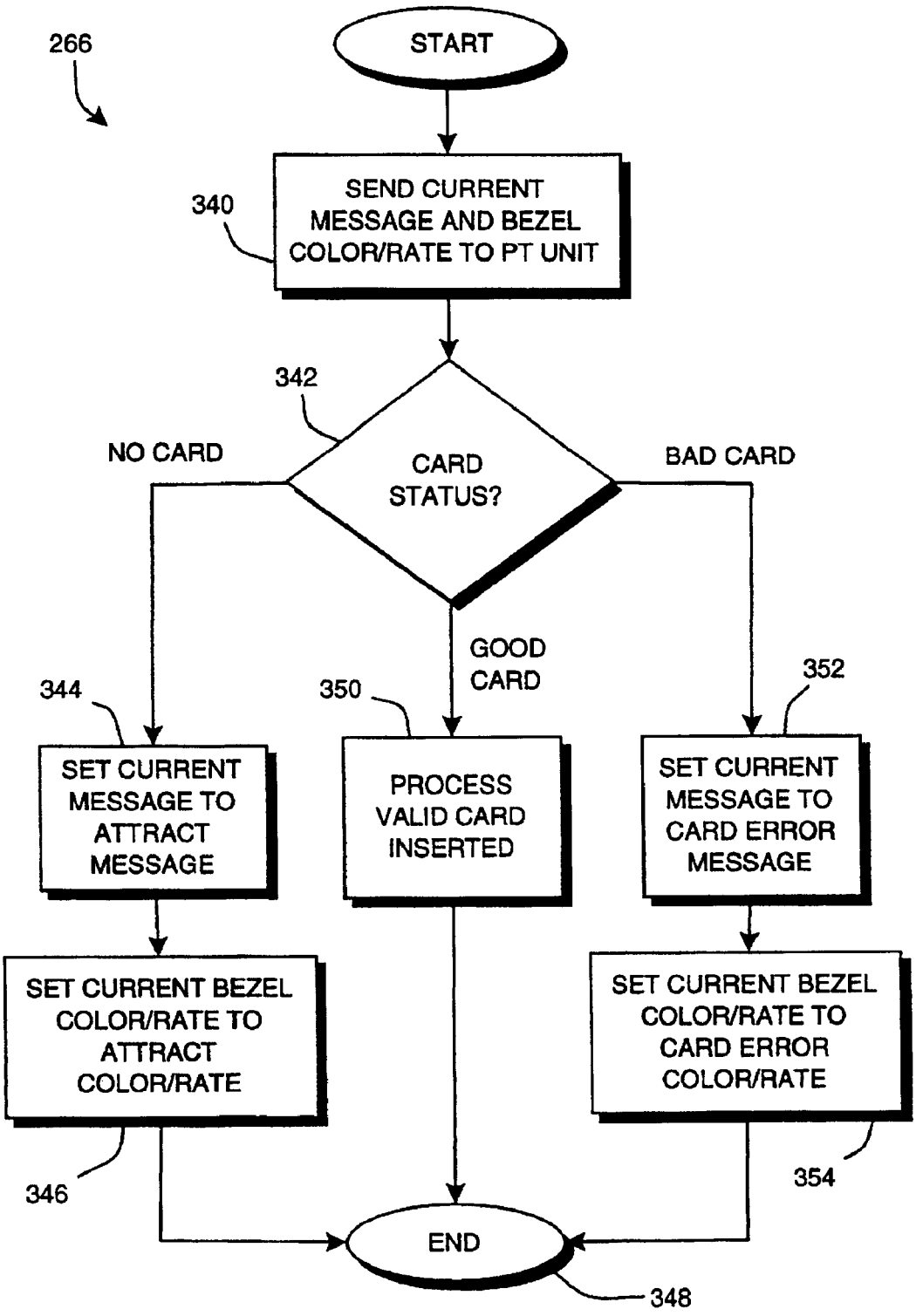
FIG. 20 is a flow chart for the step of FIG. 13 of processing the player tracking interface, which is implemented in firmware executed by the DCN controller.

The step of processing a floor controller message sent in response to a DCN request will now be described with reference to FIG. 19. The first step of processing this type of message is for the DCN to determine what type of data is included in the message. Once again there are three types of data that can be included in this message type: a reconfiguration command, card data, or other minor data. The DCN makes this determination in step 324 by analyzing one of the bytes in the data packet of the message. This byte will be referred to herein as the command byte. If the command byte indicates that the message contains reconfiguration data, i.e., the command byte equals a reconfiguration command, the DCN stores the reconfiguration data in a predefined data structure in memory. Listed below in Table 2 is an example of a data structure for storing the reconfiguration data.

TABLE 2

| Reconfiguration Data Structure |
|---|
| 1. Bonus Type |
| 2. Mystery Jackpot Data: |
| A. Number of coins to award |
| B. Number of seconds to award |
| C. Pay award to |
| 3. Bonus Time Data |
| A. Jackpot Multiplier |
| B. Jackpot Payout Limitations |
| C. Number of Seconds to Keep Bonus Time Active |
| D. Minimum Activity Level |

The bonus type field of the data structure indicates the type of bonus state the machine is to be placed in. Examples of potential bonus modes include progressive/nonprogressive, multiple jackpot, or mystery jackpot. If the mystery jackpot is indicated, the mystery jackpot data included in the structure specifies the conditions under which the mystery jackpot is paid out. The mystery jackpot can be set to payout, e.g., after a certain number of coins in, handle pulls, which is specified by subfields of the mystery jackpot data.

The bonus time jackpot is a promotion wherein the machine pays out more than that dictated by its default payout schedule. In one embodiment of the bonus time promotion, the payout schedule of the machine can be modified to be a multiple of its default to payout schedule, as specified in subfield (A) of the bonus time data. This promotion can be used to encourage gaming activity during off-peak hours, e.g., midnight to 4 a.m. on weeknights. Alternatively, the bonus time promotion can be activated on a random basis. The timing of the multiple jackpot is specified by the casino on one of the computers connected to the network. The bonus time data also specifies the conditions under which the player becomes eligible for the bonus time jackpot. The subfield (B) of the bonus time data specifies whether the player is eligible for the bonus time data only if the player is playing the maximum coin in the machine. Subfield (C) limits the bonus time promotion to a predetermined number of seconds. This field limits the bonus time promotion to a predetermined number of seconds; if the player does not hit a jackpot within this specified time period, the bonus time promotion concludes. The minimum activity level can also be specified in subfield (D). This field can be used to specify the minimum activity level required by the player in order to be eligible for the bonus time jackpot. For example, the player can be required to play at least 20 coins over the last three minutes in order to be eligible for the bonus time jackpot. An indicator light on the player's machine can be used to indicate when the player reaches the minimum activity level and thereby becomes eligible for the bonus time jackpot.

In another embodiment of the bonus time promotion, a bonus amount is awarded in addition to the payout according to the default of the payout schedule of the machine. The amount of the bonus jackpot is specified in subfield (E) of the bonus time data. For example, this bonus time promotion might include five bonus amounts of $10, $25, $50, $100 and $500, which is specified by subfield (E). When a player hits a particular jackpot, whichever bonus amount is specified by the bonus amount subfield this amount is automatically paid out in addition to the payout amount determined by the machine's default payout schedule. This bonus time promotion can also be used in combination with subfields (C) and (D) to specify the conditions under which the player is eligible for this bonus time jackpot award.

After the DCN has stored the reconfiguration data in step 326, the DCN will then send the appropriate reconfiguration command to the machine over the serial machine interface in step 328. The machine, responsive to the received reconfiguration command, reconfigures its payout schedule in accordance with the received reconfiguration command. For example, if the reconfiguration command specifies a multiple jackpot condition, the machine will reconfigure its payout to be a multiple of its default payout schedule. The machine will reconfigure its payout schedule in a similar manner for the other bonus types.

The other type of data that can be included in a response from a DCN request is card data or player tracking data. This data is sent to the DCN in response to a status message from the DCN to the floor controller wherein the status message indicates that a player card has been inserted. Included in this message is the card ID number detected by the card reader. In response to this status message the floor controller will transmit a card insertion message to the DCN. The card insertion message includes information associated with the particular player ID number. An exemplary card insertion message data packet is listed below in Table 3.

TABLE 3

| Card Insertion Message Data Packet |
|---|
| 1. Card Identification Number |
| 2. Player First Name |
| 3. Player Last Name |
| 4. Current Point Balance |
| 5. Casino Code |

Upon receipt of the card insertion message, the DCN stores the player's name and points in order for this information to be displayed on the VFD display associated with the player tracking node. Then, a DCN sets the current message to a data received message in step 334. Finally, a DCN sets the current bezel color and bezel rate to a data received bezel color and bezel rate in step 336. The bezel color specifies the bezel color to be displayed by the card reader and the bezel rate specifies the flashing rate of the card reader LEDs. This bezel information is subsequently transmitted to the player tracking node for processing thereby.

The final data type that can be included in the message sent from the floor controller in response to a DCN request is generically classified as other minor data. This data includes general system or DCN specific information such as display information.

6. PROCESSING PLAYER TRACKING INTERFACE

The next step in the DCN process is processing of the player tracking interface 266. The DCN maintains a variable that indicates what message is to be sent to the player tracking node. This variable is referred to as the current message variable. Before transmitting a message to the player tracking node, the DCN first checks this variable to see which of a plurality of messages should be sent to the player tracking node.

The process 266 begins in 340 by sending the current message to the player tracking node that is specified by the current message variable. In addition to the current message, the DCN sends the bezel color and bezel rate information to the player tracking node. The bezel color and bezel rate information could have been specified by the floor controller or by the DCN itself.

Next, the DCN determines the card status in step 342. If there is no card inserted in the card reader, the DCN sets the current message variable to an attract message. This message specifies that the player tracking node is to display a message which will attract players to the machine. Similarly, the DCN sets the current bezel color and bezel rate to an attract bezel color and rate in step 346. This attract color and rate is part of the attract message that will be sent to the player tracking node when the current message is sent.

If the DCN determines that a good card has been inserted in the card reader, the DCN processes the valid card in step 350. This step is described further below with reference to FIG. 21.

If, however, the card status indicates that a bad card has been inserted, i.e., an invalid card number, the DCN sets the current message variable to specify a card error message in 352 and the DCN sets the current bezel color and bezel rate to a card error color and rate in 354. This card error information is included with the card error message that is sent to the player tracking node when the current message is sent.

7. PROCESSING CARD INSERTION

Figure 21:
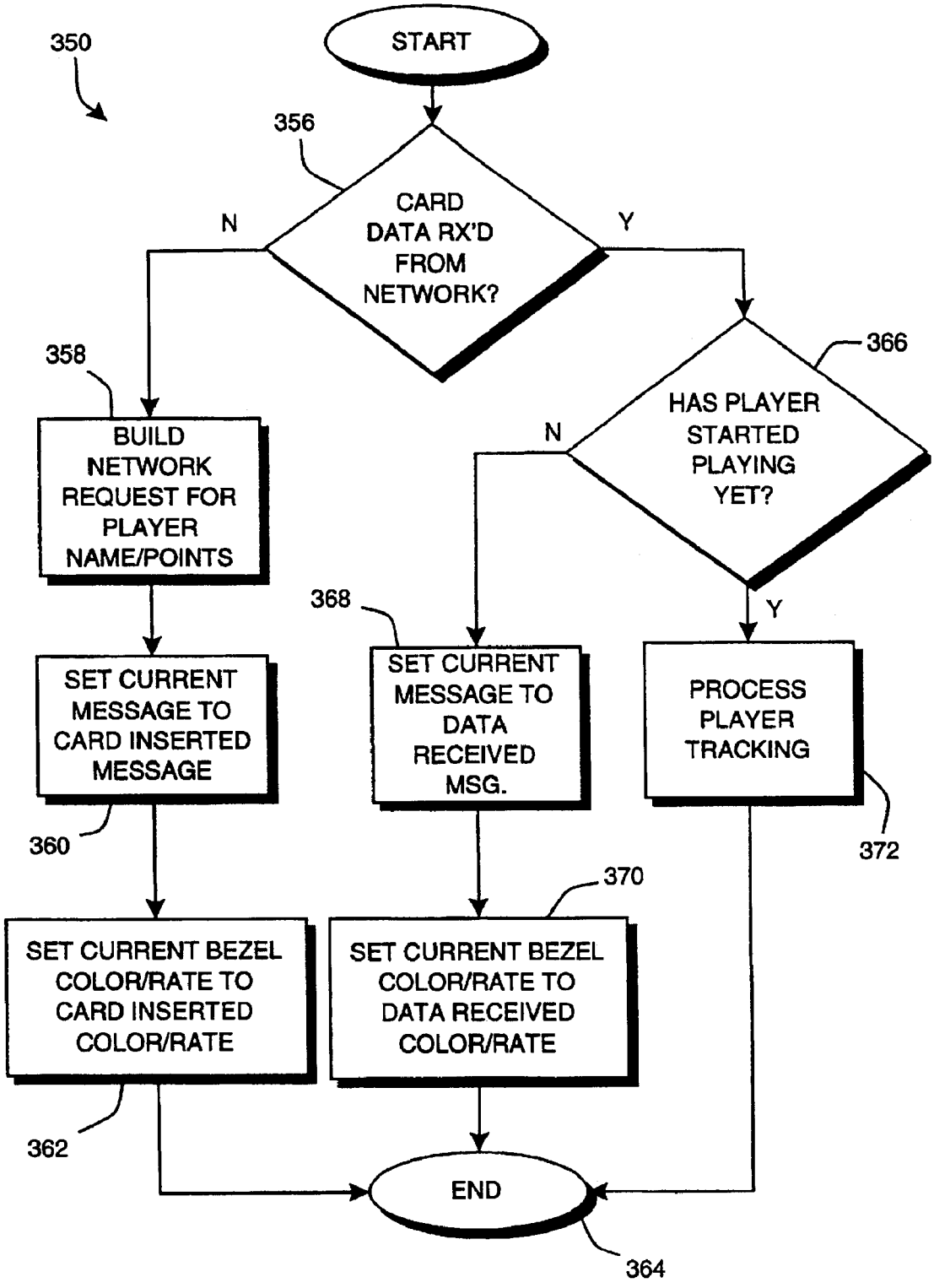
FIG. 21 is a flow chart for the step of processing a valid inserted card of FIG. 20, which is implemented in firmware executed by the DCN controller.

Referring now to FIG. 21, the process 350 for processing a valid card insertion is shown. The first step that the DCN executes is to determine whether the card data corresponding to the valid card has been received from the floor controller in step 356. If not, the DCN builds a network request message for the player name and points associated with the card ID number in step 358. Next, the DCN sets the current message variable to specify a card inserted message is to be transmitted in step 360. Finally, the DCN sets the current bezel color and rate to a card inserted color and rate, which indicates to the player that the system is still processing the card number. This information is sent to the player tracking node when the current message is sent.

If the card data has been received from the floor controller, the DCN then determines in step 366 whether player tracking has started for the particular player. If player tracking has not yet started, the DCN sets the current message variable to the data received message in step 368 and sets the current bezel color and rate to data received color and rate in step 370. If player tracking has started, the DCN processes the player tracking in step 372, as described with reference to FIG. 22.

Processing player tracking 372 begins with the step of determining whether the player has received new points in 374. These points can be considered roughly as the equivalent of "frequent flyer miles" used by airlines. These points allow the system to run promotionals whereby individuals are given points or credit associated with their card that can be redeemed toward the purchase of goods or services offered by the casino. Typically these points are redeemed at a redemption counter in the casino for meals or clothing, for example. The points, therefore, are an additional inducement to encourage play.

The player tracking system of the invention allows the casino to determine how and when the player is issued points. The casino can specify the type and number of coins that must be played before a player is awarded a given number of points. The system uses this specified information to inform the player of his or her progress towards receiving additional points. The system encourages play by informing the player of how many additional coins must be played before receiving additional points. For example, a player who is only one coin away from receiving points, but who desires to stop playing, may decide to play "one last coin" in order to receive the points. The system informs the player by displaying a message on the vacuum florescent display indicating how many coins the player is away from receiving additional points.

Figure 22:
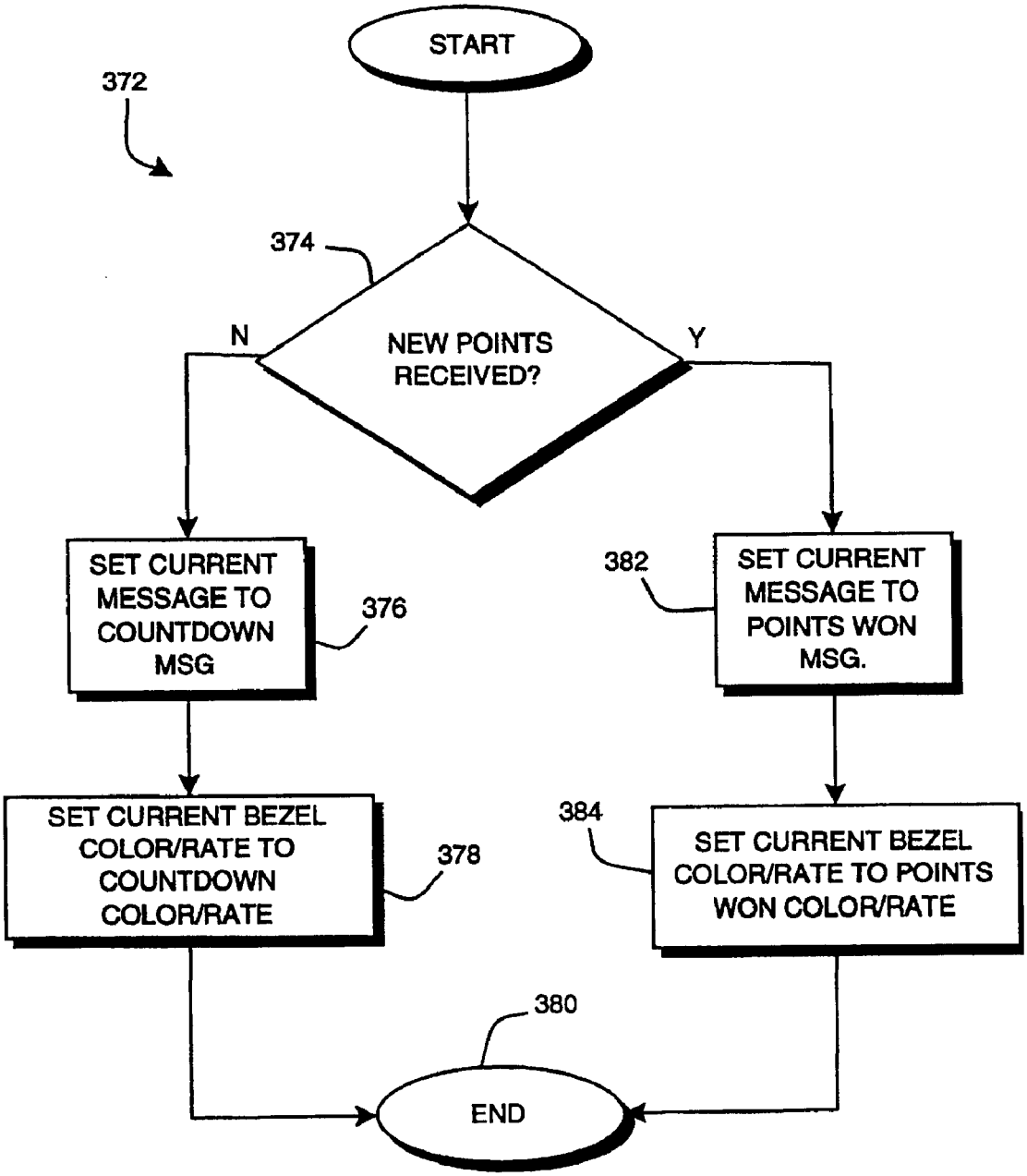
FIG. 22 is a flow chart for the step of processing player tracking information of FIG. 21, which is implemented in firmware executed by the DCN controller.

Referring now to FIG. 22, player tracking 372 begins with the step of determining whether the player has received new points in 374. If no new points have been received, the DCN sets the current message variable to specify a countdown message in step 376 and sets the current bezel color and bezel rate to a countdown bezel color and rate in step 378. The countdown bezel color and rate indicates the player's progress towards being awarded additional points.

If new points have been received, such as where the player has played a given number of coins, the DCN sets the current message variable to a points won message in step 382 and sets the current bezel color and rate to a points won color and rate in step 384. The points won message informs the player of the number of points won.

The above-described tracking process provides a means for providing visual feedback to the player inserting the card into the card reader. By modifying the bezel color and bezel rate, the data communication node provides immediate feedback to the player concerning the proper insertion of the card. If the player inserts the card properly into the card reader so that the card reader senses a valid user identification number, the card reader provides positive visual feedback to the user by illuminating the bezel. On the other hand, if the user improperly inserts the card so that the card reader cannot read the user identification number, the card reader can provide negative visual feedback to the player by illuminating the bezel with a different color and/or flashing rate. In the preferred embodiment, this positive visual feedback includes flashing the green LEDs to produce a flashing green signal around the card reader opening. The negative visual feedback includes flashing the red LEDs. A third combination color is used during the processing of the player tracking information. This process provides immediate feedback to the player concerning the insertion of the card in the card reader.

B. PLAYER TRACKING MODULE

The system described above allows for improved player tracking by recording each and every machine transaction including: time of play, machine number, duration of play. coins in, coins out, hand paid jackpots and games played. The player tracking is conducted over the same network as the accounting data is extracted. This allows the invention to provide bonusing to certain individual players as well as during certain times. As with standard player tracking, the above-described system monitors and reports how many coins are played by each player. The system according to the invention, however, also includes the ability to record how long each player spends at each machine and the number of coins won, games played, and hand jackpots won by each player. The system is able to record all this information because the it operates on a transaction by transaction basis. Each transaction, whether it be a coin in, a handle pull, etc., is recorded by the system. Other prior art systems simply compile the player tracking information at the completion of play.

All the transaction information is stored on the database, which can be later analyzed for future targeted direct mailing campaigns. The player tracking according to the invention allows the casino to schedule buses and other groups and measure their profitability. Because the system records each transaction, the casino can reconfigure theft casinos to better match the tastes and demands of their customers.

The improved player tracking according to the invention also allows the casino to calculate theoretical wins exactly because the system always includes the most current information. The operation of the player tracking procedure is described below.

1. POWER UP PROCEDURE

Figure 23:
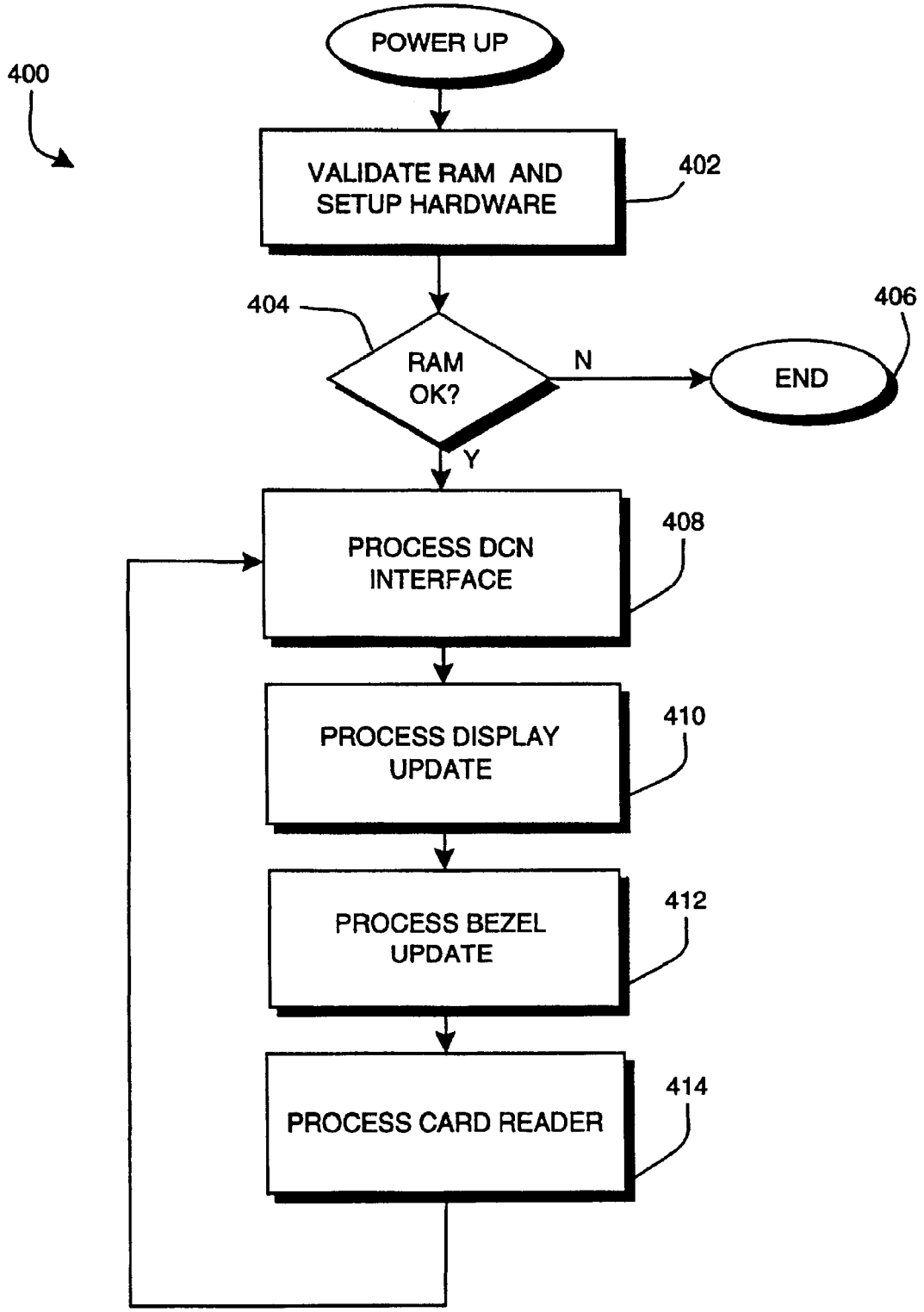
FIG. 23 is a flow chart for the power-on procedure for the player tracking (PT) node of FIG. 2, which is implemented in firmware executed by the PT controller.

The operation of the player tracking module will now be described with reference to FIG. 23 where the powerup process 400 for the player tracking node is shown. As in the data communication node, the player tracking node first validates the RAM and sets up its associated hardware in step 402. Next, the player tracking node tests the RAM in step 404 to determine whether the RAM is functioning properly. If not, the player tracking node, i.e., player tracking controller, terminates its program in an error condition in step 406. If the player tracking RAM is fully functional, the player tracking node sequentially executes steps 408–414. In step 408 the player tracking controller processes the DCN interface between the player tracking controller and the DCN controller. In step 410 the player tracking controller updates the player tracking display. In step 412 the player tracking controller updates the bezel. Finally, the player tracking controller processes the card reader in step 414. Each of these steps will now be described further below.

2. PROCESSING DCN INTERFACE

Figure 24:
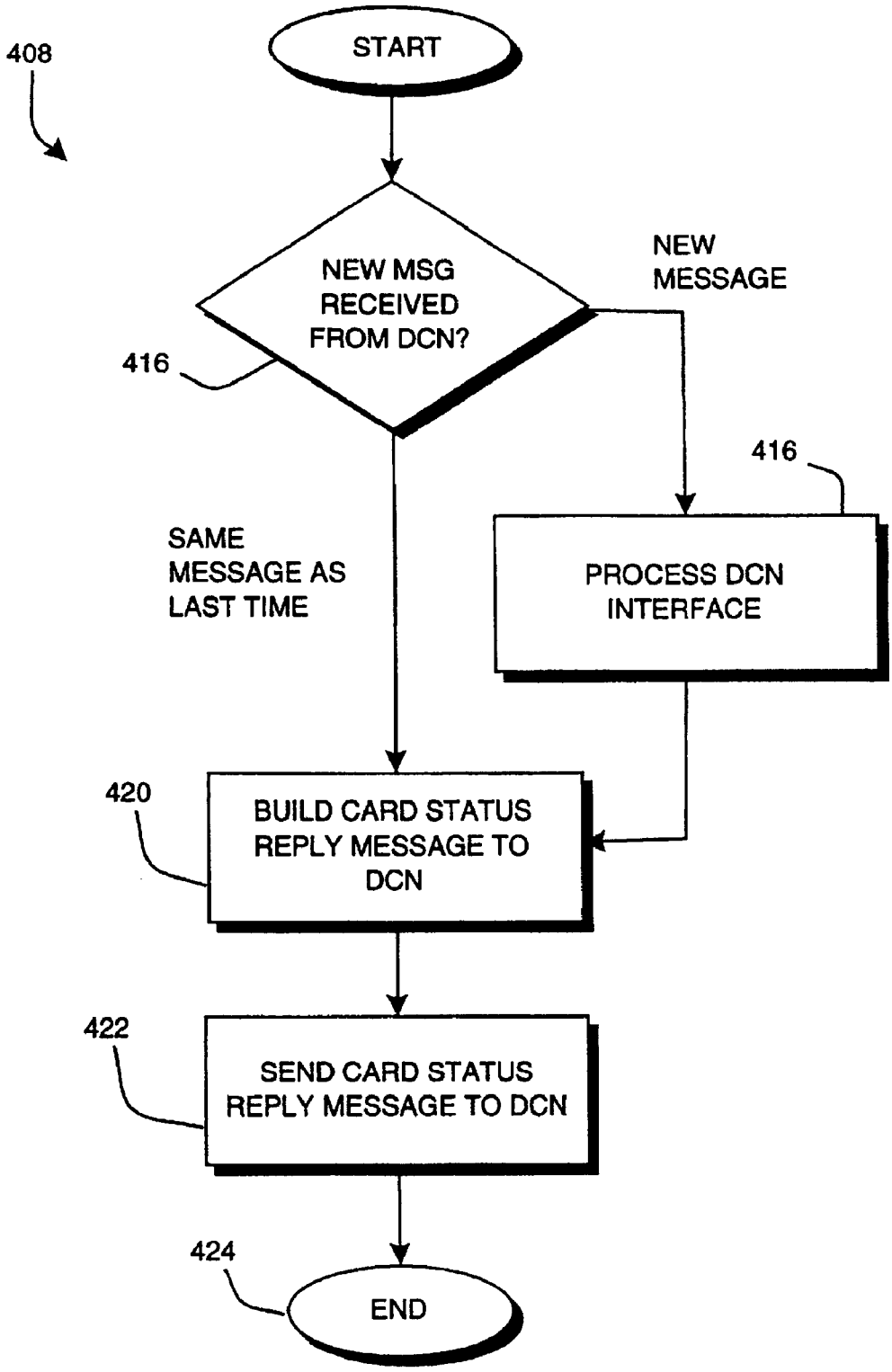
FIG. 24 is a flow chart for the step of processing the DCN interface of FIG. 23, which is implemented in firmware executed by the PT controller.

Referring now to FIG. 24, the steps for processing the DCN interface are shown. First, the player tracking controller checks for a new message received from the DCN in step 416. Ira new message has been received, the player tracking controller overwrites its current message buffer with the new message and updates the bezel color and rate values with those contained in the new current message. Then, the player tracking controller builds a card status reply message in step 420. The card status message indicates whether a card has been inserted and if so whether the card was a good card or a bad card, i.e., the card was read properly by the card reader. If a valid card, the card status reply message also includes the identification number encoded on the card. This step might also involve transposing the number encoded on the card depending on the orientation in which the card was inserted into the card reader. This card status reply message in then sent to the DCN in step 422.

3. PROCESSING DISPLAY UPDATE

Figure 25:
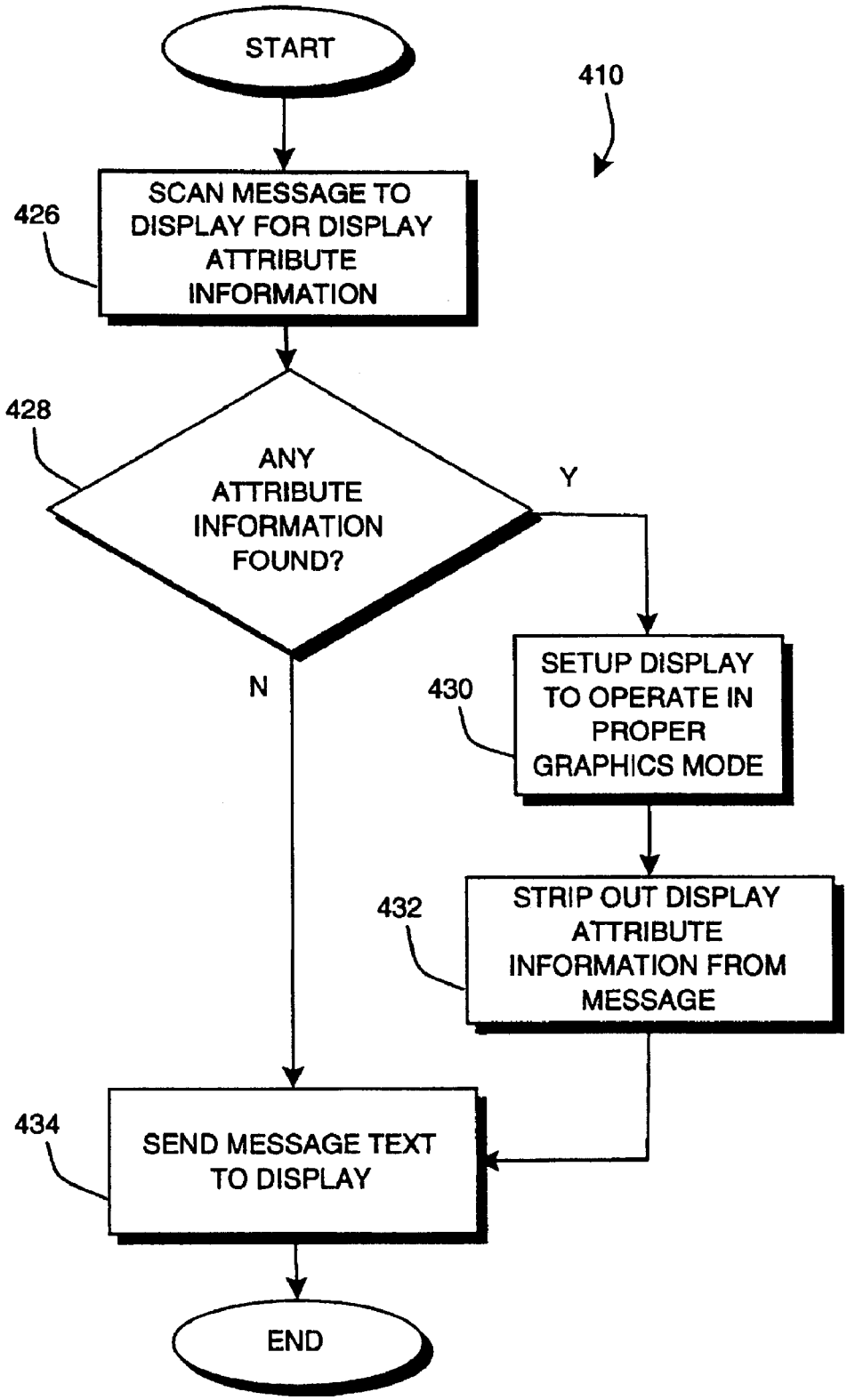
FIG. 25 is a flow chart for the step of processing the DCN message of FIG. 24, which is implemented in firmware executed by the PT controller.

The process of updating the player tracking display is shown in FIG. 25 at 410. This process begins with the player tracking controller scanning the display message for display attribute information. Examples of such display attribute information is given below in Table 4. Each display attribute specifies a different graphic mode for the player tracking display.

TABLE 4

| DISPLAY ATTRIBUTE INFORMATION |
|---|
| 1. Flash Rate |
| 2. Center Display |
| 3. Set Display Intensity |
| 4. Use Small Lower Font |
| 5. Use Small Upper Font |
| 6. Use Normal Large Font |
| 7. Set Pause Time |
| 8. Set Scroll Speed |
| 9. Center and Melt |
| 10. Center and Scroll Down |
| 11. Center and Scroll Up |
| 12. Scroll Down and Stop |
| 13. Scroll UP and Stop |
| 14. Scroll Left and Stop and End of Message |
| 15. Scroll Down |
| 16. Scroll Up |
| 17. Scroll Right |
| 18. Scroll Left |
| 19. Reverse Video |
| 20. Normal |

The player tracking controller then determines whether any such attribute information is found in the display message. If so, the player tracking controller sets up the display driver to incorporate the graphics mode specified by the attribute information. The player tracking controller then strips out any display attribute information from the display message in step 432 because the display attribute information is embedded in the display message. The remaining data in the display message is the actual text to be displayed by the player tracking display, e.g., the player's name. The player tracking controller then sends this text to the display in step 434, which is then displayed by the player tracking display.

4. PROCESSING BEZEL UPDATE

Figure 26:
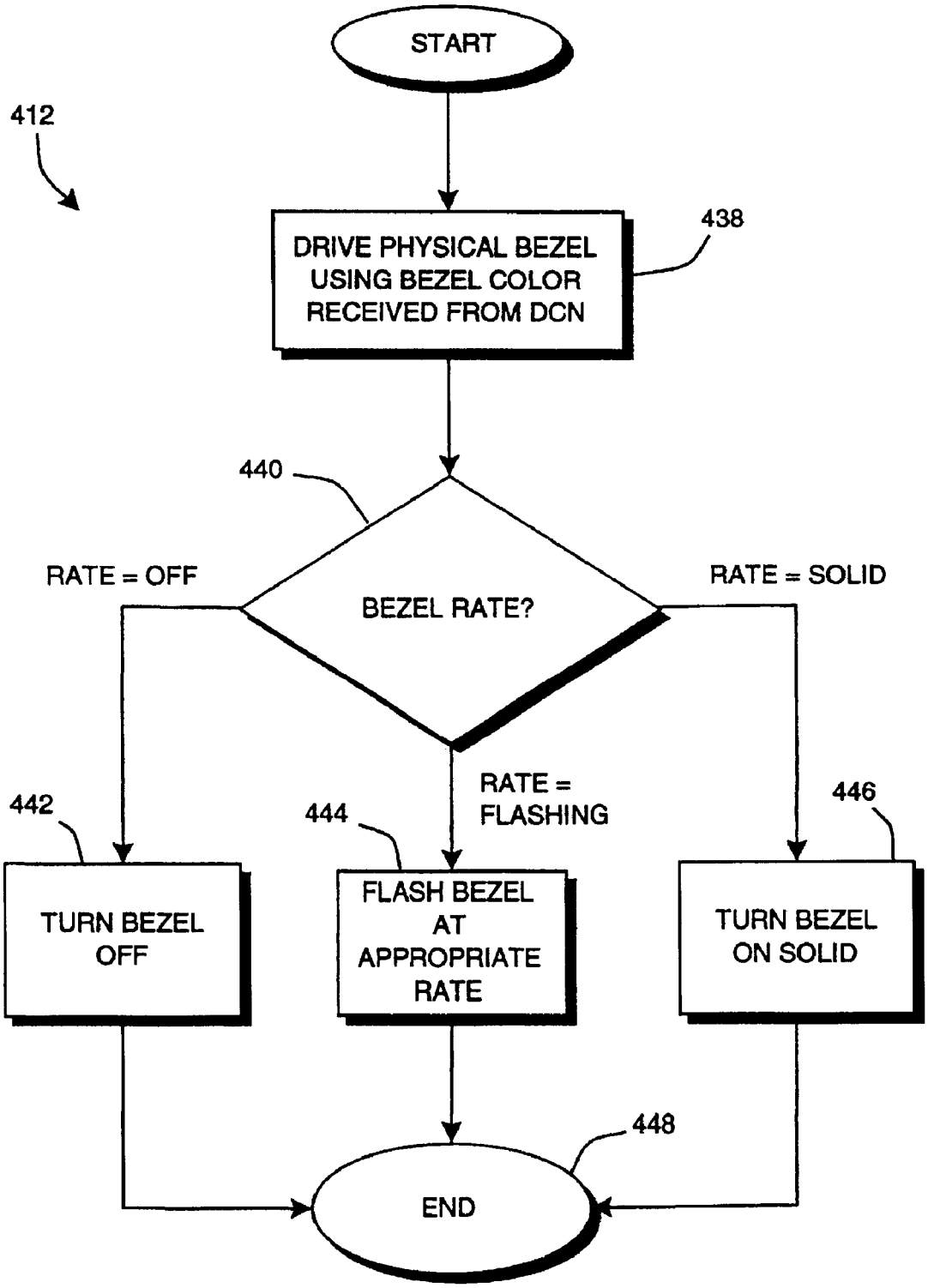
FIG. 26 is a flow chart for the step of processing the card reader bezel update of FIG. 23, which is implemented in firmware executed by the PT controller.

The player tracking node is also responsible for updating the bezel, both in terms of its color and flashing rate. This process 412 is shown in FIG. 26. The first step in processing the bezel update is to determine to bezel color as specified by the DCN and then drive the appropriate LEDs in the card reader. As described above, the preferred embodiment of the card reader includes dual diodes having two primary colored diodes that can be driven separately or in combination to produce three different colors.

Next, the process determines the bezel rate as specified by the DCN. In a first case, the bezel rate is zero or off and thus the player tracking controller turns the LEDs off in step 442 in this case. If the bezel rate specifies a flashing rate, the player tracking controller flashes the bezel at the appropriate bezel rate in step 442. Flashing the bezel involves turning the LEDs on and off at the specified rate. This can be accomplished by a timer interrupt or a timing loop executed by the player tracking controller. The final option is that the rate can be infinite or effectively a solid bezel color. In this case, the player tracking controller simply leaves the card reader LEDs on in step 446. This completes the processing bezel update process 412.

5. PROCESSING CARD READER

Figure 27:
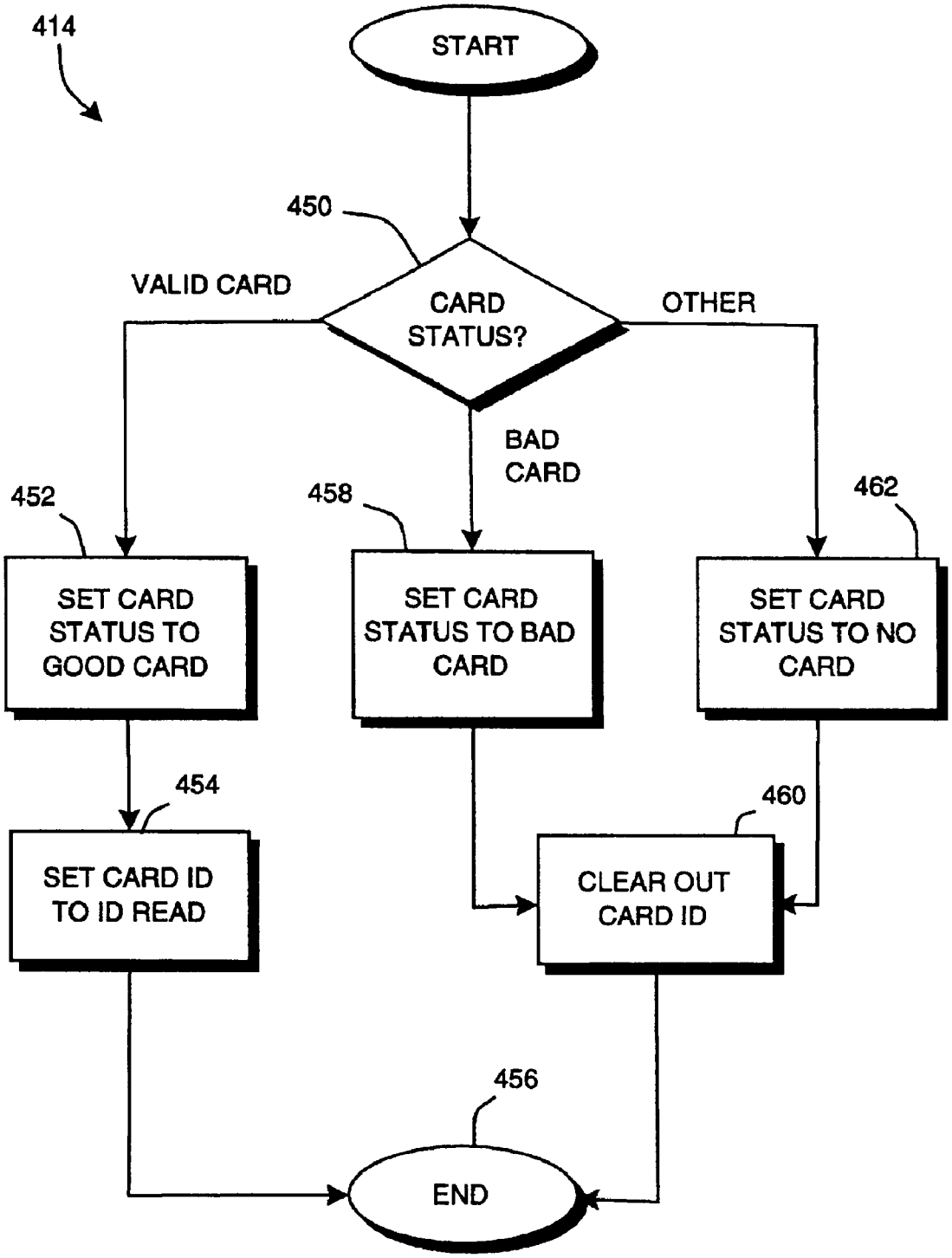
FIG. 27 is a flow chart for the step of processing the card reader of FIG. 23, which is implemented in firmware executed by the PT controller.
Figure 28:
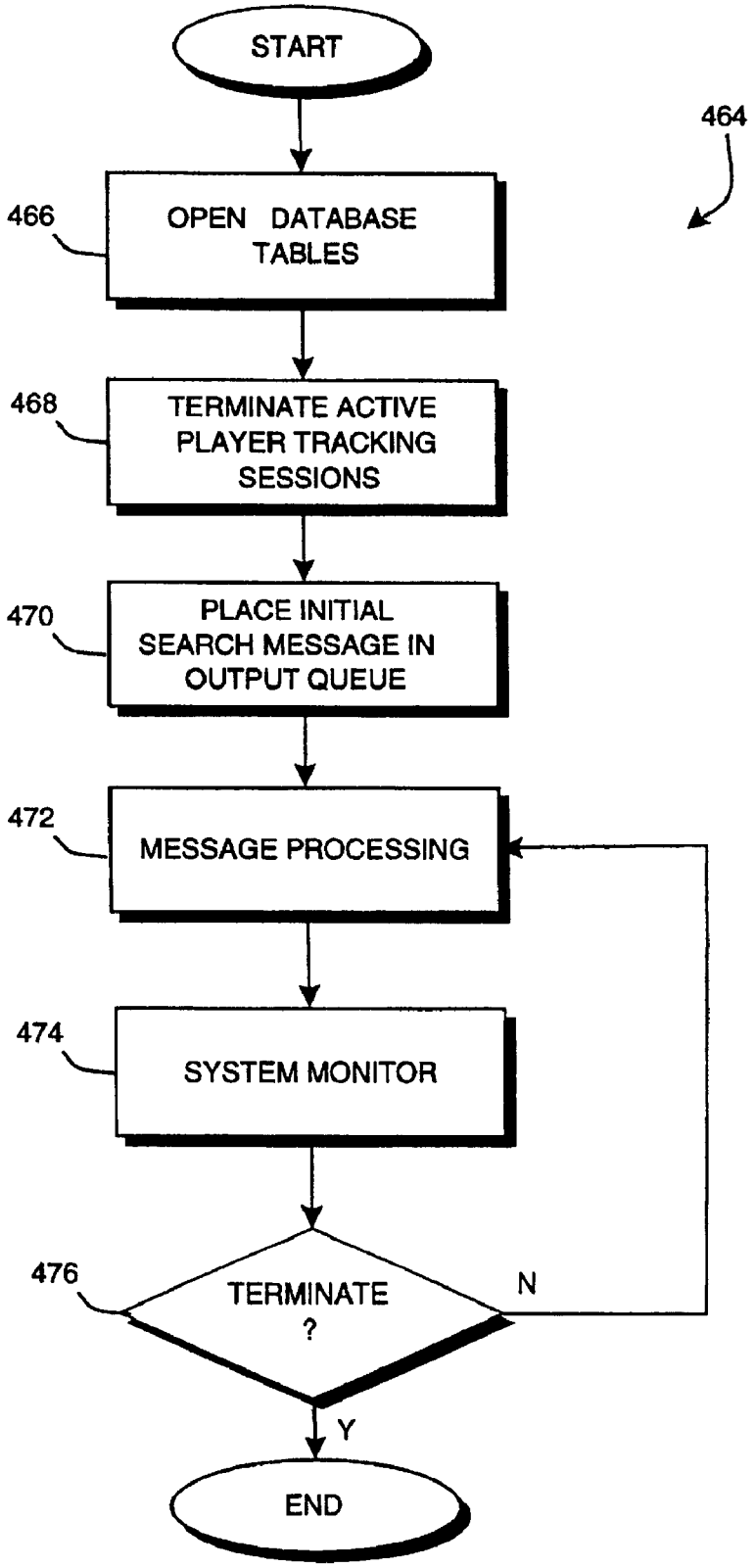
FIG. 28 is a flow chart for the power-on floor controller process, which is implemented in software executed by the floor controller.
Figure 29:
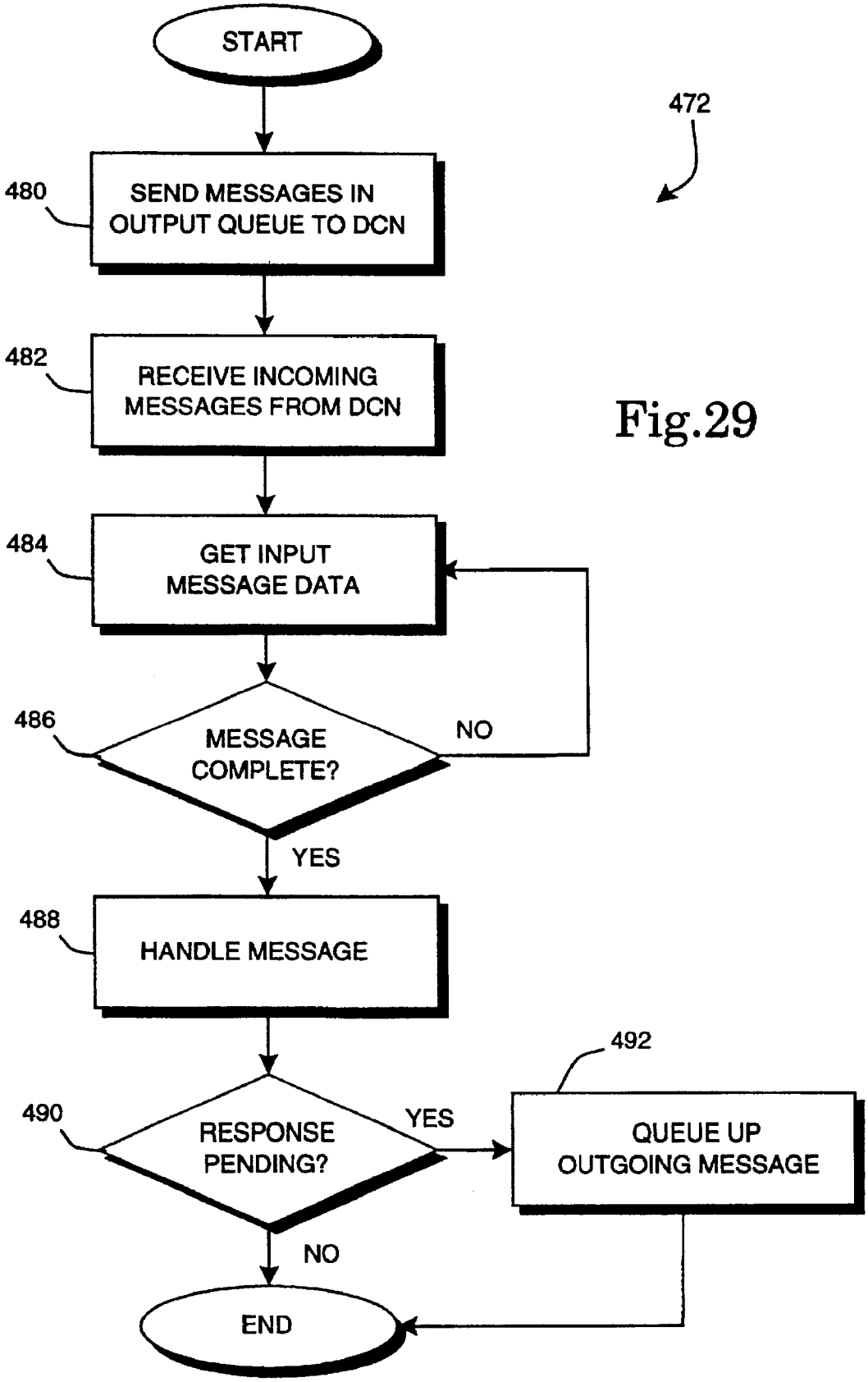
FIG. 29 is a flow chart for the message processing step of FIG. 28, which is implemented in software executed by the floor controller.

The next process step for the player tracking node is to process the card reader. This process 414 is shown in FIG. 27. The first step is for the player tracking controller to determine the card status in 450. In the preferred embodiment, the card status is determined by comparing the checksum of the card, as read off the card by the card reader, to a computed checksum of the data read off the card. Other methods of determining card status can be used as well depending on the type of card reader employed.

If the player tracking controller determines that a valid card was inserted in the card reader, the player tracking controller sets a card status variable equal to good card. This card status is then subsequently transmitted to the DCN controller. Then, the player tracking controller sets a card ID variable equal to the identification number read by the card reader in step 454. The card status and the card ID provide the DCN with sufficient information to instigate the player tracking.

If, on the other hand, the card reader indicates that the card was read improperly or that the card is an invalid card for the card reader, the player tracking controller sets the card status variable to bad card in step 458 and the card ID variable is cleared in step 460. If neither a valid or invalid card condition was detected in 450, the player tracking controller sets the card status variable to no card in step 462 and clears out the card ID in 460.

C. FLOOR CONTROLLER

1. POWER UP PROCEDURE

Referring now to FIGS. 28–32, the process 464 operable on the floor controller will now be described. The process 464 is shown in FIGS. 28–32 in flow chart forms. These flow charts would enable one of ordinary skill in the art to implement the process in computer software using an appropriate computer programming language.

The floor controller process 464 begins at step 466 by opening the database tables in the file server. As described above, the file server includes a commercially-available database program which stores the machine activity information as well as player tracking information and associated system characteristic parameters. This step 466 can also include fetching some or all of these system characteristics in order to trigger certain events such as bonus jackpots, as described below.

In step 468, the floor controller terminates any active player tracking sessions in the database. Because player tracking may have been in progress when the floor controller became inoperable. when the floor controller powers up or becomes operable, there may be player tracking sessions initially active. In this step, the floor controller terminates any such active player tracking sessions in order to place the database in an initial state.

Another step that the floor controller executes after becoming operable is to place an initial machine search message in an output message queue 470. This search message is used by the floor controller to determine which machines are connected to the floor controller. This output message is subsequently transmitted to all of the machines coupled to the floor controller using a global message format as described below with reference to FIG. 31. In the preferred embodiment of the invention, the message handling is through the use of message queues. Furthermore, the preferred embodiment is both an output queue for outgoing messages from the floor controller to the machines and an input message queue for messages coming from the machines to the floor controller. Queues are well-known data structures in the art of computer science and are therefore not further discussed herein. Alternatively, the message-handling could be done without the use of the queues. In such an embodiment the outgoing messages would be sent immediately rather than being queued, and any incoming messages would be processed immediately.

The bulk of the work performed by the file server process 464 is performed in message processing step 472. In this step, the floor controller processes all messages sent to or received from the machines connected thereto. This step will be described further below with references to FIGS. 29 through 31.

The process 464 also includes a system monitoring step 474. This system monitoring step 474 administers certain system-wide events. These system-wide events include the counting-related events and bonusing events. The floor controller continuously checks to see whether any of these events have been triggered. If any event has been triggered, such as a bonusing event, the floor controller takes the appropriate action to handle the event. The event may be triggered by the time and day or by user intervention or other event. The system monitoring step 474 will be described further below with reference to FIGS. 32 and 33.

The final step in process 464 is for the floor controller to check for a termination condition in step 476. In the preferred embodiment, the floor controller checks to determine whether an ESCape key as pressed. If an ESC key was pressed, the floor controller terminates the process 464. If no ESC key was pressed, the floor controller loops back to step 472 wherein the message-processing step and the system monitoring step are repeated. The floor controller continues in the loop 472–476 until the termination condition is sensed.

2. MESSAGE PROCESSING

As described above, the floor controller acts as a gateway between the machines connected thereto and the file server, as shown in FIG. 1. The floor controller is responsible for forwarding the machine activity received from the various machines to the database. The floor controller accomplishes this communication through the use of messages. The message processing step 472 is shown in more detail in FIG. 29.

The first step in processing the messages is for the floor controller to send any messages that are queued-up in the output message queue to the appropriate data communication node in step 480. As described above, the output message queue is a simple data structure that is used to store any pending messages. Included in the message is a destination address by which the floor controller can determine which of the plurality of data communication nodes to send the message to. Next the floor controller receives any incoming messages from the data communication nodes coupled to the floor controller in step 482. Once an incoming message has been received, the floor controller parses through the message data included in the incoming message in steps 484 through 486. In the preferred embodiment, the floor controller parses through the message data one byte at a time. Thus, in step 484 the floor controller reads the next byte in the incoming message. and in step 486 the floor controller checks to see whether this is the last byte in the message. In the preferred embodiment, the message includes a message length field which indicates the number of data bytes included in the message. In this case, a floor controller in step 486 checks to see whether the number of bytes read in step 484 is equal to the number of bytes specified by the message length field.

Once the input message data has been parsed out of the incoming message, the floor controller takes the appropriate match in response to the message data in step 488. This step is described further below with reference to FIGS. 30 and 31. Following the message-handling step 488, the floor controller checks in step 490 to determine whether any response is pending. The floor controller makes this determination by checking a transactions-in-progress structure which indicates whether the floor controller needs to respond to any previous message. If a response is pending, the floor controller queues up an appropriate outgoing message in the output message queue in step 492. Otherwise, the floor controller completes the message processing step 472.

Figure 30:
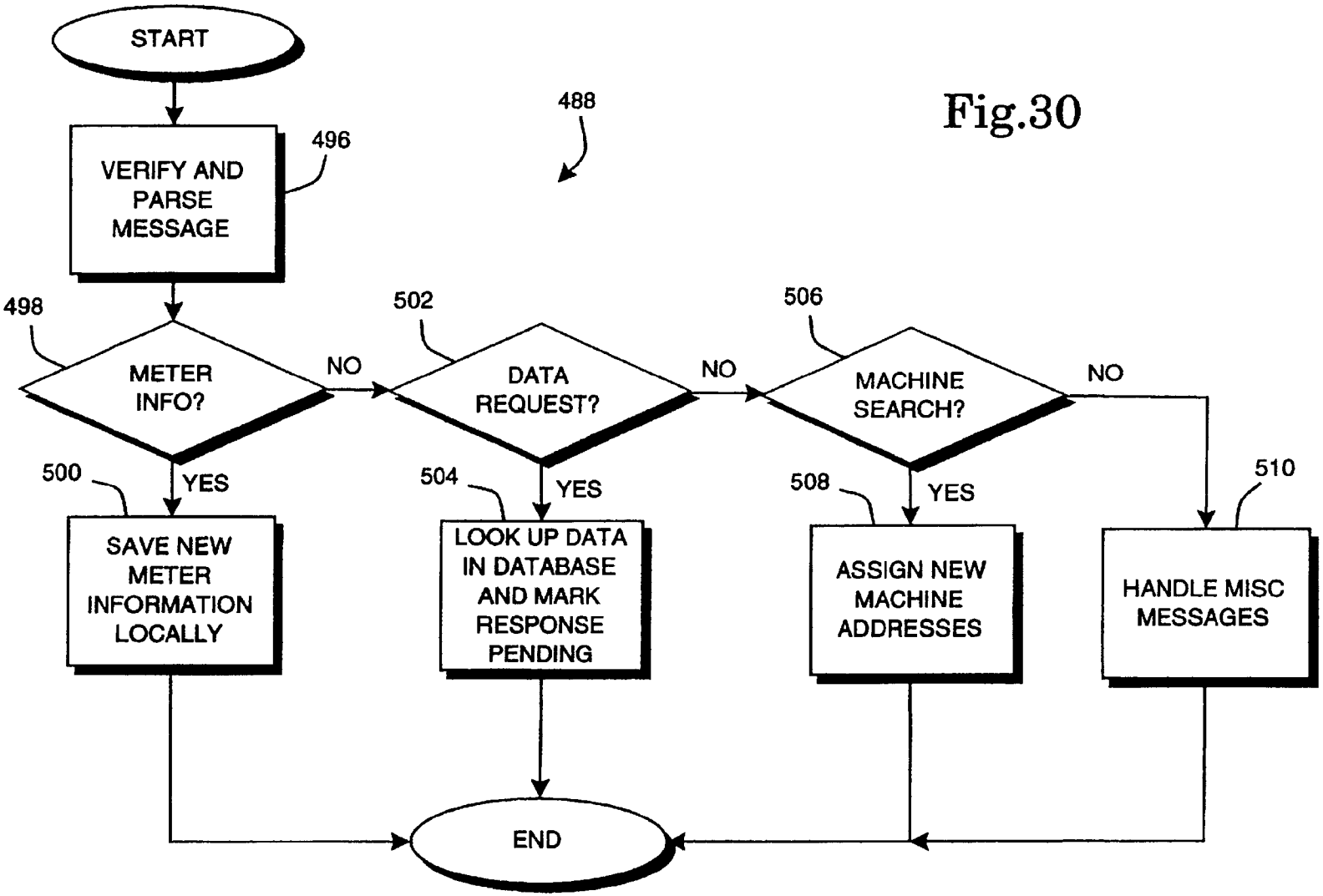
FIG. 30 is a flow chart for the message handling step of FIG. 29, which is implemented in software executed by the floor controller.

Referring now to FIG. 30, the message-handling step 488 is shown in more detail. The message-handling step begins by verifying that the message data corresponds to a valid message in step 496. In the preferred embodiment, the message includes a cyclical redundancy check (CRC) by which the floor controller can determine whether the message is valid or corrupt. Only if the message is valid will the floor controller perform any additional message-handling steps. The floor controller also parses through the message in step 496 to determine what type the message is. The message type determines the appropriate floor controller action. In the preferred embodiment, the messages include a command code which indicates the type of message.

The first type of message can be one which includes new meter information. The floor controller checks in step 498 to determine whether the message includes this type of information. If the message includes new meter information, the floor controller saves the new meter information locally in step 500. The floor controller maintains local copies of the meter information in order to minimize the amount of traffic on the high-speed network. Because the machine meters change so rapidly, forwarding this new meter information on to the file server each time one of these meters is altered would produce an excessive amount of network traffic on the high-speed network. Therefore, in the preferred embodiment, the floor controller saves this new meter information locally in step 500 and only forwards the new information on to the file server after a predetermined amount of time has elapsed.

Another type of message is one which requests data. The floor controller checks in step 502 to determine whether the message type is one requesting data. Typically, these data requests will be for player tracking information such as where a player inserts a card into a card reader whereupon the data communication associated therewith sends the identification number encoded on the card to the floor controller requesting the player tracking data associated with the player identification number. If the floor controller detects a data request in step 502, the floor controller looks up the requested data in the database on the file server in step 504. Also, in step 504, the floor controller marks a response pending in the transactions in progress structure to indicate that this requested data needs to be sent back to the DCN. As described above, the floor controller queues up outgoing messages responsive to the transactions in progress structure.

Another message type is one used by the floor controller to establish new machine addresses. The floor controller periodically checks to determine whether any new DCN has been coupled to its associated current loop networks in order to assign a unique address to that machine. In step 506, the floor controller checks to see whether the incoming message is in response to such a process. If the incoming message is in response to a machine search, the floor controller assigns a new machine address to the responding machine in step 508. The entire process of assigning new machine addresses is described below with reference to FIG. 31.

Finally, the floor controller in step 510 handles any miscellaneous messages. These miscellaneous messages are used primarily for debugging and trouble-shooting the machines.

3. ASSIGNING GAMING DEVICE ADDRESSES

As described above, in the preferred embodiment of the invention, the floor controller uses a shorthand token representation of the DCN's unique identification number to address the DCN. In the preferred embodiment, a single byte address is used to address a DCN on any given current loop. This one-byte address allows up to 256 DCNs to be supported on any given current loop network. In the preferred embodiment, only 64 such DCNs are connected to a single current loop network and therefore the single byte address is more than adequate. The single byte address substantially reduces the amount of traffic on the current loop network by reducing the number of bytes from four in the unique identification number to one for the shorthand token representation.

Figure 31:
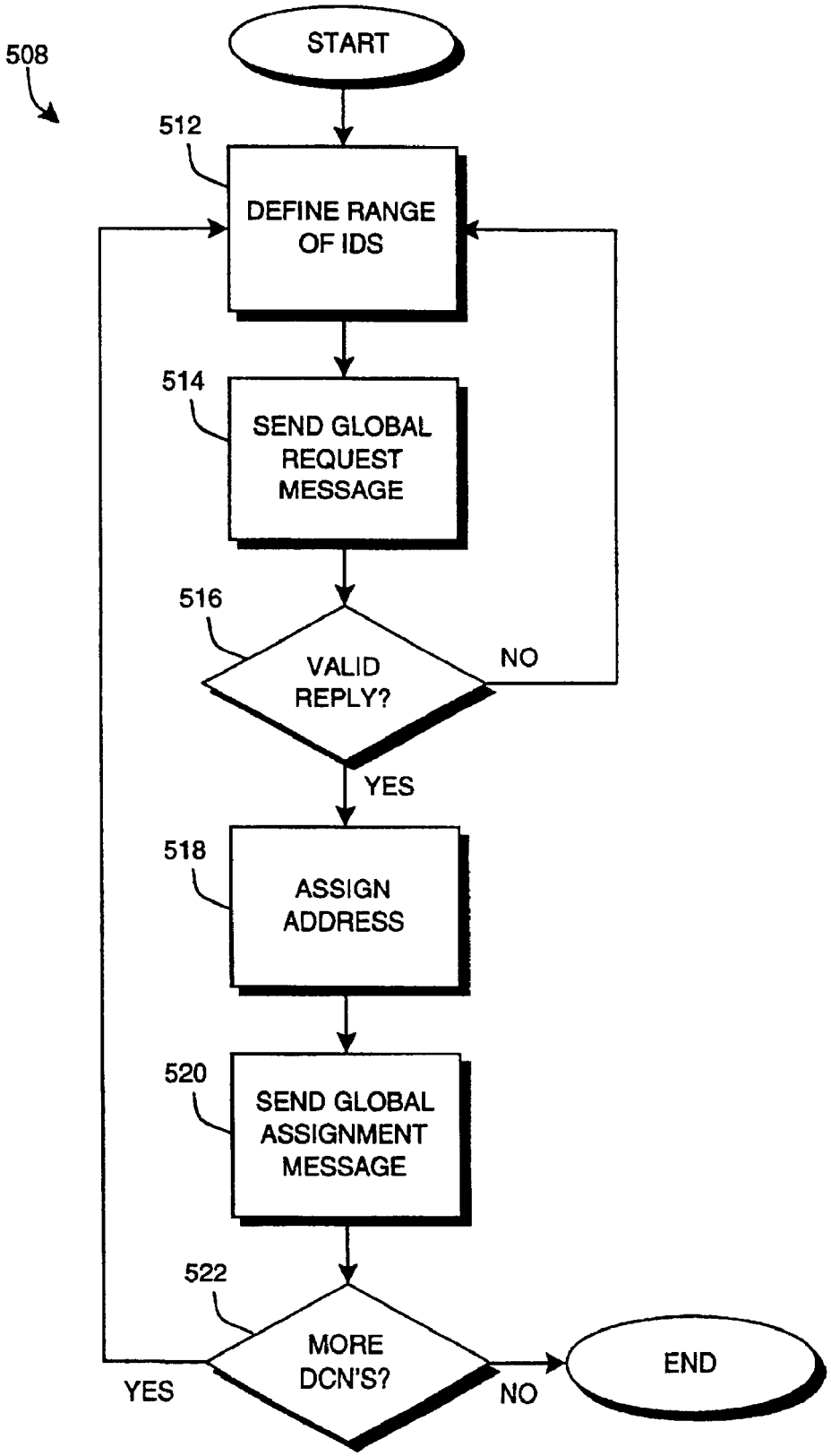
FIG. 31 is a flow chart for the step of assigning unique machine addresses of FIG. 30, which is implemented in software executed by the floor controller.

The floor controller is responsible for generating the unique single byte address for each data communication node on a given current loop network. The process 508 of assigning unique addresses to the DCNs on the current loop network is shown in FIG. 31. The process begins by defining a range of unique identification numbers in step 512. Initially this will be a large range.

Next, the floor controller sends out a message to all of the DCNs on the current loop network in step 514. The floor controller communicates with the DCNs by using a standard communication protocol. In the preferred embodiment, this protocol defines a message format including a destination ID, a source ID, a message length, a data packet and a CRC. Other message formats could be used as well. Using this format, the floor controller can communicate with all of the DCNs on the current loop network by using a global destination address in the message. This global destination address would indicate to the DCNs that this message is intended for all DCNs on the current loop network. This global message would include two unique identification numbers that, taken together, define the range of unique identification numbers established in step 512.

The individual DCNs then checks to see whether their unique identification number falls within this range. If a DCN's unique identification number falls within this range and the DCN does not have an address assigned thereto, the DCN then responds to this global message by sending a reply message in response that includes the unique identification number of that DCN. In the event that more than one DCN has a unique identification number that falls within this range a network collision will occur and the message will be corrupted. The process 508 checks for this condition in step 516. This condition is indicated by an invalid CRC in the message.

In the event of a network collision, the floor controller can limit the range of unique identification numbers by repeating step 512 in the hope of eliminating this network contention.

If the response has a valid CRC, the floor controller assigns a unique address to the responding DCN, as identified by the unique identification number in the response, in step 518. The floor controller then transmits this address along with the corresponding unique identification number in an assignment message to all of the DCNs using a global destination address in step 520. The DCNs then process this message and in the event that the unique identification number included in the message corresponds to the DCN's unique identification number, the DCN adopts the address included in the message. Once the DCN has been assigned an address in this manner, the DCN will interpret all subsequent messages having a destination address equal to the assigned DCN address as being directed to that DCN. The above-described address assignment sequence is repeated for each of the remaining DCNs on the current loop network in step 522. The floor controller continues this process until the entire range of unique identification numbers has been covered and no more network collisions occur.

4. SYSTEM MONITORING

Figure 32:
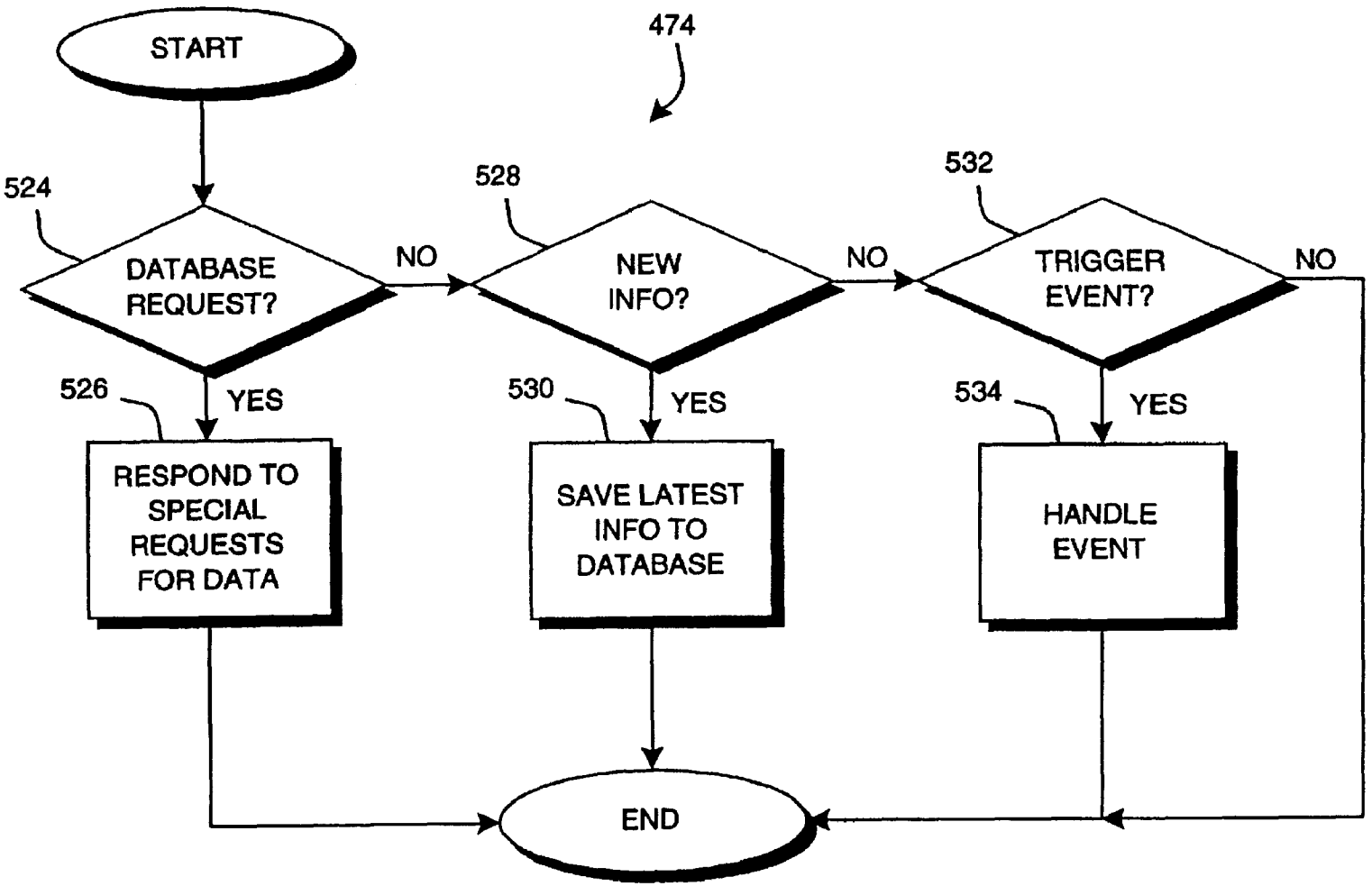
FIG. 32 is a flow chart for the system monitoring step of FIG. 28, which is implemented in software executed by the floor controller.

Referring now to FIG. 32. the system monitoring step 474 will now be described. The floor controller is now responsible for monitoring certain system-wide conditions to determine whether certain events need to occur. The system monitoring step also handles request for particular machine information. Thus, in step 524, the floor controller determines whether a new request has been placed in the data base for such particular machine information. If such a request has been placed, the floor controller responds to the special request for data in step 526 by sending a message to the particular machine requesting the required information. Once the required information has been received, the floor controller processes this information accordingly.

The floor controller also monitors the locally-stored meter information in step 528. If the locally-stored information is changed, the floor controller saves the latest information to the data base in step 530. As described above, the floor controller saves the meter information locally in order to minimize the traffic to the file server over the high speed network.

The floor controller also monitors the system for certain event triggers in step 532. These triggers can be stored in the data base and fetched by the floor controller during its power-up procedures. These triggers indicate if and when certain events occur. Examples of event triggers include: the drop period, the end-of-day, the bonus period, etc. If an event trigger has occurred, the floor controller handles the event in step 534.

Figure 33:
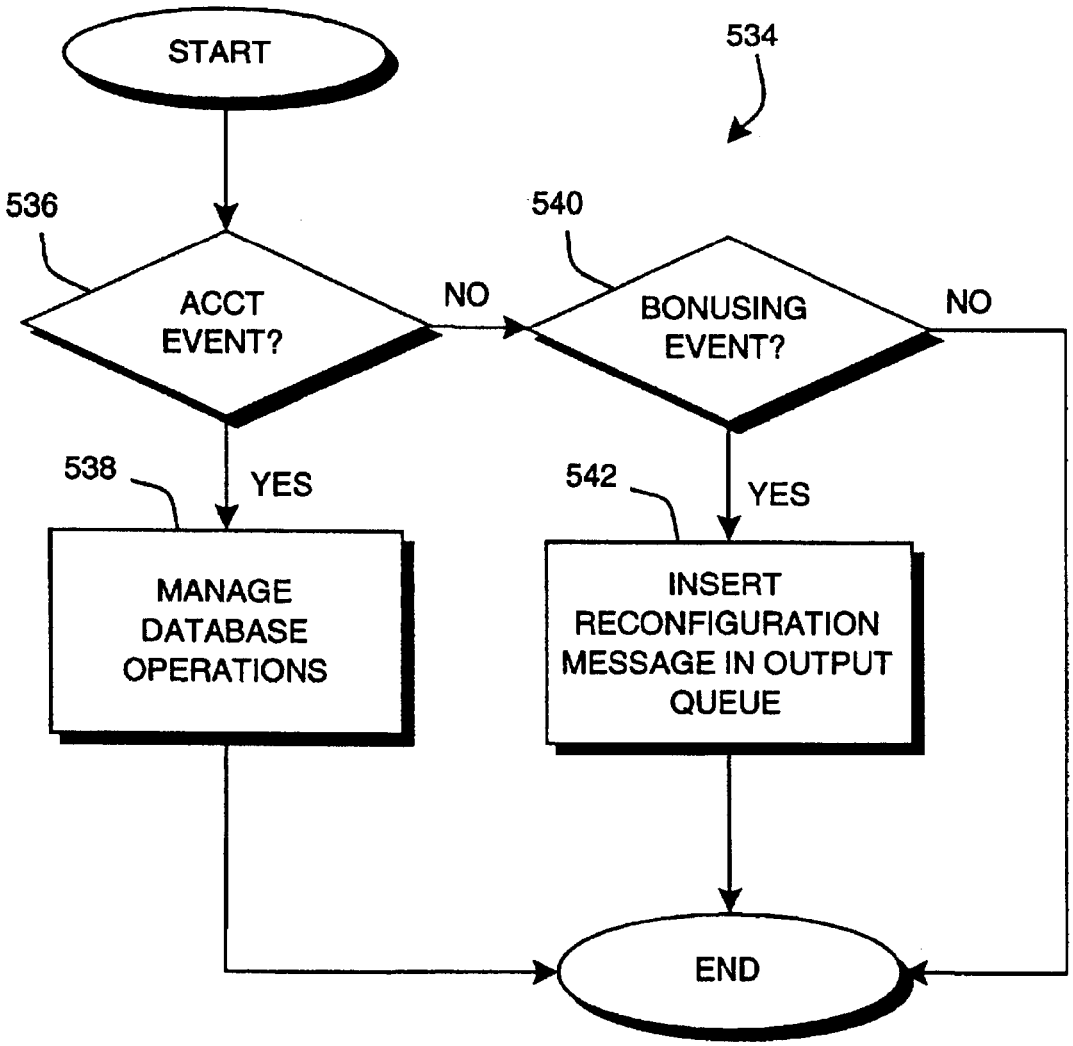
FIG. 33 is a flow chart for the event handling step of FIG. 32, which is implemented in software executed by the floor controller.

The handle event step 534 is shown in more detail in FIG. 33. The events can basically be bifurcated into accounting events and bonusing events. Accounting events refer to the data communication activity of the system. The accounting events are typically triggered by a certain time of day such as the end of day or the drop period. If an accounting event has been triggered, the floor controller performs the required data base operations in step 538. This step involves updating all of the locally-stored meter information and storing the updated meter information into the data base.

The other type of event can be referred to as a bonusing event. The floor controller checks to see whether the event is a bonusing event in step 540. The bonusing events can also be triggered by the time of day. For example, the bonusing event may be triggered from midnight to 4:00 a.m. on weekdays. These bonusing periods can be specified in the data base. If the triggered event is a bonusing event, the floor controller inserts a corresponding reconfiguration message in the output message queue in step 542. The reconfiguration message includes a reconfiguration command that is sent to an appropriate machine. The machine, upon receiving the reconfiguration command, reconfigures its payout schedule in accordance with the received reconfiguration command. According to the invention, there are many different reconfiguration commands to implement a multiplicity of different bonusing events. One reconfiguration command specifies that the machine should reconfigure its payout schedule to be a multiple of its default payout schedule. This reconfiguration command can also specify that the multiple payout schedule should be limited to a predetermined percentage of the coins in. This reconfiguration command can further specify that the multiple payout schedule should be limited to only when the maximum coins are played. This reconfiguration command can further specify that the multiple payout schedule should be limited to payouts in a specified range. This reconfiguration command can also specify the multiple payout schedule should payout only when a predetermined level of player activity is reached.

Another reconfiguration command allows any number of machines on the network to be combined in a common jackpot having a common jackpot payout schedule, wherein the reconfiguration command reconfigures the selected machines to payout in accordance with the common jackpot payout schedule. In this case, the reconfiguration message would be queued up for each of the selected machines to be combined in a common jackpot. One example of a common jackpot is a progressive jackpot. Unlike the prior art progressive jackpot systems, however, the progressive jackpot according to the invention is not limited to a predetermined number of machines. In the prior art progressive jackpot systems. a bank of machines are connected to a common progressive jackpot controller and only those machines can be included in the progressive jackpot. In contrast, any machine on the network, including those connected to other floor controllers can be combined into a common progressive jackpot. Moreover, the number of progressive jackpots is not limited by the number of floor controllers since one floor controller can manage more than one progressive jackpot.

Another reconfiguration command permits the system to implement so-called "automatic mystery jackpots." These "mystery" jackpots allow a machine to payout a mystery jackpot even when a jackpot was not won. Instead, the reconfiguration command can specify that the mystery jackpot is to occur after a certain number of coins, a certain number of handle pulls, or a variety of other conditions specified by the reconfiguration commands. These mystery bonuses provide the casino with another way to induce additional gaming activity.

5. BONUS CONTROL

Figure 34:
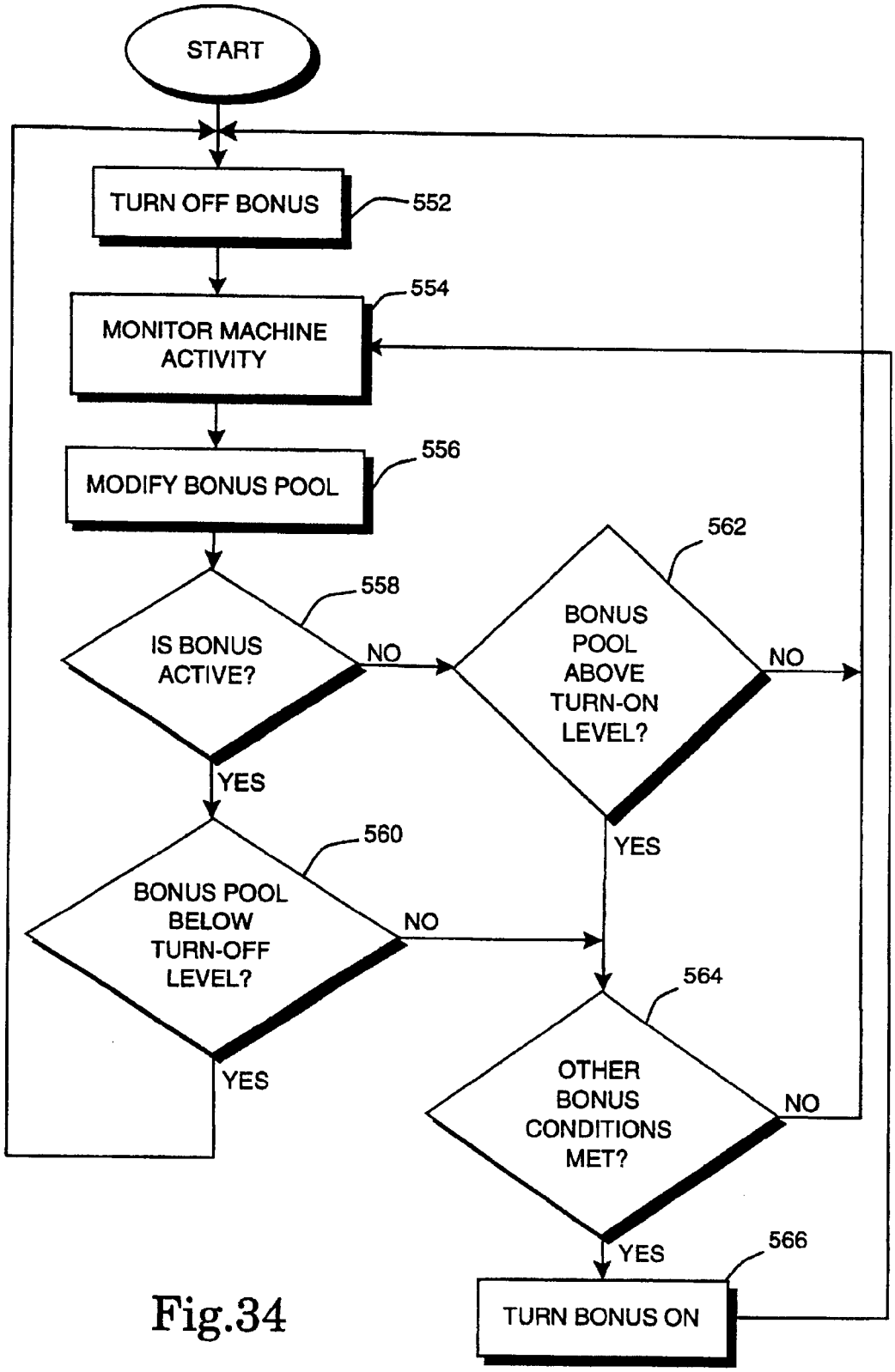
FIG. 34 is a flow chart for bonus control, which is implemented in software executed by the floor controller.

Referring now to FIG. 34, a method 550 for controlling the conditions under which the above-described bonus activities are activated is shown. It is essential for the system to have complete control over the amount and conditions under which a bonus is paid out in order to insure the profitability of the bonusing system. The method 550 described below provides the required control.

The method 550 begins in step 552 by disabling or turning off the bonuses in the individual machines. This is accomplished by sending a message to the individual DCNs to turn off or deactivate bonusing. Next, the floor controller monitors the activities of the individual machines connected thereto. This step includes monitoring the coins in and bonuses paid for the individual machines, as described above. In step 556, the floor controller modifies a bonus pool by a predetermined percentage of all coins played. The bonus pool is essentially a pool of monetary resources that can be allocated for bonus awards. In the preferred embodiment, a predetermined percentage of the monetary value of the coins played are added to the bonus pool. Also in this step. any bonuses paid by the gaming devices are also measured and subtracted from the bonus pool. The use of the bonus pool will become more apparent when the other steps are described hereinbelow.

In step 558, the floor controller determines whether or not bonusing is active. If bonusing is active, the floor controller next determines whether the bonus pool amount has dropped below a predetermined minimum level called the "turn-off" level in 560. This minimum amount or floor can be set by the casino and provides a buffer to account for large bonus awards and/or multiple bonus awards that could cause the bonus payout to exceed the bonus pool. Therefore, if the bonus pool drops below the turn-off level, the method 550 branches back to step 552 and turns off bonusing. As will described further below, the bonusing remains off until such time as the bonus pool builds up past another minimum level called the "turn-on" level.

Returning to step 558, if the bonus is currently not active, the floor controller determines at step 562 whether the bonus pool has reached a predetermined turn-on level. This turn-on level can also be set by the casino and provides a buffer above the turn-off level to insure that the bonusing does not behave erratically, i.e., bonusing rapidly switching between on and off. If the bonus pool is not above the turn-on level, bonusing is again turned off in step 552.

If the bonus pool has reached the turn-on level, the floor controller checks to see whether other bonus conditions are met at step 564. These bonus conditions can include, but are not limited to, a minimum period of time 'since the last bonus activation, a minimum level of play in the time period prior to the bonus pool reaching the turn on level, a predetermined time of day, or other predetermined conditions. These conditions give the casino additional control over the bonusing promotions. If the conditions are not met, the method 550 branches back to step 552 where the bonusing is again turned off. If, however, the conditions are met in step 564, the bonus is turned on at step 566 and the method 550 branches to step 554 where the machine activity is again monitored.

In the preferred embodiment, the method 550 is embodied in software that is executed by each of the floor controllers in the system. These floor controllers are then responsible for activating or deactivating the bonusing for the individual machines connected thereto. The system allows the floor controller to have multiple bonus pools and to have certain of the machines associated with a given bonus pool. Thus, the floor controller can implement multiple bonusing promotions simultaneously.

This system also allows for machines connected to different floor controllers to be combined into a single bonusing promotion. In this case, one of the floor controllers assumes primary responsibility for managing the bonus pool while the other floor controllers act as intermediaries between the primary floor controller and the machines connected to the other floor controllers. Thus, the system according to the invention allows for much greater flexibility in running bonusing promotionals than heretofore possible. Prior art systems required certain predetermined machines to be connected into a bank for any given bonus award such as a progressive bonus. The system according to the invention allows any machine in the casino to be combined in a bonus type situation. The system also insures that the bonusing promotionals will operate substantially in the black, i.e., the bonus pool is greater than the bonus payouts.

Having described and Illustrated the principles of the invention in a preferred embodiment thereof, it should be apparent that the invention can be modified in arrangement and detail without departing from such principles. For example, although an Ethernet network was described in the preferred embodiment of the invention, other high-speed networks such as wireless networks could be used in place thereof. I claim all modifications and variation coming within the spirit and scope of the following claims.

We claim:

1. A method of operating gaming devices configured to play a preselected game interconnected by a computer network to a host computer comprising:

permitting players to play the preselected game at the gaming devices;

paying to each device in accordance with a first payout table after each game;

monitoring the activity of the gaming devices over the network;

detecting the amount of money played on the gaming devices;

allocating a predetermined percentage of the money played to a bonus pool;

determining the level of the bonus pool;

activating a bonus payout table in a gaming device after the bonus pool level exceeds a turn-on level;

permitting continued play of the preselected game at the gaming devices; and paying the gaming-device in accordance with both payout tables after each game for so long as the bonus payout table remains activated.

2. A method of operating gaming devices interconnected by a computer network to a host computer according to claim 1 comprising deactivating the bonus payout table when the bonus pool falls below a turn-off level.

3. A method of operating gaming devices interconnected by a computer network to a host computer according to claim 1 comprising:

determining the time period since the last bonus table activation; and deactivating the bonus payout table when the time period exceeds a minimum period of time.

4. A method of operating gaming devices interconnected by a computer network to a host computer according to claim 1 comprising:

determining the level of play for a gaming device;

deactivating the bonus payout table in the gaming device when the level of play fails below a predetermined level.

5. A method of operating gaming devices interconnected by a computer network to a host computer according to claim 4 comprising:

determining the time of day;

deactivating the bonus payout table when the time of day is not within a predetermined period of time.

6. A method of operating gaming devices interconnected by a computer network to a host computer according to claim 1 comprising:

detecting the amount of money paid as bonuses on the gaming devices;

modifying the bonus pool by the amount of money paid as bonuses;

determining the level of the bonus pool; and deactivating a bonus payout table in a gaming device when the bonus pool level falls below a turn-off level.

7. A method of operating gaming devices interconnected by a computer network to a host computer according to claim 6 wherein the turn-on level is above the turn-off level.

8. A method of operating gaming devices interconnected by a computer network to a host computer comprising:

monitoring the activity of the gaming devices;

detecting the amount of money played on the gaming devices;

allocating a predetermined percentage of the money played to a bonus pool;

determining the level of the bonus pool;

activating a bonus payout table in a gaming device after the bonus pool level exceeds a turn-on level;

detecting the amount of money paid as bonuses on the gaming devices;

modifying the bonus pool by the amount of money paid as bonuses;

determining the level of the bonus pool; and deactivating the bonus payout table in the gaming device after the bonus pool level falls below a turn-off level, said turn-on level being above said turn-off level.

9. A method of operating gaming devices interconnected by a computer network to a host computer comprising:

allowing play to occur on the gaming devices;

paying to each device in accordance with a first payout schedule after each game;

sending a reconfiguration command from the host computer to a gaming device over the network;

receiving the reconfiguration command at the gaming device;

reconfiguring the gaming device responsive to the received reconfiguration command wherein the gaming device reconfigures its payout schedule in accordance with the received reconfiguration command;

allowing additional play to occur on the gaming devices;

paying to the reconfigured device in accordance with the first payout schedule and a bonus payout schedule after each game for so long as the gaming device remains reconfigured;

detecting the amount of money played on the gaming devices;

allocating a predetermined percentage of the money played to a bonus pool;

determining the level of the bonus pool; and sending the reconfiguration command after the bonus pool level exceeds a turn-on level.

10. A method of operating gaming devices according to claim 9 comprising paying to the reconfigured device in accordance with only the first payout schedule after the bonus pool falls below a turn-off level.

11. A method of operating gaming devices according to claim 9 comprising:

determining the level of play for a gaming device; and paying to the reconfigured device in accordance with only the first payout schedule after the level of play falls below a predetermined level.

12. A method of operating gaming devices according to claim 9 comprising:

detecting the amount of money paid as bonuses on the gaming devices;

modifying the bonus pool by the amount of money paid as bonuses;

determining the level of the bonus pool; and paying to the reconfigured device in accordance with only the first payout schedule after the bonus pool level falls below a turn-off level.

13. A method of operating gaming devices according to claim 12 wherein the turn-on level is above the turn-off level.

14. The method of claim 1 wherein said method further comprises the steps of:

activating bonus payout tables in each of a preselected group of the gaming devices; and paying to the gaming devices in the preselected group in accordance with both payout tables after each game for so long as the bonus payout tables remain activated.

*15. A method of operating gaming devices configured to play a preselected game interconnected by a computer network to a host computer comprising:*

*permitting players to play the preselected game at the gaming devices;*

*paying to each device in accordance with a payout table after each game;*

*monitoring the activity of the gaming devices over the network;*

*detecting the amount of money played on the gaming devices;*

*allocating a predetermined percentage of the money played to a bonus pool;*

*determining the level of the bonus pool;*

*activating a bonus payout schedule associated with the gaming devices after the bonus pool level exceeds a turn-on level;*

*permitting continued play of the preselected game at the gaming devices;*

*paying each gaming device in accordance with the payout table after each game; and*

*paying the gaming devices in accordance with the bonus payout schedule for so long as it remains activated.*

*16. A method of operating gaming devices interconnected by a computer network to a host computer according to claim 15 comprising deactivating the bonus payout schedule when the bonus pool falls below a turn-off level.*

*17. A method of operating gaming devices interconnected by a computer network to a host computer according to claim 15 comprising:*

*determining the time period since the last bonus payout schedule activation; and*

*deactivating the bonus payout schedule when the time period exceeds a minimum period of time.*

*18. A method of operating gaming devices interconnected by a computer network to a host computer according to claim 15 comprising:*

*determining the level of play for a gaming device;*

*deactivating the bonus payout schedule in the gaming device when the level of play falls below a predetermined level.*

*19. A method of operating gaming devices interconnected by a computer network to a host computer according to claim 18 comprising:*

*determining the time of day;*

*deactivating the bonus payout schedule when the time of day is not within a predetermined period of time.*

*20. A method of operating gaming devices interconnected by a computer network to a host computer according to claim 15 comprising:*

*detecting the amount of money paid as bonuses on the gaming devices;*

*modifying the bonus pool by the amount of money paid as bonuses;*

*determining the level of the bonus pool; and*

*deactivating the bonus payout schedule in a gaming device when the bonus pool level falls below a turn-off level.*

*21. A method of operating gaming devices interconnected by a computer network to a host computer according to claim 20 wherein the turn-on level is above the turn-off level.*

*22. The method of claim 15 wherein paying the gaming devices in accordance with the bonus payout schedule for so long as it remains activated comprises paying one of the gaming devices responsive to transmission of a pay command from the host computer to said one gaming device.*

*23. The method of claim 22 wherein paying one of the gaming devices comprises applying credits to a credit meter on the gaming devices.*

* * * * *

UNITED STATES PATENT AND TRADEMARK OFFICE

CERTIFICATE OF CORRECTION

PATENT NO. : RE43,727 E
APPLICATION NO. : 09/373034
DATED : October 9, 2012
INVENTOR(S) : John F. Acres et al.

It is certified that error appears in the above-identified patent and that said Letters Patent is hereby corrected as shown below:

In line 19 of claim 1 (column 37, line 24), change "gaming-device" to --gaming device--.

In line 6 of claim 4 (column 37, line 43), change "level of play fails below" to --level of play falls below--.

Signed and Sealed this
Ninth Day of April, 2013

Teresa Stanek Rea
*Acting Director of the United States Patent and Trademark Office*